(12) United States Patent
Welch et al.

(10) Patent No.: US 12,229,622 B1
(45) Date of Patent: Feb. 18, 2025

(54) EXTENDED REALITY TAGS IN AN EXTENDED REALITY PLATFORM

(71) Applicant: Block, Inc., Oakland, CA (US)

(72) Inventors: Shawn Welch, Mission Hills, KS (US); Gregory Bricca, Corte Madera, CA (US); Catherine Ferdon, San Francisco, CA (US)

(73) Assignee: Block, Inc., Oakland, CA (US)

( * ) Notice: Subject to any disclaimer, the term of this patent is extended or adjusted under 35 U.S.C. 154(b) by 35 days.

(21) Appl. No.: 18/164,333

(22) Filed: Feb. 3, 2023

(51) Int. Cl.
G06K 7/10 (2006.01)
G06T 19/00 (2011.01)

(52) U.S. Cl.
CPC ........ G06K 7/10366 (2013.01); G06T 19/006 (2013.01)

(58) Field of Classification Search
CPC ........................... G06K 7/10366; G06T 19/006
See application file for complete search history.

(56) References Cited

U.S. PATENT DOCUMENTS

| | | | |
|---|---|---|---|
| 6,192,142 B1 | 2/2001 | Pare et al. |
| 7,444,358 B2 | 10/2008 | Paczkowski et al. |
| 7,472,172 B2 | 12/2008 | Anderson et al. |
| 7,941,835 B2 | 5/2011 | Wolford et al. |
| 8,423,043 B2 | 4/2013 | Kazmi |
| 8,990,121 B1 | 3/2015 | Guise et al. |
| 8,997,230 B1 | 3/2015 | Mccauley et al. |
| 9,202,057 B2 | 12/2015 | Wawda et al. |
| 9,402,161 B2 | 7/2016 | Marti et al. |
| 9,779,449 B2 | 10/2017 | Meyer et al. |
| 10,733,594 B1 | 8/2020 | Dai et al. |
| 11,386,622 B1 | 7/2022 | Obeyesekere et al. |
| 2002/0194490 A1 | 12/2002 | Halperin et al. |
| 2007/0214088 A1 | 9/2007 | Graham et al. |
| 2007/0240219 A1 | 10/2007 | Tuvell et al. |
| 2008/0167980 A1 | 7/2008 | Aaron et al. |
| 2009/0199296 A1 | 8/2009 | Xie et al. |
| 2011/0214184 A1 | 9/2011 | Whitehouse et al. |
| 2012/0084203 A1 | 4/2012 | Mehew et al. |
| 2012/0310830 A1 | 12/2012 | Paulsen et al. |
| 2012/0331553 A1 | 12/2012 | Aziz et al. |

(Continued)

OTHER PUBLICATIONS

F. Chehimi, P. Coulton and R. Edwards, "Augmented Reality 3D Interactive Advertisements on Smartphones," International Conference on the Management of Mobile Business (ICMB 2007), Toronto, ON, Canada, 2007, pp. 21-21 (Year: 2007).*

(Continued)

*Primary Examiner* — Matthew Mikels
(74) *Attorney, Agent, or Firm* — Polsinelli PC

(57) ABSTRACT

Implementing extended reality (XR) tags in an XR platform is described. A server(s) may obtain, via a user interface of an application executing on a client device, a definition of an XR tag, and may embed information in the XR tag in accordance with the definition of the XR tag. The server(s) may further obtain, via the user interface, one or more rules applicable to the XR tag. The server(s) may further store data representing the XR tag in a data store. In some examples, the definition and/or the one or more rules allow for customizing the XR tag and/or the information embedded in the XR tag to other client devices that are accessing the XR tag, users of the other client devices, and/or a creator of the XR tag.

20 Claims, 20 Drawing Sheets

(56) References Cited

U.S. PATENT DOCUMENTS

| | | |
|---|---|---|
| 2013/0178257 A1 | 7/2013 | Langseth |
| 2013/0217333 A1 | 8/2013 | Sprigg et al. |
| 2013/0226717 A1 | 8/2013 | Ahluwalia et al. |
| 2013/0305368 A1 | 11/2013 | Ford |
| 2014/0129596 A1 | 5/2014 | Howe |
| 2014/0171039 A1 | 6/2014 | Bjontegard |
| 2014/0201126 A1 | 7/2014 | Zadeh et al. |
| 2014/0304119 A1 | 10/2014 | Masuko et al. |
| 2014/0337243 A1 | 11/2014 | Dutt et al. |
| 2015/0026479 A1 | 1/2015 | Yi et al. |
| 2015/0066769 A1 | 3/2015 | Tallal |
| 2015/0088744 A1 | 3/2015 | Raduchel |
| 2015/0140962 A1 | 5/2015 | Mapes et al. |
| 2015/0177010 A1 | 6/2015 | Abramson et al. |
| 2015/0235425 A1 | 8/2015 | Koga |
| 2015/0254606 A1 | 9/2015 | Bhalodia et al. |
| 2022/0374941 A1 | 11/2022 | Sakuma et al. |

OTHER PUBLICATIONS

Ferebee et al. "Security Visualization: Cyber Security Storm Map and Event Correlation" IEEE, (Year: 2011).

Hosseini et al. "Enhancement of security with the help of real time authentication and one time password in e- commerce transactions" (Year: 2013), 5th Conference on Information and Knowlegde Technology, pp. 268-273.

\* cited by examiner

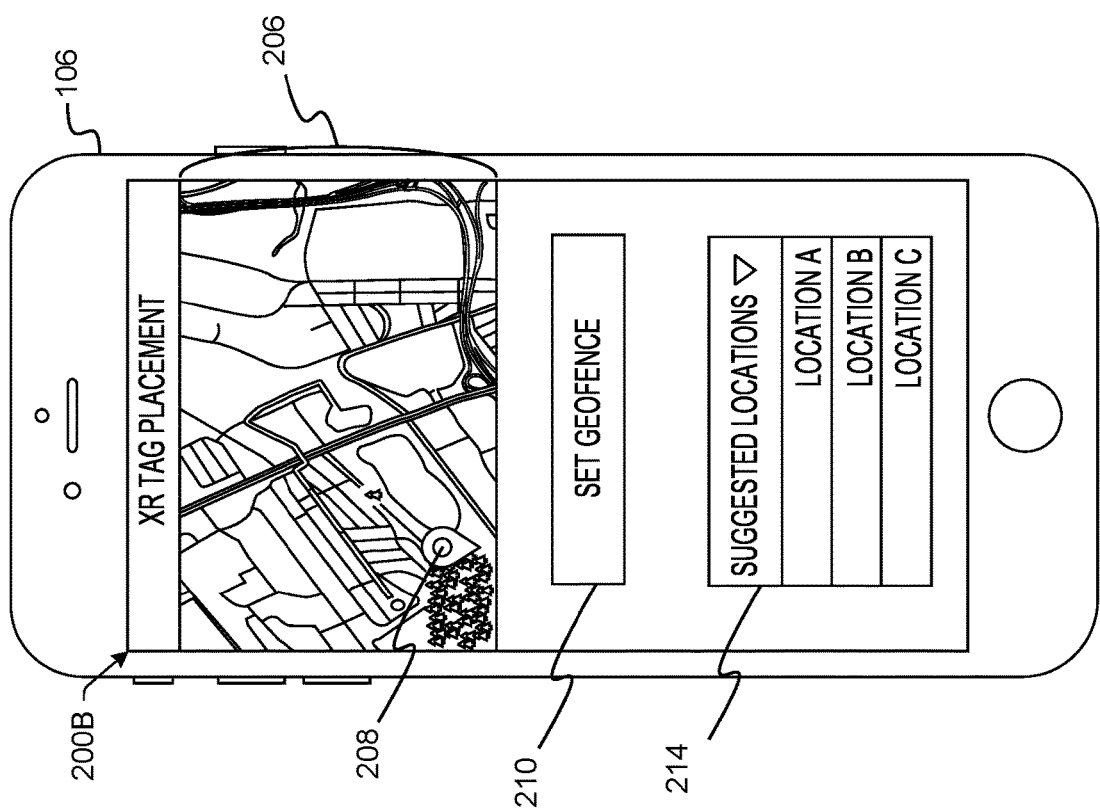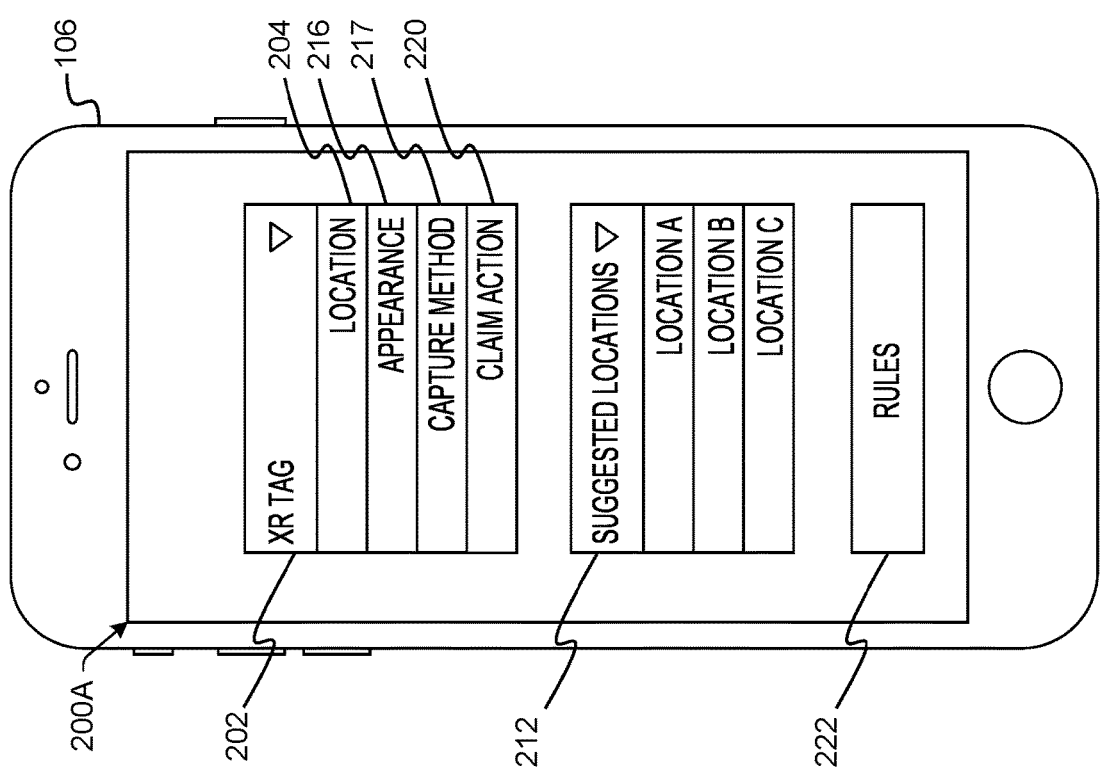

EXTENDED REALITY TAGS IN AN EXTENDED REALITY PLATFORM

TECHNICAL FIELD

Modern computing and display technologies have facilitated the development of systems for so-called "virtual reality" or "augmented reality" experiences, where digitally reproduced images are presented to a user in a manner where they seem to be, or may be perceived as, real. A virtual reality, or "VR", scenario typically involves presentation of digital or virtual image information without transparency to other actual real-world visual input. An augmented reality, or "AR", scenario typically involves presentation of digital or virtual image information as an augmentation to visualization of the actual real-world around the user. Computer-based and/or electronic gaming systems are known to provide a shared virtual or augmented environment for many players to interact in a virtual world.

BRIEF DESCRIPTION OF THE DRAWINGS

Features of the present disclosure, its nature and various advantages, will be more apparent upon consideration of the following detailed description, taken in conjunction with the accompanying drawings.

FIG. 2A is an example user interface associated with creating XR tags, according to an implementation of the present subject matter.

FIG. 2B is another example user interface associated with creating XR tags, according to an implementation of the present subject matter.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
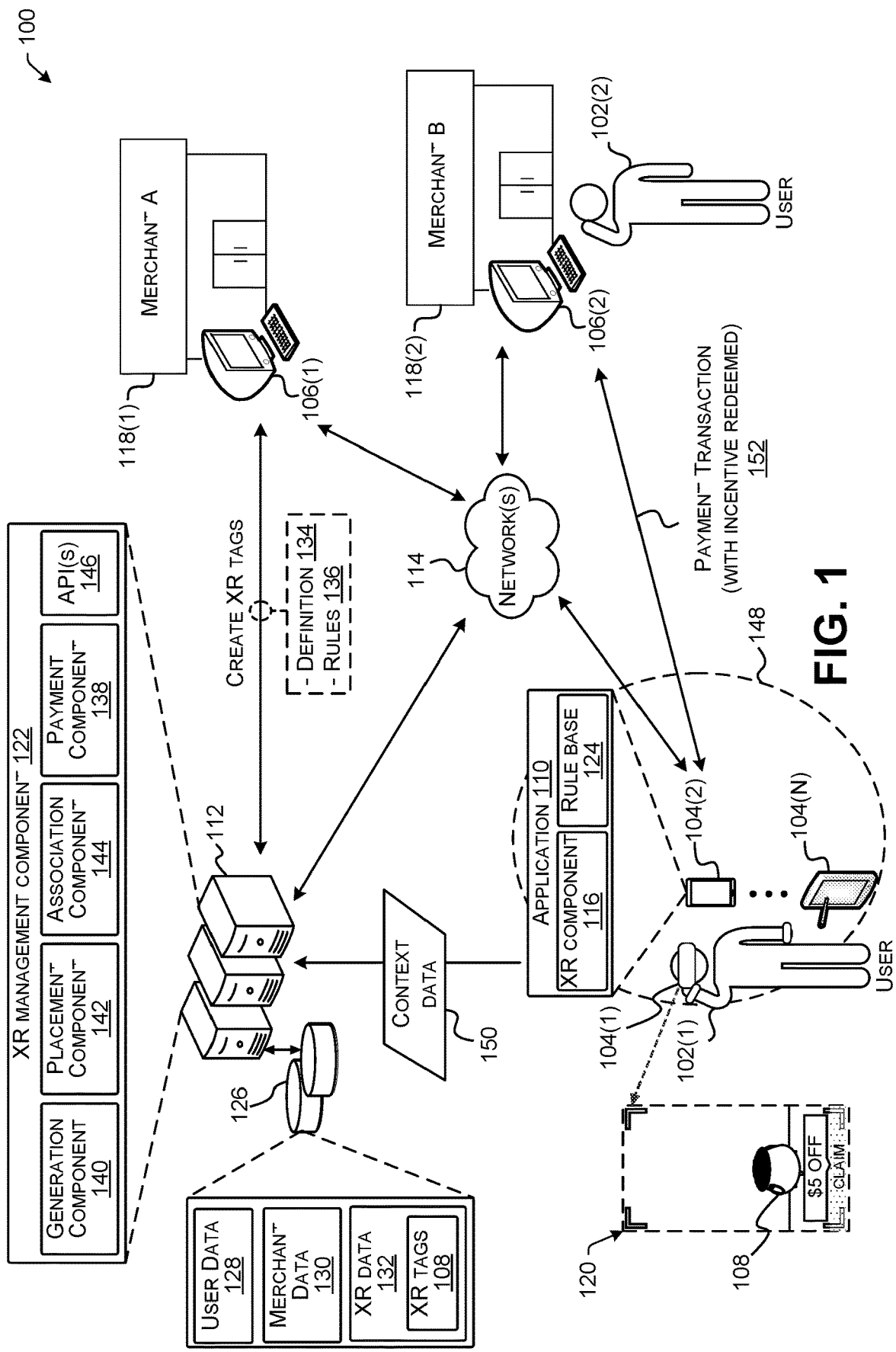
FIG. 1 is an example environment for implementing an extended reality (XR) platform, according to an implementation of the present subject matter.

Described herein are, among other things, techniques, devices, and systems for implementing extended reality (XR) tags in an XR platform. Some embodiments described herein include techniques, devices, and systems for augmenting a "commercial scene," or a real-world environment that enables commerce, transactions, or the like, in some way, using XR technology. XR technology is meant to serve as an umbrella term to include 360-degree video, virtual reality (VR) technology, augmented reality (AR) technology, mixed reality (MR) technology, or a combination thereof. Depending on the choice of the XR technology, a user experiences varying levels of "immersion."

In one implementation, the techniques, devices, and systems disclosed herein use a dedicated XR application to generate XR tags, where interaction with the XR tags enhances the experience for the individuals involved in a commercial activity, such as a payment transaction or a peer-to-peer (P2P) financial transfer. The XR tags can be images, graphics, or markers superimposed with computer-generated images (e.g., Quick Response (QR) codes, barcodes, images, videos, text, or similar markers). Further, the XR tags can be in the form of an object, audio representation (e.g., a snippet of a song), visual representation (e.g., avatar crafted specific to a user generating the XR tag), and/or can be functional. In some examples, the XR tags can cater to a particular purpose, e.g., a bill, note, coin, etc., to indicate that the XR tags, when captured, may initiate a payment specific action. In some examples, the XR tags can be financial data, payment object information, or otherwise indicative of such data. The XR tags can also be capable of interacting with software downloaded to a computing device equipped with a camera or other image capturing device capable of reading three (or many) dimensional images overlaid on the real-world image seen on a display of a user device.

The "XR technology" described herein can execute on the XR platform which can be software, hardware and/or firmware, such as an application on a merchant device, customer device, a standalone device, such as a payment beacon, a payment reader, point-of-sale device, etc., or all of the above, for example as instances of the single XR application. The standalone device can also be a device designed for mobile XR technology, such as glasses, headsets, or other such wearables or any other devices having connection capabilities to networks such as the Internet. The device can also be a computing device, such as a mobile device including, for example a smart phone, a tablet, a laptop, or the like, which includes a display device (e.g., a user interface such as an image or video capturing component like a camera, a screen, a display, etc.) and an application (e.g., an XR application) for using XR, for example to create, capture and/or edit the XR tags. The XR application can be provided by a service provider or any appropriate party such that users may choose to download or install and run the application on the user device, or install a portion of the XR application via instant application technology. In some examples, the service provider can be a payment service provider such that the XR platform comprises an XR payment platform from which the generation, placement, capture, and/or claiming of XR tags described herein can be implemented.

The XR platform described herein is configured to generate the XR tags, for example, dynamically or at the request of an authorized user, e.g., a merchant. In some implementations, the merchant has the flexibility to define XR tags, e.g., in terms of their format, location, context, time of validity, and conditions under which they want the XR tags to be generated. The merchant can generate the XR tags via a unique user interface, one that allows full-fledged customization to one that allows the merchant to pick and choose from templates. The term "generation" can also include modification and/or augmentation. A user, for instance, may leverage a computing device having a mobile form factor (e.g., mobile phone, tablet, wearable computing device, and so forth) to compute and output an augmentation of the XR tag for display on the computing device. In one example, the computing device may include a display device that is at least partially transparent such that the physical surroundings of the computing device are viewable through the display device, such as a portion of the physical environment (e.g., real-world). The augmentation may also be displayed by the display device to be viewable concurrently with the portion of the real-world physical environment, such as to use auto-stereoscopic techniques to support viewing in three dimensions. Thus, the augmentation may expand a user's experience with the physical environment.

As described herein, the generation of XR tags includes the shape and form of the XR tags, and the functionality, if any, embedded in the XR tags. For example, each XR tag may have associated therewith a definition and one or more rules that make up a specification set, including but not limited to: specifications related to a specific interaction that triggers a "claim action" discussed later with respect to capturing of XR tags (e.g., a user capturing the XR tag with a phone); an action that gets triggered when a user interacts with the XR tag with their phone (e.g., accesses an application on the phone, causes a specific application to be downloaded on the phone, etc.); and a rule set that checks user and/or device specifications to determine whether the XR tag can be generated, placed, and or be allowed to be captured by the specific merchant, user, or device, and so on. Accordingly, in the process of generating an XR tag, a definition of the XR tag and/or one or more rules applicable to the XR tag may be obtained (e.g., via a user interface of an application executing on a client device), and information may be embedded in the XR tag in accordance with the definition. In some examples, the rule(s) may allow for customizing the embedded information, such as by customizing the embedded information to client devices that are accessing the XR tag and/or to users of those client devices.

In some embodiments, the XR platform can enable placement of the XR tags at merchant locations and/or for customers in its ecosystem. In some embodiments, the placement may be specific to users, locations or even for specific use cases. To this end, the XR platform can access an internal knowledge and rule base, to determine whether a specific condition is met, satisfied, or the like to trigger the generation and/or placement of XR tags. In another embodiment, the XR platform can enable "capturing" of the XR tags. In some examples, a user can "capture" an XR tag by taking a picture of the XR tag, e.g., using a camera or other image capturing device associated with a user device, interacting with the XR tag (e.g., via a tap or other interaction using a user device), pointing a device in the direction of the XR tag, or the like. In an example, the XR platform described herein discloses techniques, devices, and systems for a user, such as a customer or P2P user, to capture the XR tags in a payment scene to facilitate payment transactions. Such payment transactions may manifest between a merchant and the customer at a merchant location, e.g., brick-and-mortar or merchant website, or between two users, for example to furnish a P2P payment transaction. After an XR tag is captured, the XR tag can be "claimed," which, as described below, can trigger one or more claiming actions. In an example, each XR tag can be associated with one or more claim actions, and the claim action(s) can be defined as part of the generation and/or placement process to effectively embed the claim action in the XR tag such that interaction with the XR tag leads to capturing of the XR tag and initialization of actions embedded therein. The rule base of the XR tag can determine which actions are triggered and when. Such context can also be statically or dynamically associated with the XR tag and surfaced when the capture event occurs. In some scenarios, there may be several claim actions associated with a single XR tag or several XR tags associated with a single claim action. In some examples, context data can be used to determine which claim action should be triggered when an XR tag is captured and claimed. Such context data can include user data (e.g., customer data, merchant data), user device data, user application data, user account data, environment data, location data, time/date data, and/or the like.

The XR tags when captured, say by another device executing an XR application, trigger one or more "claim actions," such as claim actions that facilitate payments as mentioned before, generate user or merchant specific actions, generate static or dynamic incentives, activate or deactivate incentives, download information, access information, enable user-specific actions, and so on. In some implementations, the capturing of the XR tags can also manifest in a non-payment context, e.g., to check a balance on a card, check a status of an account, verify a cashflow statement, or check loyalty points associated with a customer account, and so on.

In one implementation, the claim actions may vary based on the environment in which the XR tags are implemented. For example, in the retail environment, the actions may include creating and applying coupons, automatically paying for the items in the cart, making appointments, authorizing actions such as providing approvals or shifts for pay calculations, obtaining pay after shifts, applying for loans or cash advances, information about inventory of items, and so on. In a restaurant environment, the actions may include creating coupons, automatically paying for a meal or order, making appointments (e.g., reservations) for a future time at the restaurant or a different restaurant, information about menu items, adding services to the existing services, and so on. In a P2P environment, the claim actions may include automatically crediting assets (e.g., money, stocks, cryptocurrency, etc.) into someone's account, automatically debiting assets (e.g., money, stocks, cryptocurrency, etc.) from someone's account, creating send/receive requests, automatically purchasing assets (e.g., money, stocks, cryptocurrency, etc.), automatically selling assets (e.g., money, stocks, cryptocurrency, etc.), and so on. In a lending environment, the actions may include automatically creating send/receive loan requests, generating loan offers in real-time, allowing data capture to facilitate generation of loan offers, receiving loan incentives, and so on. In a media environment, the actions may include automatically downloading a full version of a media object (e.g., song, video, etc.), receiving an artist-related incentive (e.g., a limited-edition album, artist merchandize, concert tickets, fan experience, etc.), information about an album or songs etc., receiving tips from an audience (e.g., artists receiving tips from a concert audience, etc.).

In an example, an XR tag can be associated with an incentive. That is, the claim action associated with the XR tag can generate a static or dynamic incentive. In such examples, when a service provider system receives, from a client device of a user, coordinates associated with the XR tag, the system may identify an incentive correlated with the coordinates, and associate the incentive to an application executing on the client device, wherein the incentive is configured to be applied to a subsequent payment transaction of which the user is a party. In some examples, the generation of the static or dynamic incentive and/or the incentive itself can be determined based at least in part on context data, as described above. The associating of the incentive to the application may occur upon receiving an indication that the user has interacted with an XR tag to trigger a claim action(s) associated therewith.

The disclosed XR technology offers several advantages when compared to other state of the art offerings. Some conventional solutions provide ways to access incentives via a QR code or paper coupons. However, such implementations are static and cannot be configured to the user, time, environment, or occasion, among other benefits that the disclosed implementations offer. While certain applications leverage fixed latitude and longitude and local landmarks, they do nothing to dynamically make sense of the world around them through computer vision, object recognition, or depth sensing. Further such applications need adequate player liquidity, e.g., enough players participating in the application across a wide enough geographic coverage. The implementations herein also provide for ways to dynamically create and then register or map the XR tags, customized or otherwise, to the real-world environment. The user creating or enabling the XR tags can customize the XR tags in terms of context, e.g., location, where the XR tags should be. This is the kind of flexibility that is currently absent in the ecommerce world, and more broadly, the financial world.

The disclosed techniques, devices, and system allow users to access more information than a traditional two-dimensional graphical user interface is able to provide. Using the XR technology described here, the user is able to view vast amounts of data in the context of a scene (e.g., a real scene) in front of or within proximity of the user. Additionally, the users are able to interact with this secure and confidential data in a way that protects the identities of the parties while allowing flexibility of access. Alternatively or additionally, XR tags (or virtual objects) can interact with and respond to virtual representations of the dynamic real objects. This allows the dynamic real objects, such as storefronts, point-of-sale devices, etc., to be visually and physically incorporated in the virtual environment.

Some implementations also provide customized ways to visualize data without having to analyze or understand the raw data. Further, the users are able to access the information from whatever device they have access to, as long as they can authenticate their identity, either through an application executing on their device, or by biometric identification. Since the interaction with the XR tags is through the application, e.g., a payment application, executing on the device, and visible only to the specific user, unauthorized access can be avoided and the payment application can tokenize, encrypt and otherwise protect the financial information involved in the interactions.

In some implementations, the techniques, devices, and systems described herein may be implemented with added security measures to prevent spoofing, enumeration, and/or geo attacks. For example, the XR platform may track location data, orientation data, and/or similar data associated with a client device of a user to confirm that the user who is attempting to trigger a claim action associated with an XR tag is a legitimate user before the claim action is associated with the application executing on the client device. Accordingly, if a fraudster employs spoofing, enumeration, and/or other obfuscation techniques to appear as though they are located proximate to the coordinates associated with an XR tag when, in fact, they are not proximate to the XR tag location, the techniques, devices, and systems described herein may prevent such a fraudulent user from triggering a claim action associated with the XR tag. In this way, fraudulent use of the XR platform (e.g., attempts to exploit the XR platform from remote locations) may be detected and thwarted for improved security and/or leveling the playing field amongst users of the XR platform. The XR platform may additionally, or alternatively, use risk heuristics (e.g., rate limiting the number of claims per time period (e.g., per day) for users) so as to mitigate or reduce fraudulent use of the XR platform.

The technologies and methods described herein aim to drive engagement and growth with customers while providing a new platform or channel to deliver future merchant rewards, marketing, and features based on physical geographical locations. By tracking the location of a customer's payment application and triggering events with geofences (such as a specific global positioning system (GPS) coordinates and a radius, e.g., 50 meters), customers are able to claim rewards when they arrive at a specific "trigger" location. In examples, techniques described herein enable the creation of an experience that drives new user acquisition, that is scalable to deliver cash rewards, merchant rewards, feature flags, or other incentives to users, e.g., for college campus takeovers, special events, conferences, etc., and can be leveraged by customers and merchants alike to create their own XR tags. In some examples, technologies described herein can be gamified such that the collection or interaction of a threshold number of XR tags or particular XR tags can result in certain privileges, claim actions (e.g., with higher value or the like), points, etc. In examples where the collection of XR tags results in points or privileges, technologies described herein can be used to enable users to compete with other users for the most points or privileges. In some examples, specially configured user interfaces can track points or privileges, locations of users relative to one another, or the like.

In some examples, the disclosed XR platform enables friction-less purchasing technology, by allowing a customer to use a customer device (e.g., a mobile phone) to place an order for items, apply for loan, apply coupons, settle invoices, through interaction with XR tags associated with a "merchant system" (brick-and-mortar or online), without creating an account or signing in to an account with the merchant. Instead, the customer device and/or a payment service, through the friction-less purchasing technology, automatically populates a payment field (such as an online interactive payment button) by interaction with the XR tags. In some embodiments, the friction-less purchasing technology enables a customer to order items or apply coupons from a merchant application ("requesting application") on a mobile device by using a mobile payment application, e.g., a forum, a social networking website, a landing page, or an application installed on the same mobile device as the application associated with the payment method or checkout option. As described above, the disclosed technology enhances the checkout experience for customers by removing account registration and sign-in barriers. Because the disclosed technology uses mapping or association between an XR tag and one or more payment cards or bank accounts to process payment requests from merchant systems, customers provide minimal information to complete the payment process. That is, transactions can be processed with less data than is used in conventional techniques. Moreover, the disclosed technology enables the payment process to be completed in a shorter amount of time than is used in conventional techniques. The more interactive fields required for processing payments, the more interaction energy is required from the client device and the consumer. The friction-less purchasing technology reduces the overall interaction time to less than 40 seconds by removing the need to register or sign-in every single time a customer participates in a transaction. While the embodiments described herein may relate to shopping at any e-commerce location, including brick-and-mortar retail stores using point-of-sale terminals, for example at self-checkout terminals, it will be understood that the embodiments can be extended to online shopping via merchant websites or applications.

Various embodiments and implementations of the disclosed XR platform are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, virtual reality, or "VR," systems create a simulated environment for a user to experience. This can be done by presenting computer-generated image data to the user through a head-mounted display. This image data creates a sensory experience which immerses the user in the simulated environment. A virtual reality scenario typically involves presentation of only computer-generated image data rather than also including actual real-world image data. Augmented reality systems generally supplement a real-world environment with simulated, multi-dimensional, and interactive elements. For example, augmented reality, or "AR," systems may provide a user with a view of the surrounding real-world environment via a head-mounted display. However, computer-generated image data can also be presented on the display to enhance the real-world environment. This computer-generated image data can include elements which are contextually-related to the real-world environment. Such elements can include simulated text, images, objects, etc. Mixed reality, or "MR," systems are a type of AR system which also introduce simulated objects into a real-world environment, but these objects typically feature a greater degree of interactivity. The simulated elements can often times be interactive in real time.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element-irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of the Figures and Claims.

FIG. 1 is an example environment 100 for implementing an XR platform (or "XR platform"), for e.g., generating, placing, applying, capturing and/or claiming XR tags as described herein. As depicted, the example environment 100 may include users, such as the user 102(1) and the user 102(2) (collectively 102). The user 102(1) is shown as being associated with one or more computing devices 104(1) to 104(N) (collectively 104), where N can be any suitable integer. Meanwhile, the user 102(2) is shown as being associated with a computing device 106(2) (merchant computing devices 106(1) and 106(2) are collectively referred to herein as merchant devices 106). The computing devices 104, 106 (sometimes referred to herein as "client devices," "user devices," or "electronic devices") may be configured in a variety of ways. In one example use case, the user 102(1) is a customer, while user 102(2) is a merchant, and as such the customer device 104 and merchant device 106(2) associated with user 102(1) and user 102(2), respectively, may offer different functionalities based on use cases of the XR technology. In one example, the computing device 104 may employ a housing and may be configured in a mobile form factor. The mobile form factor, for instance, may include a tablet computer 104(N), a mobile phone 104(2), portable game device, wearable device 104(1) (e.g., glasses configured to function as a display device that is wearable by a user), or other body-mounted computing device(s), AR device(s), VR device(s), MR device(s), server(s), Internet of Things (IoT) device(s), and combination of the foregoing. However, a wide variety of other form factors are also contemplated, such as computer and television form factors. Accordingly, the computing devices 104 and 106 may range from full resource devices with substantial memory and processor resources (e.g., personal computers, game consoles, etc.) to low-resource devices with limited memory and/or processing resources (e.g., televisions, net books, etc.). Additionally, although example computing devices 104, 106 are shown, the computing device 104, 106 may be representative of a plurality of different devices, such as user-wearable headsets, helmets or glasses, goggles, handheld devices, and so on. The "XR technology" described herein can execute as a software, hardware or firmware application on device 106 (e.g. a merchant device), device 104 (e.g., a customer device), a standalone device, such as a payment beacon, a payment reader, point-of-sale device, etc., or all of the above, for example as instances of a single application (e.g., XR application). The components executing the XR technology can be collectively referred to as an XR platform and are reflected in environment 100. The standalone device can also be a device designed solely for mobile XR technology, such as glasses, headsets, or other such wearables or any other devices having connection capabilities to networks such as the Internet. The device can also be a user device, such as a mobile device including, for example a smart phone, a tablet, a laptop, or the like, which includes a display device (e.g., a user interface, an image or video capturing component, such as a camera, a screen, a display, etc.) and an application for using XR, for example to create, capture, claim, and/or edit the XR tags 108 (described later). The application can be provided by a service provider or any appropriate party such that users may choose to download or install and run the application on the user device 104, 106, or install a portion of the XR application via instant application technology. In the example of FIG. 1, an instance of such an application 110 is depicted as executing on the client device 104(2).

In FIG. 1, server(s) 112 can be a payment processing server (PPS), which can communicate with computing devices, such as a computing device 104 and a computing device 106, where devices 104 and 106 are network-connected devices that enable end users (e.g., a customer and a merchant, respectively) to access services provided by the PPS 112 via a network 114. Additional details associated with the PPS 112, the computing devices (e.g., 104, 106), and the network(s) 114 are described below with reference to FIGS. 10-14.

In some examples, the service provider associated with the PPS 112 can be a payment service provider such that the XR platform comprises an XR payment platform from which the generation, placement, capture, and/or claiming of XR tags described herein can be implemented. Accordingly, the environment 100 illustrated in FIG. 1 can accommodate transactions involving payment cards such as debit cards, credit cards, prepaid cards, bank accounts, payment proxies, mobile payment applications and the like. The example application 110 in FIG. 1 may represent a mobile payment application. In some examples, the application 110 may include an XR component 116 configured to generate, place and/or capture XR tags 108. The mobile payment application including XR component 116 can include an electronic wallet application, money transfer application (e.g., application for sending and receiving money via email or phone), or any other application having an account identifier (such as the payment proxy) that is linked to one or more payment cards and/or bank accounts and can be used by the owner of the mobile device 104 to initiate transactions. Such transactions can include traditional purchase transactions between customers and merchants or service providers, P2P transactions, and the like.

In addition to the computing devices 104, 106 and the PPS 112, the environment 100 can also include additional devices and systems, such as a computer system of a merchant's acquirer (hereinafter "acquirer"), a computer system of an issuing bank (hereinafter "issuer"), a computer system of a card payment network (hereinafter "card payment network"), and/or any other suitable computer system. Each of the aforementioned computer systems can include one or more distinct physical computers and/or other processing devices, which, in the case of multiple devices, can be connected to each other through one or more wired and/or wireless networks. All of the aforementioned devices are configured to be coupled to each other through a network 114, which can be, or include, the Internet and one or more wired or wireless networks (e.g., a Wi-Fi network, Bluetooth, Bluetooth Low Energy, an near-field communication (NFC) network, a cloud network, and/or a cellular telecommunications network). In some cases, a mobile device 104 may be connected to a device 106 on a network protocol (Bluetooth) different from the network protocol (Wi-Fi) between the computing devices 104, 106 and the PPS 112.

In at least one example, the computing devices 106 can be merchant devices, such as a point-of-sale device or kiosk sometimes associated with additional devices, such as payment readers, where the merchant devices are operable by merchants 118 (FIG. 1 depicts two example merchants 118(1) and 118(2) (collectively 118)) for processing transactions between the merchant and one or more customers at a point-of-sale, e.g., using the payment readers. Such transactions can be associated with the sale (or other transfer of possession) of items between the user 102(1) and user 102(2), such as between a merchant and a customer. In another example, the computing device 106 can be a merchant device and the computing device 104 can be a customer device, where the merchant and the customer perform frictionless or near-frictionless transactions via the devices 104 and 106, e.g., the customer provides a personal identification number (PIN, payment proxy, or the like) and receives a receipt of a transaction through the customer device 104, and the merchant device accepts payment through the merchant device 106. In yet another example, the computing devices 104 and 106 can be user devices interacting with each other in a P2P transaction.

The computing devices 104 (e.g., the computing device 104(1)) may further include a display device that is at least partially transparent. While this description focuses on enhanced capabilities of the computing devices 104 as per the present subject matter, it will be understood that similar capabilities may be embedded in computing devices 106. Going back to computing device 104, the transparency of the display device, in some examples, allows at least a portion of the physical surroundings of the computing device 104 to be viewed through the computing device 104(1).

The display device of the computing device 104(1) may also be configured to output a user interface 120 depicting an augmentation of an XR tag 108 (e.g., a VR object, an AR object, a MR object, etc.). In some examples, the XR tag 108 is viewable concurrently with a portion of the physical surroundings of the computing device 104 (e.g., the real-world). The XR tags 108 can include objects, images, graphics, videos, texts, or a combination thereof, that are digitally rendered or synthesized to be presented in the XR environment 100 to be perceived by a human user of a real environment. The XR tags 108 can be images, graphics, or markers superimposed with computer-generated images (examples, QR codes, barcodes, images, videos, text, or similar markers). Further, the XR tags 108 can be in the form of an object, audio representation (e.g., a snippet of a song), visual representations (e.g., avatars) crafted specific to the user 102, merchant 118, and/or can be functional. In some examples, the XR tags 108 can cater to a particular purpose, e.g., a bill, note, coin, etc., to indicate that the XR tags 108, when captured, may initiate a payment specific action. The XR tags 108 can be financial data, payment object information, or otherwise indicative of such data. The XR tags 108 are also capable of interacting with software downloaded to a computing device equipped with a camera (e.g., a webcam) or other image capturing device to create 3D (or many dimensional) images overlaid on the real-world image seen on a display of a user device 104, 106. The XR tags 108 may be used to support a variety of different functionality (e.g., "claim actions"), which can be triggered conditionally, e.g., when a user of the computing device 104 has arrived at a certain location or more generally, when a predefined context or condition is satisfied or otherwise met.

The XR tags 108 can have contextual relevance or awareness in relation to the user, characteristics or events of the physical world and/or a certain time/time period. XR tags 108 can also have social relevance to the physical world and/or to the user accessing the XR platform. The XR platform may be configured to generate a representation of the physical environment associated with the physical world (e.g., a physical location, reality, real-world environment, etc.). The representation of the physical environment can include an image, a video, a live video, a recorded video, a video stream of the physical environment. In general, the representation of the physical environment can include any photorealistic production or reproduction of the physical environment. For example, the representation of the physical environment can be digitally rendered or in part or in whole digitally created, synthesized or illustrated. As disclosed herein, the XR tags 108 are interactable, which means they are depicted or rendered in the XR environment 100 to serve a function or purpose in the real-world. In some examples, such functions or purposes can be referred to as "claim actions" which can include, but are not limited to, coupons, rewards, tickets, avatars, information about a merchant, things, feedback to a service, etc. However, in some implementations, the XR tags 108 can be vanity or entertainment objects with little or no interactivity, such as emojis, gifs, etc. For interactable XR tags 108, interaction with the XR tags 108 can enhance the experience for a user(s) 102 involved in a commercial activity, such as a payment transaction or a P2P financial transfer.

The computing device 104 can also include an input/output component that may be configured to receive inputs from a keyboard, mouse, handheld controller(s), touch interface, sensory interface, to recognize gestures and cause operations to be performed that correspond to the gestures, and so on. For example, the input/output component of the computing device 104 may be configured to recognize an input received via touchscreen functionality of a display device of the computing device 104, such as a touch input, from a stylus, hovering above the device, and other movements. Other examples of input include tracking other biometric information, such as pupils and blinks of the user's eyes, movement of the computing device 104 and/or an input device/controller (e.g., tilting and/or shaking), and so forth. In implementations, these inputs may be recognized as gestures that are configured to initiate one or more operations of the computing device 104 or other device, such as to navigate through a user interface, select and/or move objects displayed in the user interface, and so on.

The computing device 104 can also include the XR component 116 mentioned above. In some examples, the XR component 116 is part of a mobile application 110 or web application associated with the PPS 112 and already downloaded or downloadable on a user device, such as computing device 104. In some examples, the XR component 116 is initialized, e.g., as an instant application, App Clip®, or progressive web application, when a certain context is satisfied or otherwise met (e.g., when a customer 102(1) walks into a store of a merchant 118, is within a designated geofence, etc.). In an implementation, the XR component 116 is an instance of, or associated with, an XR management component 122 on the PPS 112. As such, the XR component 116 executing on local devices can mirror a most current version of XR management component 122. In one implementation, the XR management component 122 manages all instances of XR component 116 executing on user devices 104, 106 and so on, and pings and updates the XR component 116 constantly or at predefined time intervals with most current data pertaining to the user operating the device, and/or based on other users relevant to the device and user. The XR component 116 can be used to generate, place, capture, and/or claim XR tags 108.

In one example, the XR component 116 operates using specifications of XR tags 108 defined in a local rule base 124 (in some instances, a copy of the rule base 124 can be stored centrally on the PPS 112 as well or only on the PPS 112 and accessed locally on device 104 and/or 106 when needed). The rule base 124 when stored centrally can be stored in data store(s) 126 (or "database(s)"). The data store(s) 126 can store, among other types of data as described herein, user data 128 (e.g., user profiles), merchant data 130 (e.g., inventory records, catalog data, etc.), and/or XR data 132. In one example, the XR data 132 includes the XR tags 108 generated by a user, e.g., a user of the computing device 106(1), such as what images, videos, text, to display along with the XR tags 108. FIG. 1 illustrates how XR tags 108 can be created through the specification of a definition 134 and/or one or more rules 136, which are stored in the XR data 132 once specified. The definition 134 and/or the rule(s) 136 may specify one or more conditions that, when satisfied, trigger the generation, placement, capture, and/or claiming of the XR tags 108. For example, the definition 134 and/or the rule(s) 136 may make up a specification set, including but not limited to: specifications related to a specific interaction that triggers a claim action; an action that gets triggered when a user 102 interacts with the XR tag 108 with their user device 104, 106 (e.g., accesses an application on the phone, causes a specific application to be downloaded on the phone, etc.); and a rule set that checks user 102 and/or device 104, 106 specifications to determine whether the XR tag 108 can be generated, placed, and or be allowed to be captured by the specific merchant 118, user 102, or device 104, 106, and so on. Accordingly, in the process of generating an XR tag 108, a definition 134 of the XR tag 108 and/or one or more rules 136 applicable to the XR tag 108 may be obtained (e.g., via a user interface of an application 110 executing on a client device 104, 106), and information may be embedded in the XR tag 108 in accordance with the definition 134. In some examples, the rule(s) 136 may allow for customizing the embedded information, such as by customizing the embedded information to client devices 104, 106 that are accessing the XR tag 108 and/or to users 102 of those client devices 104, 106. The XR data 132 may include data related to what happens when the XR tags 108 are captured and/or claimed, e.g., incentives that are generated, what incentives or rewards apply to which inventory items, time restrictions with such incentives, and so on.

In an example, the user data 128 can include a user registry, which may also include user profiles and/or include associations between user profiles and merchant profiles. For instance, a user profile of the user 102(1) (e.g., a customer) can store payment data associated with payment instrument(s) of the customer. In some examples, an account maintained by the payment processing service provider on behalf of the customer can be mapped to, or otherwise associated with, the user profile of the customer. Such an account can store funds received from P2P payment transactions, deposits from employers, transfers from other accounts of the customer, and so on. Additionally or alternatively, a user profile of a merchant 118 can be mapped to, or otherwise associated with, an account of the merchant 118 (which can be maintained by the payment processing service provider, a bank, or another payment service). In one example, the data store 126 can store such information in one more dedicated data structures, such as a data structure associated with the merchant data 130. The data structure associated with the user data 128 may store user information, such as information about a balance or credit limit associated with the payment account associated with the users, a usage history of the payment account, one or more reward offers connected to the payment account, a type of the payment account, other suitable information, or any combination thereof. The data structure associated with the merchant data 130 can store information associated with a plurality of merchants 118. The information associated with a merchant 118 may comprise biographical information, a location associated with the merchant 118, a type of business the merchant 118 engages in, information about products or services offered by the merchant 118, a customer base of the merchant 118, customer reviews of the merchant 118, a transaction history, a history of promotions or offers, a rating, other suitable information, or any combination thereof. Additional details associated with user profiles and/or stored data are described below with reference to FIG. 12.

The data structure associated with the XR data 132 may store data related to "claim actions," as described herein. For example, in one implementation, the claim action can relate to an incentive(s), such as one or more reward offers. Each reward offer may be associated with at least one of the merchants 118. A reward offer may be applicable to one merchant 118, multiple merchants 118, a category of merchants 118, merchants 118 of a particular location, or all merchants 118. A reward offer may cause a discount to the price of a product or service, a rebate after a payment is made, a gift to be given out, another suitable benefit, or any combination thereof. The data structure associated with the XR data 132 may store a value or percentage of price associated with each reward offer. The data structure associated with the XR data 132 may also store one or more criteria or conditions to be satisfied before a reward offer can be redeemed. Each reward offer may be associated with a time limit, a use duration or rate limit (e.g., once per hour, a number of claim actions per day, etc.) after which the reward offer is expired, or temporarily deactivated such that future payment actions (swipe, dip, tap) at the point-of-sale will not cause the reward to apply to the purchase. In particular embodiments, one or more of the data stores 126 may store information (e.g., in the XR data 132) associated with one or more connections between one or more reward offers with one or more payment accounts. Each connection may indicate an association or assignment by the user 102(1) of a reward offer to the user's payment account. As described herein, XR tags can be associated with a variety of claim actions.

In at least one example, the PPS 112 can expose functionality and/or services described herein, including XR tag generation, placement and capture, claiming, etc. via one or more APIs 146, thereby enabling functionality and/or services described herein to be integrated into various functional components of the XR platform. The API(s) 146, which can be associated with the PPS 112, can expose functionality described herein and/or avail payment processing services to various functional components associated with the XR platform. At least one of the API(s) 146 can be a private API, thereby availing services and/or functionalities to functional components (e.g., applications, etc.) that are developed internally (e.g., by developers associated with the payment processing service provider). At least one of the API(s) 146 can be an open or public API, which is a publicly available API that provides third-party developers (e.g., social media service providers described herein) with programmatic access to a proprietary software application or web service of the payment processing service provider. That is, the open or public API(s) 146 can enable functionality and/or services of the payment processing service provider to be integrated into multimedia content platforms. The API(s) 146 can include sets of requirements that govern how applications, or other functional components, can interact with one another.

In some examples, the payment processing service provider can provide third-party entities with a software developer kit ("SDK") that may utilize functionality exposed by the API(s) 146. The SDK can include software development tools that allow a third-party developer (i.e., a developer that is separate from the payment processing service provider) to include functionality and/or avail services as descried herein. The SDK and/or the API(s) 146 may include one or more libraries, programming code, executables, other utilities, and documentation that allows a developer to directly include functionality and/or avail services described herein within an application, such as third-party applications providing social networking services, as described herein.

In one implementation, the XR management component 122 controls the instances of XR component 116 executing on devices 104 and 106. As such, in one example, when a merchant 118, e.g., 118(1), creates the XR tags 108, the XR tags 108, conditions triggering the XR tags 108, and merchant profile, can be associated with a central server, such as within the PPS 112 in the XR management component 122. The PPS 112 may also include a payment component 138 and other component(s), such as a generation component 140, a placement component 142, and an association component 144. The payment component 138 can, among other things, process transactions. That is, in at least one example, the payment component 138 can access payment data associated with a user, send a request for authorization of the payment data to a payment service provider (e.g., a card network, a financial organization, etc.), and process a transaction based on a response to the authorization request, for example in response to capturing and/or claiming of the XR tag 108. In other examples, the payment component 138 can access an account maintained by the PPS 112 and can use funds associated with the account to process a transaction.

GENERATION OF XR TAGS: The XR component 116 and/or the generation component 140 may be configured to generate the XR tags 108, for example, dynamically or at the request of a user (e.g., an authorized user, such as a user 102(2) associated with a merchant 118(2)). The generation component 140 can include image rendering algorithms, 3D algorithms, and/or the like for generating XR tags 108. In some examples, the XR component 116 and/or the generation component 140 may be configured to integrate XR tags 108 with real-world content for video creation and display on a user device 104, 106. For instance, the XR component 116 and/or the generation component 140 may configure user devices 104, 106 to capture a background image(s) using a camera(s) or other image capture device associated with the user device 104, 106 and to reconstruct the XR tag 108. In some examples, the XR component 116 and/or the generation component 140 may configure user devices 104, 106 to utilize a depth API in conjunction with a depth/ranging component(s) (e.g., a Light Detection and Ranging (LiDAR) scanner(s)) to determine per-pixel depth information about the surrounding environment, create a 3D mesh of the surrounding environment (e.g., floors, walls, ceilings, windows, doors, etc.), and/or combine the depth information with the 3D mesh to render the XR tag 108 as a virtual object with occlusion that looks realistic (e.g., by instantly rendering the XR tag 108 and blending the XR tag 108 with real-world objects in the scene. In some examples, the XR component 116 and/or the generation component 140 may implement real-world physics to the XR tag 108, so as to cause the XR tag 108 to appear as though it is falling and/or tipping over under the force of gravity, as appropriate for the circumstances (e.g., if a real-world object collides with the XR tag 108, causing the XR tag 108 to move, deform, etc.). In some examples, a generated XR tag 108 can be configured to be rendered on planar surfaces of a real-world environment by detecting the planar surfaces using a depth/ranging component(s) (e.g., a LiDAR scanner(s)) associated with the user device 104, 106. In one example, XR tags 108 can be generated dynamically, for example, without a user explicitly requesting the creation of the XR tag 108 or otherwise providing a definition 134 and rules 136 for the XR tag 108. For instance, an XR tag 108 may be generated automatically or on-the-fly, e.g., specific to the trigger event and other context derived from this specific trigger event and criteria. To illustrate, a merchant 118 may authorize real-time generation of an XR tag 108 specifically for a user in response to determining that the user is a frequent shopper as a way to extend a reward to the user and retain their business. In some examples, the XR component 116 is configured to generate definitions 134 pertaining to the visual features, shape and form of the XR tags 108, and the functionality, if any, embedded in the XR tags 108. For example, an XR tag 108 can take the form of a bill, a pot of gold, or the like, indicating a claim action associated with an incentive (e.g., a monetary reward) that is to be applied to a subsequent payment transaction of which the user who "captures" the XR tag 108 is a party. That is, the claim action associated with the XR tag 108 can generate a static or dynamic incentive. In such examples, when a PPS 112 receives, from a client device 104 of a user 102, coordinates associated with the XR tag 108, the PPS 112 may identify an incentive correlated with the coordinates, and associate the incentive to an application 110 executing on the client device 104, wherein the incentive is configured to be applied to a subsequent payment transaction of which the user 102 is a party. In some examples, the generation of the static or dynamic incentive and/or the incentive itself can be determined based at least in part on context data 150. The associating of the incentive to the application 110 may occur upon receiving an indication that the user 104 has interacted with an XR tag 108 to trigger a claim action(s) associated therewith.

The term "generation" can also include augmentation. A user 102, for instance, may leverage a computing device 104, 106 having a mobile form factor (e.g., mobile phone, tablet, wearable computing device, and so forth) to compute and output an augmentation of the XR tag 108 for display on computing devices, such as computing device 104 and computing device 106. As described earlier, the computing device 104 (e.g., computing device 104(1)) may include a display device that is at least partially transparent such that the physical surroundings of the computing device 104 are viewable through the display device, such as a portion of the physical environment. The augmentation may also be displayed by the display device of the computing device 104 to be viewable concurrently with the portion of the physical environment, such as to use auto-stereoscopic techniques to support viewing in three dimensions. Thus, the augmentation of the XR tags 108 may expand a user's experience with the physical environment. This is described with examples in FIGS. 4A-4G.

Each XR tag 108 may additionally have associated therewith a rule base 124 indicating one or more of: (a) "claim actions" in response to a specific interaction with the XR tag 108, discussed later with respect to capturing of XR tags 108 (e.g., a user capturing the XR tag 108 with a phone); (b) context under which the claim action is triggered (such as location restrictions, user restrictions, timing restrictions; hardware restrictions); (c) interaction specifications (tap, gesture, voice authentication, etc.); and (d) placement rules, e.g., where and when the claim action should be placed in the display device of the computing device 104 and/or relative to the real-world environment, for example.

The claim action relates to an action that gets triggered when the user 102(1) interacts with the XR tag 108 with their computing device 104 (e.g., opens an application on the phone, causes a specific application to be downloaded on the phone, etc.). In one implementation, the claim actions may vary based on the environment in which the XR tags 108 are implemented. For example, in the retail environment, the claim actions may include creating and applying coupons, automatically paying for the items in the cart, making appointments, authorizing actions such as providing approvals or shifts for pay calculations, obtaining pay after shifts, making appointments, applying for loan or cash advances, and so on. In a restaurant environment, the claim actions may include creating coupons, automatically paying for a meal or order, making appointments (e.g., reservations) for a future time at the restaurant or a different restaurant, information about menu items, adding services to the existing services, and so on. In a P2P environment, the claim actions may include automatically crediting assets (e.g., money, stocks, cryptocurrency, etc.) into someone's account, automatically debiting assets (e.g., money, stocks, cryptocurrency, etc.) from someone's account, creating send/receive money requests, automatically purchasing assets (e.g., money, stocks, cryptocurrency, etc.), automatically selling assets (e.g., money, stocks, cryptocurrency, etc.), and so on. In a lending environment, the actions may include automatically creating send/receive loan requests, generating loan offers in real-time, allowing data capture to facilitate generation of loan offers, receiving loan incentives, and so on. In a media environment, the actions may include automatically downloading a full version of a media object (e.g., song, video, etc.), receiving an artist-related incentive (e.g., a limited-edition album, artist merchandize, concert tickets, fan experience, etc.), information about an album or songs etc., receiving tips from an audience (e.g., artists receiving tips from a concert audience, etc.), etc. In some scenarios, there may be several claim actions associated with a single XR tag 108 or several XR tags 108 associated with a single claim action.

The context relates to conditions that are checked (such as user and/or device specifications, time of validity, location) to determine whether the XR tag 108 can be generated, placed, and or be allowed to be captured by the specific merchant, user, or device, and so on, in response to the interaction.

The interaction refers to a user input, e.g., via tap, gesture, swipe, pinch, etc., that allows the claim action to be triggered. In some implementations, a user 102(2) has the flexibility to define XR tags 108, e.g., in terms of their format, location, context, time of validity, and conditions under which they want the XR tags 108 to be generated. In some implementations, a user 102(2) has the flexibility to define placement rules related to XR tags 108, e.g., where the XR tags 108 should be placed, when the XR tags 108 should be placed, and what device features should be used to place the XR tags 108. In some embodiments, the placement component 142 can suggest placement rules (e.g., placement rules in three dimensions).

The XR component 116 can define the XR tags 108 either through explicit input from the user 102 or automatically based on machine learning applied on users, user devices, locations, user identities, etc. For example, in one case, the XR component 116 generates XR tags 108 based on what other users similar to user 102 have historically generated or are currently generating. The user 102 can generate the XR tags 108 via a unique user interface surfaced by the XR component 116 or application 110 executing on the user device 104, 106. The XR component 116 can allow full-fledged customization or allow the user to pick and choose from pre-existing templates. In some examples, the XR tags 108 can be generated by generative artificial intelligence (AI) models. The generative AI models can train models (e.g., generative adversarial network (GAN) models) on visual data, text data, audio data, or the like to generate corresponding XR tags for specific use cases. During training of the models, a discriminator may be used to evaluate the performance of the model in generating an XR tag. Further in some cases, the generation of XR tags can be responsive to a text input, audio/visual input, haptic input into a generative AT model.

PLACEMENT OF XR TAGS: In some embodiments, the placement component 142 can enable placement of the XR tags 108 at merchant locations and/or for customers in its ecosystem. In some embodiments, the placement may be specific to users, locations or even for specific use cases. To this end, the placement component 142 can access an internal knowledge and rule base 124, to determine whether a specific condition is met, satisfied, or the like to trigger the generation and/or placement of XR tags 108, as defined in the rule base 124 (e.g., in placement rules). For example, the XR platform can determine whether a user (e.g., a merchant, customer, etc.) has arrived at a certain location, e.g., where a customer is present, or even within a geofence of a location, when the XR platform places the XR tag 108. The XR tag 108 can also be placed at a specific time. More generally, the placement component 142 can place the XR tag 108 when a specific event happens. The placement component 142 can track the customer location vis-à-vis a merchant location, and dynamically offer XR tags 108 relevant to the customer, merchant, time of the day, occasion, and so on. In some implementations, techniques, such as geofencing, can be used to determine whether a certain condition is met. For example, if the user has crossed a boundary to enter another boundary. Accordingly, the placement component 142 can generate the XR tags 108 when that condition(s) is/are satisfied or otherwise met. In some example scenarios, the placement component 142 can automatically place and distribute the XR tags 108 to a select number of merchants or merchant locations. In some examples, XR tags 108 can be positioned in real environments, which can be associated with merchant brick-and-mortar stores or not. In some examples, XR tags 108 can be positioned in virtual environments, such as in association with merchant websites, virtual storefronts, or the like. In some implementations, the XR tag generation and/or placement rules can be manually applied to all merchants in the ecosystem of the XR platform. Alternatively, the XR tags 108 can be generated and/or placed for a specific set of merchants or customers, identified, e.g., based on commonalities and segmentations, such as item classification, customer classification, merchant classification described by, e.g., merchant category code (MCC), location, area of business, merchant preferences, and so on. In some examples, an XR tag 108 can be particular to a merchant, a group of merchants (e.g., offering the same products or services, having a similar geolocation, in the same MCC, etc.), a service provider, or the like. The automation as described herein can be implemented using machine learning, such as deep learning algorithms.

In another embodiment, and with reference again to FIG. 1, the XR component 116 and/or the placement component 142 is configured to place the XR tags 108 at relevant locations and/or for relevant users in an environment 100, e.g., using placement rules. Alternatively, the placement may be specific to users, locations or even for specific use cases. To this end, the XR component 116 can access the rule base 124 (an instance of which may also be stored in database 126), to determine whether a specific condition is met to trigger the generation and/or placement of XR tags 108. For example, the XR component 116 can determine whether a user (e.g., a merchant, customer, etc.) has arrived at a certain location, e.g., where a customer is present, or even within a geofence 148 of a location, when the XR component 116 places the XR tag 108. The XR tag 108 can also be placed at a specific time. More generally, the XR component 116 can generate the XR tag 108 when a specific event happens. The XR component 116 can track the customer location vis-à-vis a merchant location, and dynamically offer XR tags 108 relevant to customer, merchant, time of the day, occasion, and so on. In some implementations, techniques, such as geofencing, can be used to determine whether a certain condition is satisfied or otherwise met. For example, if the user 102(1) has crossed a boundary to enter another boundary. Accordingly, the XR component 116 can generate the XR tags 108 when that condition is satisfied or otherwise met. In some example scenarios, the XR component 116 can automatically distribute the XR tags 108 to a select number of merchants 118 or merchant locations. In some examples, a determination as to whether a condition(s) is met to render the XR tag 108 for a given user 102(1) is based at least in part on context data 150. This context data 150 may be processed locally on the client device 104 (e.g., by the XR component 116) and/or remotely at the PPS 112 (e.g., by the placement component 142). The context data 150 may include location data (e.g., coordinates, such as GPS coordinates specified as latitude, longitude, etc.), device data associated with the client device 104 (e.g., a device identifier, device specification, such as operating system (OS) type and/or version, etc.), user application data, account data associated with the user 102(1) (e.g., a financial/spending account maintained in the user data 128), user data associated with the user 102(1) (e.g., a user identifier, user preferences, etc.), merchant data associated with a merchant 118 (e.g., if the client device 104 is within a geofence 148 associated with a particular merchant 118), environment data, time/date data, and/or the like.

In some implementations, the rule base 124, which may include generation and/or placement rules, can be manually applied to all merchants 118 in the ecosystem of the XR platform via the XR component 116. Alternatively, the XR tags 108 can be generated and/or placed for a specific set of merchants 118 or customers, identified, e.g., based on commonalties and segmentations, such as item classification, customer classification, merchant classification described by, e.g., MCC, location, area of business, merchant preferences, and so on. The automation as described herein can be implemented using machine learning, such as deep learning algorithms. In at least one example, data model can be trained via a machine learning mechanism. In such an example, the model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model can be trained on training data associated with a plurality of merchants 118. Inputs to the model may comprise order data and merchant data 130 relating to an individual merchant 118. As output, the model may identify a third-party service that is most likely to be used by a merchant 118 having characteristics and associated data that are like the individual merchant 118. The model can be trained using historical order data. Machine-trained models may be used in a like manner to determine most likely selections by a merchant 118 of menu items and vendor items, and the rates at which a merchant 118 is likely to order different product items. In some cases, training data may also include indications of similarities (e.g., similarity metrics) between merchants 118, in these cases, the machine-trained model can output a similarity metric indicating a similarity between two merchants (e.g., merchant 118(1) and merchant 118(2)), which can be based on merchant data 130 associated with the two merchants 118. The models can make recommendations as to where a specific merchant 118 should generate and/or place the XR tags 108 based on historical and behavioral data from similar merchants 118 and customers.

In a merchant-customer use case, a merchant, e.g., merchant 118(2), may place XR tags 108 (e.g., XR rewards only available to a user within the merchant's store geofence 148). A customer, e.g., customer 102(1), may capture the XR tags 108 placed by the merchant 118(2) when the customer 102(1) enters the merchant's store geofence 148. For example, when the customer 102(1) enters the geofence 148 with their device 104, the XR component 116 within the computing device 104 may augment a view of the physical surroundings (e.g., the "real-world") of the computing device 104 using the display device. For instance, the computing device 104 may be physically positioned in surroundings that include a merchant's store. In one example, XR component 116 is configured to output, via the user interface 120, the XR tag 108 (e.g., shown as a pot of gold in FIG. 1) to be viewed in conjunction with the physical surroundings when a predefined context is met (e.g., when the customer 102(1) is within a threshold distance of a merchant 118(2) store). In one example, the XR component 116 can also include additional information regarding the claim action, such as text information indicating that an incentive is $5 off, 10% off today, and features/elements to allow the customer 102(1) to interact with the XR tag 108, e.g., claim the incentive, add to a virtual wallet, apply to an online transaction, and so on.

To generate this view (e.g., the user interface 120) and to know "where" to place to augmentation, the XR component 116 may leverage a variety of techniques to determine an orientation and/or position of the computing device 104 in relation to the physical surroundings of the device 104. In the merchant-customer example here, the merchant (e.g., merchant 118(2)) can set such conditions in advance in the XR component 116. For example, the XR component 116 may leverage a camera of the computing device 104 to capture images of the physical surroundings. The XR component 116 may then process the images to locate one or more markers to determine how the computing device 104 is positioned, oriented, moved, and so on, and whether those markers trigger pre-defined conditions. For example, the XR component 116 may set one or more viewpoints in the physical surroundings as markers and thus serve as a basis to determine orientation and/or positioning, such as latitude, longitude of the physical store. In another instance, the XR component 116 may leverage a view of one or more XR tags 108 (e.g., as QR codes, barcodes, image markers, other interactable elements, etc.) that are physically positioned within the surrounding environment of the computing device 104. Thus, the items in the physical surroundings of the computing device 104 may act as a basis to determine where the computing device 104 is located as well as how the computing device 104 is oriented. In another example, the camera(s) of the computing device 104 may be configured to capture one or more images of a user 102(1) of the computing device 104. For example, a lens of the camera may act as a proxy for the eye and thereby conserving resources of the computing device 104. In this way, the XR component 116 may determine how to output the XR tags 108 for display and subsequent capture by the display device. The XR component 116 may also leverage other sensors (e.g., sensors of the computing device 104, sensors external to the computing device 104, etc.) to determine a position and/or orientation of the computing device 104, and more particularly a position and/or orientation of the display device of the computing device 104. For example, sensors utilized by the XR component 116 may include a gyroscope, one or more accelerometers, a magnetometer, and so on, including any combination thereof. These sensors may be used to generate a basis with which to determine an orientation and position of the computing device 104 in relation to its physical surroundings. Through one or more of these examples, the XR component 116 may capture a view of the "reality" that is to be augmented, which in one example can be the merchant location where the customer 102(1) goes to shop. The XR tags 108 may then be computed to be displayed at a size, orientation, and location using the display device of the computing device 104. The XR tags 108 may be configured in a variety of ways, such as for two-dimensional output, three-dimensional output, and so on. For example, the XR component 116 and the display device of the computing device 104 may leverage stereoscopic techniques to give a perception of depth to the augmentation. Further, it should be readily apparent that augmentations generated by the XR component 116 may assume a variety of other forms.

CAPTURING AND CLAIMING OF XR TAGS: Once an XR tag 108 is generated and placed, in some embodiments, the association component 144 can enable "capturing" of the XR tags 108. In some examples, a user can "capture" an XR tag 108 by taking a picture of the XR tag 108, e.g., using a camera or other image capturing device associated with a user device 104, 106, interacting with the XR tag 108 (e.g., via a tap or other interaction using a user device 104, 106), pointing a device (e.g., a camera of a user device 104, 106) in the direction of the XR tag 108, scanning an object (virtual or real) in a field of view of the camera, or the like. For example, a customer or P2P user, can capture the XR tags 108 in a payment scene to facilitate payment transactions, e.g., using the payment component 138. Such payment transactions may manifest between a merchant and the customer at a merchant location, e.g., brick-and-mortar or merchant website, or between two users, for example to furnish a P2P payment transaction. After an XR tag 108 is captured, the XR tag 108 can be "claimed," by a user device 104 which, as described below, can trigger one or more claiming actions. In an example, each XR tag 108 can be associated with one or more claim actions, and the claim action(s) can be defined as part of the generation and/or placement process to effectively embed the claim action in the XR tag 108 such that interaction with the XR tag 108 leads to capturing of the XR tag 108 and initialization of actions embedded therein. The rule base 124 of the XR tag 108 can determine which actions are triggered and when. Such context can also be statically or dynamically associated with the XR tag 108 and surfaced when the capture event occurs. In some scenarios, there may be several claim actions associated with a single XR tag 108 or several XR tags 108 associated with a single claim action. In some examples, context data 150 can be used to determine which claim action should be triggered when an XR tag 108 is captured and claimed. Such context data 150 can include user data 128, merchant data 130, user device data, user application data, user account data, environment data, location data, time/date data, and/or the like.

The XR tags 108 when captured, say by another device executing an XR application, can also be claimed by a user device through triggering of one or more "claim actions," such as claim actions that facilitate payments as mentioned before, generate user or merchant specific actions, generate static or dynamic incentives, activate or deactivate incentives, download information, access information, enable user-specific actions, and so on. In some implementations, the capturing of the XR tags 108 can also manifest in a non-payment context, e.g., to check a balance on a card, check a status of an account, verify a cashflow statement, or check loyalty points associated with a customer account, and so on.

Figure 2D:
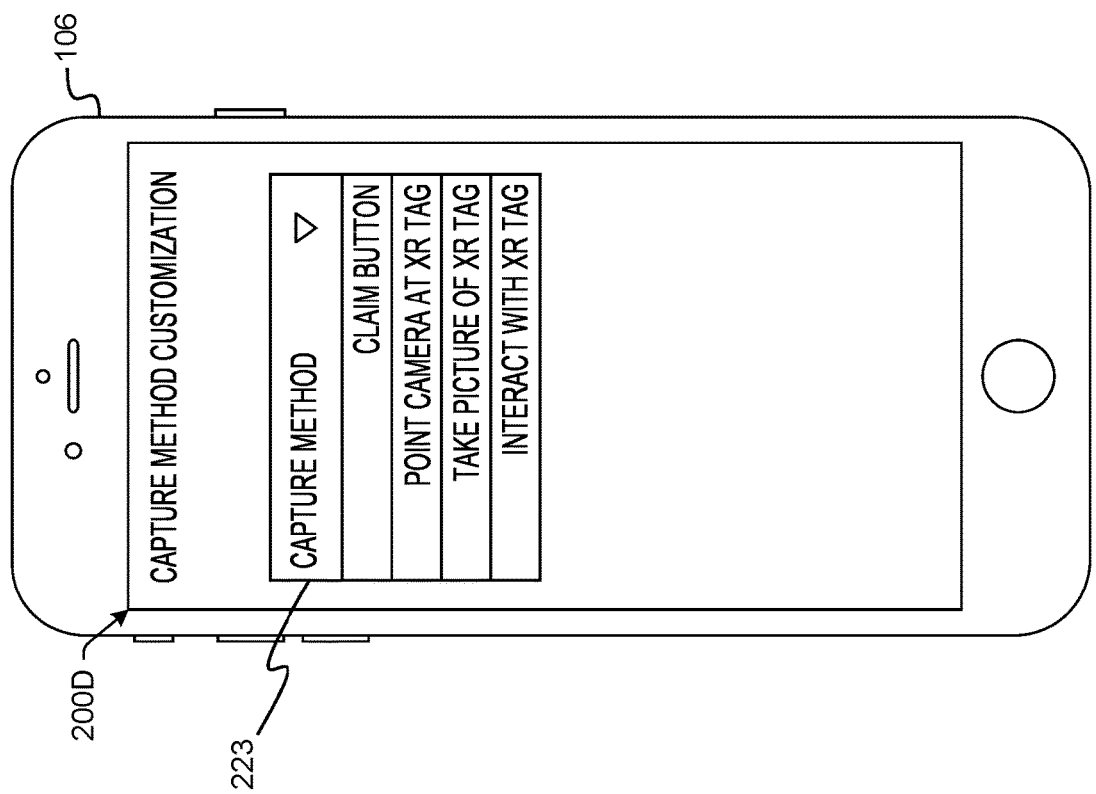
FIG. 2D is another example user interface associated with creating XR tags, according to an implementation of the present subject matter.

FIGS. 2A-2E illustrate user interfaces 200A-200E associated with creating XR tags 108, according to implementations of the present subject matter. Referring to FIG. 2A, the user interface 200A may represent a user interface of the application 110 and/or the XR component 116 executing on a computing device 106 of a user 102. Users can provide user input via the user interfaces described herein (e.g., the user interface 200A) by interacting with various interactive elements of the user interfaces. In some examples, the user interfaces described herein may be presented via a browser, such as a web browser. The user interface 200A may be displayed in response to any suitable event and/or at any suitable time, such as in response to the user 102 selecting an option, via the application 110 and/or the XR component 116, to create a new XR tag 108. In some examples, the user 102 requesting to create anew XR tag 108 is authenticated or otherwise verified (e.g., using credentials, such as a username, password, PIN, etc., biometrics, etc.). The authentication of the user may confirm that the user is an authorized user.

As described above, a "user" as described herein can be a merchant, a customer, a peer, an artist (e.g., a songwriter, publisher of audio or video content, etc.), etc. In the scenario where the user is creating an XR tag 108 on behalf of a merchant 118, the authentication may ensure that the user is authorized by the merchant 118 to create XR tags 108 on behalf of the merchant 118. In some examples, a merchant may utilize the user interfaces 200A-200E to create (e.g., design) XR tags 108 for incentivizing customers to visit a store of the merchant. In another example, a user may utilize the user interfaces 200A-200E to create (e.g., design) XR tags 108 to allow their friends sign up to a program, and when the friends access the XR tags 108, the user may receive referral bonuses. In another example, an artist may utilize the user interfaces 200A-200E to create (e.g., design) XR tags 108 to allow their fans access to merchandize and/or music while attending a concert. In another example, a P2P user may utilize the user interfaces 200A-200E to create customized XR tags 108 for cross border payment where another P2P user receives money when they reach a new country. These are merely examples of using the user interfaces 200A-200E to create XR tags 108.

In the example of FIG. 2A, the user interface 200A presents a first interactive element 202 for specifying at least part of a definition 134 associated with the to-be-created XR tag 108. In the example user interface 200A, the interactive element 202 is in the form of a drop-down menu that allows the user 202 to select one or more parameters of the tag definition 134. The example parameters of the tag definition 134 that are presented in the user interface 200A include, without limitation, a location 204 where the XR tag 108 is to be rendered, an appearance 216 of the XR tag 108 and/or an appearance(s) of additional objects that are to be rendered with the XR tag 108, and a claim action 220 that is configured to be triggered by users who "capture" the XR tag. For example, if the user selects location 204, the user 102 may be able to select a location that is identifiable on a map (e.g., a geographical location), a merchant location that is physical (e.g., a brick-and-mortar store) or virtual (e.g., a merchant website), a location that may change dynamically (e.g., a location of a mobile device, such as a client device 104), or the like. For instance, if the XR tag 108 location is specified as a location of a particular computing device 104, 106 or a particular set of computing devices 104, 106, the XR tag 108 may be rendered for a given user when the user's device moves within a threshold distance of the particular device(s) 104, 106 specified as the tag's location.

In one example, upon selecting location 204 in the user interface 200A, the application 110 and/or the XR component 116 may display the user interface 200B shown in FIG. 2B, enabling the user 102 to indicate where the XR tag 108 should be located or otherwise placed. The example user interface 200B presents a map 206, which may represent a geographical area, and which may be interactive (e.g., the user 102 may provide user input to pan the map up, down, left, or right, zoom in to a smaller geographical area, zoom out to a larger geographical area, etc.). In some examples, the user 102 can provide user input to move a pin 208 to a desired location on the map 206 to specify the location where the XR tag 108 is to be rendered. In some examples, the user interface 200B may present an interactive element 210 that, upon selection, allows the user 102 to set a geofence 148 (See FIG. 1) surrounding a selected location (e.g., the pin 208 on the map 206). A geofence 148, e.g., a GPS coordinate and a radius e.g., 50 meters, is one example way of creating a trigger event for the XR tag 108 to be "capturable" by users in that users who move within the geofence 148 may see the XR tag 108 rendered on a display of their client device 104, assuming other applicable conditions are met for rendering the XR tag 108. In some examples, setting the geofence 148 using the interactive element 210 involves selecting or otherwise entering a distance value (e.g., a radius from a selected location). For example, the user might set the geofence 148 at 50 meters from GPS coordinates corresponding to the selected location. As such, when a user is within the geofence 148 (e.g., within a distance of 50 meters from the selected location of the XR tag 108), the user is able capture the XR tag 108 to trigger a claim action(s) associated therewith.

In some examples, the user interface 200A and/or the user interface 200B may present one or more recommended (or suggested) locations where the XR tag 108 is renderable. For example, the user interface 200A may present an interactive element 212 (e.g., a drop-down menu) for suggested locations, and when the user 102 interacts with (e.g., selects) the interactive element 212, a set of one or more recommended locations (e.g., location A, location B, location C, etc.) may be presented for selection by the user to set as the location where a the XR tag 108 is to be rendered. The XR component 116 and/or the generation component 140 may be configured to recommend such locations based on data available to the PPS 112, such as data indicating foot traffic at various locations (e.g., an estimate of a number of users that walk by various locations and/or times at which they walk by those locations, etc.). In other words, the suggested location(s) (e.g., location A, location B, location C, etc.) may be recommended in order to increase a likelihood of users accessing the XR tag 108, such as by suggesting high-traffic locations where the XR tag 108 can be rendered, and/or locations targeted for increasing the number of users of the XR platform (e.g., a college campus takeover). The user interface 200B may present an interactive element 214 similar to the interactive element 212 for recommending a set of one or more locations to the user 102. Upon selection of a location (e.g., location B) from amongst the recommended location(s), the location where the XR tag 108 is to be rendered is set as the selected location (e.g., location B) and is specified as part of the definition 134 of the XR tag 108.

Figure 2C:
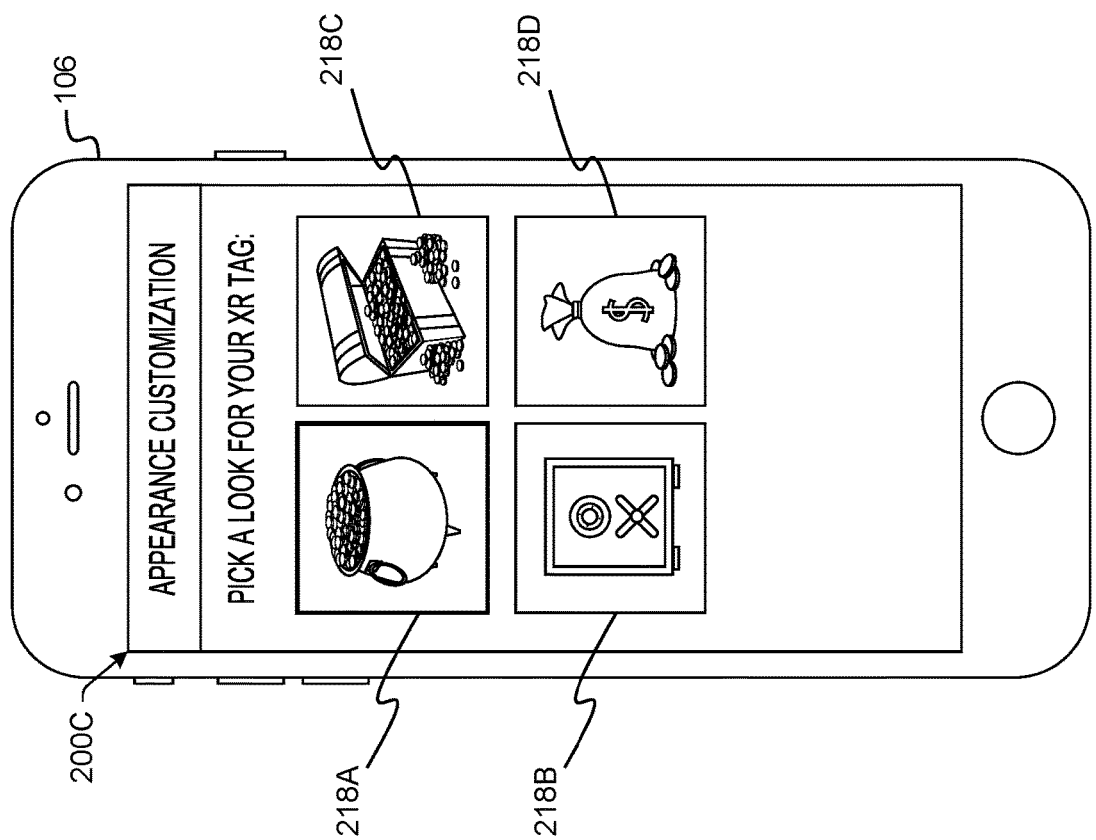
FIG. 2C is another example user interface associated with creating XR tags, according to an implementation of the present subject matter.

If the user selects appearance 216, the user 102 may be able to choose, define, or otherwise customize the audio-visual features, or "appearance," of the XR tag 108 (e.g., its structural design, color, texture, audio output, movement, animation, etc.) and/or the user 102 may be able to customize the appearance of one or more additional objects (e.g., graphics, such as bills, cash, coins, geofence, ground effects, etc.) that can be rendered with the XR tag 108. This can allow for branding the XR tag 108 with a trademark color, a logo, or the like, to act as a source identifier (e.g., to indicate a particular merchant 118 associated with the XR tag 108). In one example, upon selecting appearance 216 in the user interface 200A, the application 110 and/or the XR component 116 may display the user interface 200C shown in FIG. 2C. The example user interface 200C presents a plurality of interactive elements 218A, 218B, 218C, and 218D that, when interacted with (e.g., selected), cause the appearance of the XR tag 108 to be set in accordance with the selection. In the example of FIG. 2C, the user 102 can select from a pot of gold graphic 218A, a safe graphic 218B, a treasure chest graphic 218C, and a bag of money graphic 218D. There are merely examples of appearance options for the XR tag 108. If, say, the user 102 selects the pot of gold graphic 218A, the tag's appearance is set to the pot of gold, and the pot of gold graphic is to be rendered on client devices 104, 106 when conditions for rendering the XR tag 108 are satisfied. While FIG. 2C provides example images, as described above, XR tags 108 can be any combination of images, graphics, markers, sounds, or the like, which can be functional (or not), and/or can be generated based on particular purposes, environments, or context.

Figure 4B:
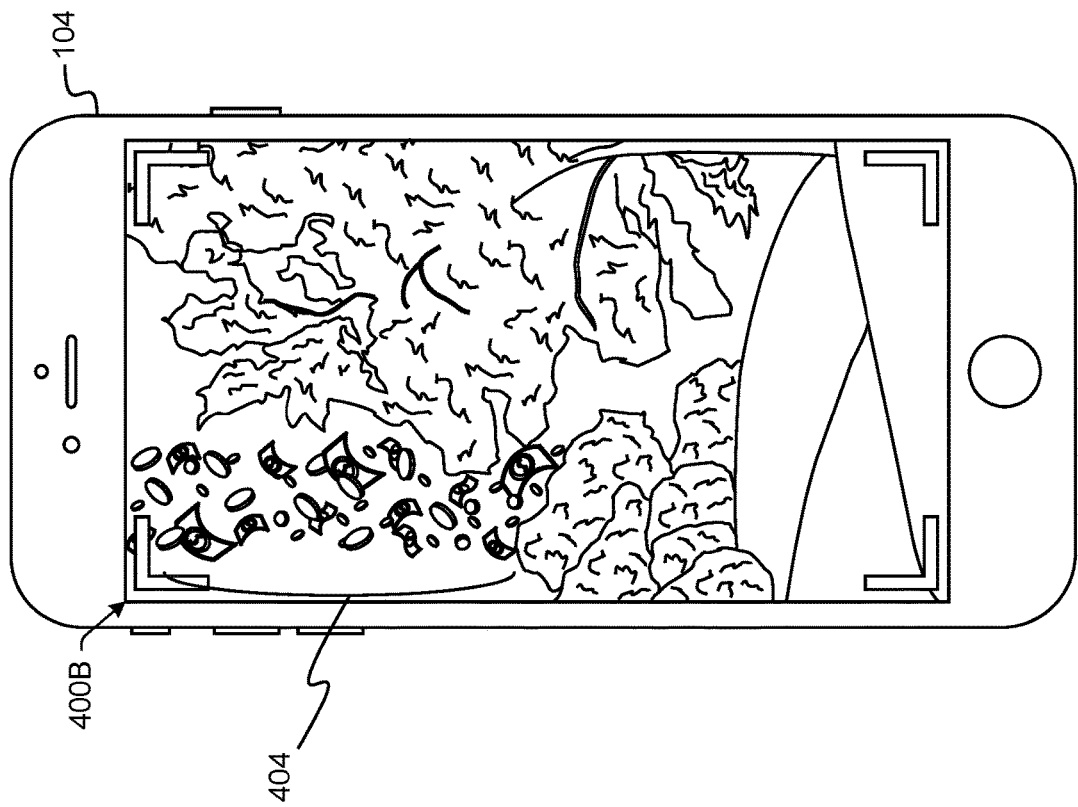
FIG. 4B is an example user interface associated with finding an XR tag, according to an implementation of the present subject matter.

With reference again to FIG. 2A, if the user selects capture method 217, the user 102 may be able to choose, define, or otherwise customize the way in which the XR tag 108 is to be captured (e.g., how the XR tag 108 is to be interacted with, the preferred mode of interaction with the XR tag 108, etc.). In one example, upon selecting capture method 217 in the user interface 200A, the application 110 and/or the XR component 116 may display the user interface 200D shown in FIG. 2D. The example user interface 200D presents an interactive element 223 (e.g., a drop-down menu) for specifying one or more types of capture methods. In this case, the user can specify that the XR tag 108 is to be captured by users selecting a "claim" button. An example of this is shown in FIG. 4C and is described in more detail below. As another example, the user can specify that the XR tag 108 is to be captured by users pointing a camera(s) (e.g., a camera or other image capturing mechanism of the user device 104) at a location associated with the XR tag 108. For example, upon arriving at a location associated with the XR tag 108, if a user orients a camera of the user device 104 at the location such that the XR tag 108 is rendered within the field of view of the camera, the XR tag 108 may be automatically captured once location of the XR tag 108 is within the field of view of the camera. As another example, the user can specify that the XR tag 108 is to be captured by users pointing a camera(s) at a location associated with the XR tag 108 and taking a picture of the XR tag 108 rendered on the display of the user device 104, such as by selecting an on-screen shutter button. As yet another example, the user can specify that the XR tag 108 is to be captured by users interacting with the XR tag 108 rendered on the display, such as by tapping (e.g., double tapping, long press, etc.) on the rendered XR tag 108, performing another type of gesture (e.g., swiping up, down, left, or right) with respect to the rendered XR tag 108, or the like. In some examples, the user may be able to specify an audience of users that are authorized to capture the XR tag 108 and/or an audience of users who cannot capture the XR tag 108. These are merely example ways of specifying the capture method(s) for an XR tag 108, and other tasks or actions to be taken to capture or claim the XR tag 108 can be specified by the creator of the XR tag 108.

With reference again to FIG. 2A, if the user 102 selects claim action 220, the user 102 may be able to choose, define, or otherwise customize the claim action(s) that users are able to trigger when their client devices 104, 106 are accessing the XR tag 108. In some examples, the application 110 and/or the XR component 116 may display the user interface 200E shown in FIG. 2E upon the user 102 selecting claim action 220 via the user interface 200A. The user interface 200E is described in more detail below with respect to the specification of one or more rules 136 applicable to the XR tag 108. In some examples, the user 102 creating the XR tag 108 may be able to specify whether the claim action, such as an incentive (e.g., a reward offer, bounty, etc.), is associated with a specific merchant(s) 118, a category of merchants 118, a particular location of a merchant 118, and/or the user 102 may be able to define a type of claim action, such as a discount to the price of a product or service, a rebate after a payment is made, a cash reward (e.g., a fixed dollar amount), a gift to be given out, another suitable benefit, or any combination thereof, and/or the user 102 may be able to define a value of an incentive, such as a percentage of a price associated with an item available for purchase from a merchant 118, a dollar amount, a percentage of a discount, etc.). In some examples, upon selecting claim action 220 in the user interface 200A, the user 102 may be able to define one or more criteria or conditions to be satisfied before the claim action can be triggered, or the like. In some examples, the user 102 may choose an action other than an incentive to associate with the XR tag 108. Examples of other actions, and various contexts or environments, are described above. Furthermore, in some examples, the user 102 can define a claim action associated with an XR tag 108, tasks and/or other operations for capturing or claiming an XR tag 108.

Other example parameters of the tag definition 134 that may be presented in the user interface 200A (e.g., in association with the interactive element 202) include, without limitation, a preferred structural design of the XR tag 108 (which may be part of the appearance 216 parameter), a preferred mode of interaction with the XR tag 108 (e.g., a specific type of interaction with the XR tag 108 (e.g., selecting a "claim" button, etc.) that triggers a claim action), a feedback to the preferred mode of interaction (e.g., an action that gets triggered when a user interacts with the XR tag 108, such as an action of accessing an application on the user's device, causing a specific application to be downloaded on the user's device, etc.), a timing of validity of display of the XR tag 108 (e.g., an expiration date for the XR tag 108), a timing of validity of display of visual indicators of users who trigger the claim action(s) associated with the XR tag 108, or any combination thereof. In some examples, the definition 134 of the XR tag 108 may allow for customizing the XR tag 108 through a specification set of parameters that are customizable to client devices 104, 106, users 102 of those client devices 104, 106, and/or a creator of the XR tag 108.

Figure 2E:
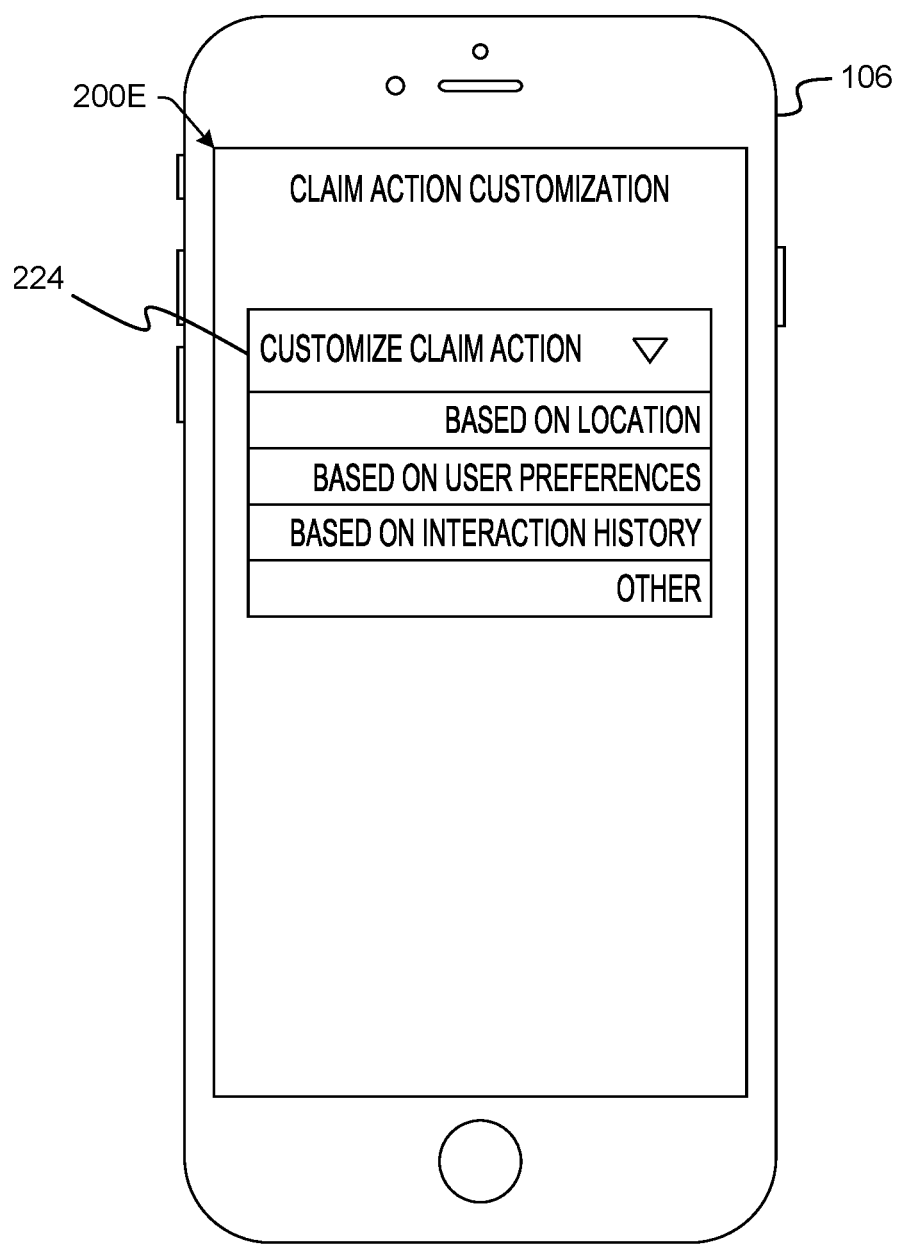
FIG. 2E is another example user interface associated with creating XR tags, according to an implementation of the present subject matter.

The user interface 200A is further shown as presenting an interactive element 222 for specifying one or more rules 136 applicable to the XR tag 108. In some examples, these rules 136 allow for customizing the information embedded in the XR tag 108 to client devices 104, 106 that are accessing the XR tag 108 and/or to the users 102 of those client devices 104, 106. In one example, upon interacting with (e.g., selecting) the interactive element 222 in the user interface 200A, and/or upon selecting claim action 220 in the user interface 200A, the application 110 and/or the XR component 116 may display the user interface 200E shown in FIG. 2E. The example user interface 200E presents an interactive element 224 (e.g., a drop-down menu) for specifying one or more rules 136. In this case, the user can specify a rule(s) that customizes the claim action embedded in the XR tag 108. In the example of FIG. 2E, the user 102 may specify that the claim action configured to be triggered by users is to be customized based on a location associated with the users or their client devices. For example, if a location-based rule is specified via the interactive element 224, a first user who resides in Seattle, Washington may be allowed to trigger claim actions (e.g., the first user may claim incentives) associated with merchants 118 located in the Seattle area, whereas a second user who resides in San Francisco, California may be allowed to trigger claim actions (e.g., the second user may claim incentives) associated with merchants 118 located in the Bay area, even though the first user and the second user interact with the same XR tag 108 to trigger those different claim actions. In another example, these users may have different preferences (e.g., preferences for certain types of cuisines), and, accordingly, triggerable claim actions may differ per-user such that a first user who interacts with the XR tag 108 can trigger claim actions (e.g., claim incentives) associated with Mexican restaurants, while a second user who interacts with the same XR tag can trigger claim actions (e.g., claim incentives) associated with Chinese restaurants. As yet another examples, the interaction histories (e.g., transaction histories, browsing histories, content consumption (e.g., music streaming, video streaming, etc.) histories, etc.) may differ per-user, and, as such, the triggerable claim actions may be customized to particular users based on their interaction histories. In some examples, the creator of the XR tag 108 may indicate that users are to sign their name after triggering a claim action(s) for the XR tag 108 in order to leave their mark on the XR tag 108. An example of this is described in more detail below with respect to FIG. 4F. These are some example rules 136 applicable to the XR tag 108 that the user can specify so that information embedded in the XR tag 108 (e.g., the claim action(s)) is customizable based on identity of client devices 104, 106 and/or identity of users 102 thereof. Accordingly, the user interfaces 200A-200E allow for creating an XR tag 108 with various attributes and/or customizable parameters that influence how, when, and/or where the XR tag 108 is generated and/or how, when, where, and/or by whom the XR tag 108 is presented and/or captured.

FIGS. 2A-2E illustrate a series of user interfaces that enable the generation of an XR tag. That is FIGS. 2A-2E enable a user to indicate where the XR tag should be located or otherwise placed (FIG. 2B), create or customize the audio-visual appearance of an XR tag (FIG. 2C), how an XR tag is to be captured or otherwise interacted with (FIG. 2D), a claim action associated with an XR tag (FIG. 2E), and/or the like. As described above, in some examples, the XR tag generation process can enable users to customize additional or alternative attributes of XR tags such as a length of time XR tags are capturable, claimable, or the like. It should be noted that the user interfaces 200A-200E are provided for illustrative purposes and can provide additional or alternative functionality and/or have additional or alternative configurations. In some examples, for instance, radio buttons, check boxes, or other user interface elements can be presented for selection instead of drop down menus. In some examples, the options presented (in FIGS. 2A-2E in drop down menus) can be static or dynamic. When dynamic, such options can be intelligently determined, for example, based on context data associated with the user, date, time, environment, or the like. In some examples, such intelligence can be based at least in part on one or more machine learning models, algorithms, or the like.

Figure 3:
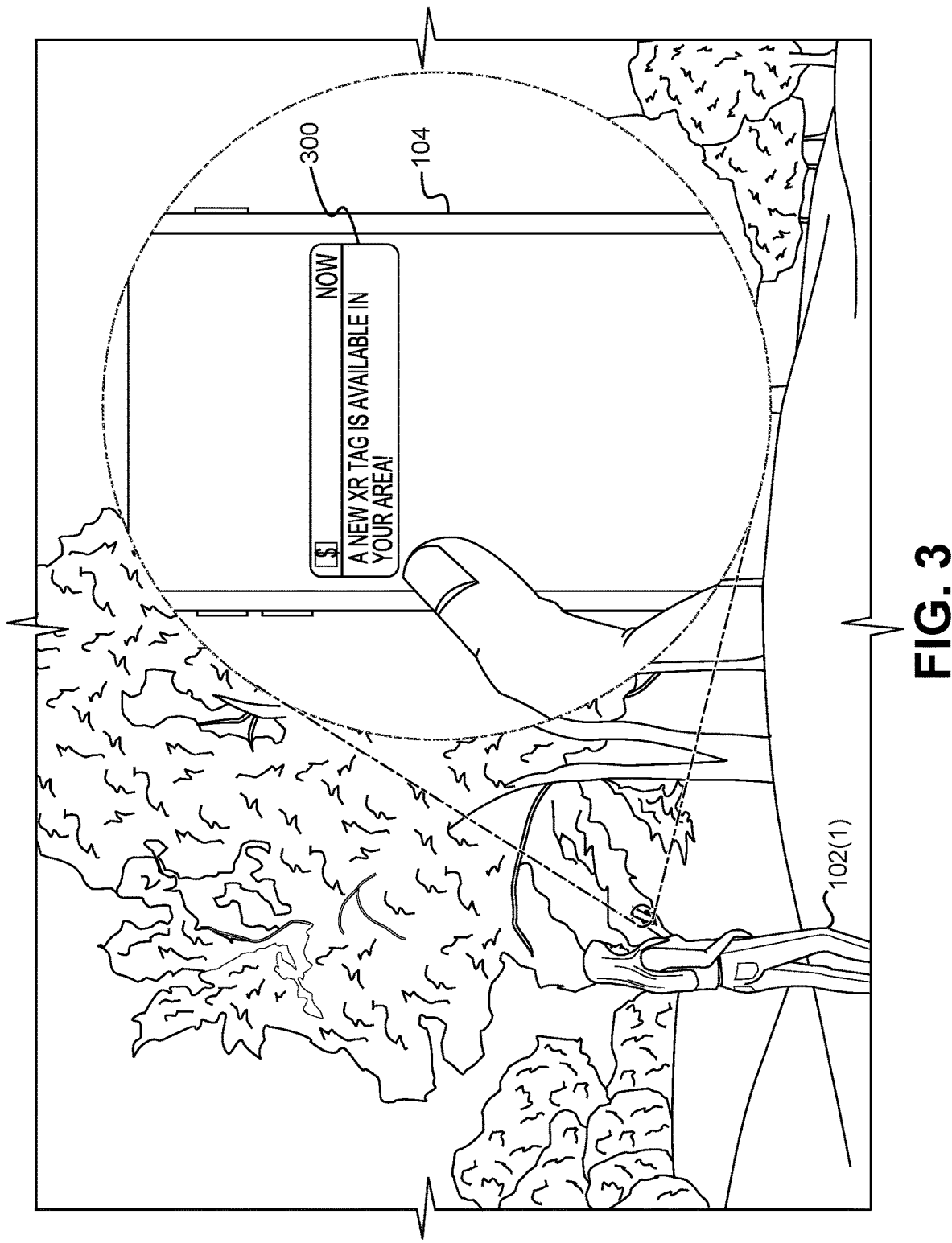
FIG. 3 is an example notification associated with an XR tag that may be output via a client device, according to an implementation of the present subject matter.

FIG. 3 is an example notification 300 associated with an XR tag(s) 108 that may be output via a client device 104, according to an implementation of the present subject matter. The notification 300 may be sent to the user device 104 to alert the user 102(1) to the availability of an XR tag(s) 108. The notification 300 may optionally be interactive or otherwise include an interactive element and instructions to invite engagement with the XR tag 108. The notification 300 can also be presented in a variety of ways, such as visually via an electronic message (e.g., a text message or electronic mail), via a "drawer" item, within the mobile application 110, via an interstitial within another mobile or web application, via a pop-up notification, and/or on a display discoverable with a gesture (e.g., pinch gesture) or specific keypad, audio, visual, or haptic inputs. The notification 300 can also indicate other XR tags 108, even those not applicable to the user 102(1), on their display, e.g., as a "heatmap" of the XR tags 108 in a certain area or otherwise relevant to the user 102(1). For example, the XR tags 108 related to users similar to the user 102(1) may be shown on the heat-map to encourage the user 102 to interact with merchants 118 surfacing those other XR tags 108.

The transmission and/or output of the notification 300 may be triggered in various ways. For example, the PPS 112 may receive a notification (e.g., the context data 150 of FIG. 1) indicating a change in a user's 102(1) location. The PPS 112 may receive information regarding a user's 102(1) location or changes with the user location via context data 150 transmitted by an application 110 executing on the user's device 104, such as a phone and fitness tracker. For data privacy reasons, the user 102(1) can authorize their movements to be tracked via the application 110 in the device 104. While location is used as an example to track a user's movement, other trigger criteria obtained via devices, such as payment readers and IoT devices, like voice recognition devices, transaction data, social media check-ins or tags, etc. can be used to detect a trigger event and/or send context data 150 to the PPS 112 to do the same. Such devices can be recording the user's location, and more generally user's movement, through engagement with such devices. The trigger criteria can range from engagement with the device to a specific engagement or specific engagement for a predetermined period of time. In one example, the trigger criteria is met when the user activates an inactive IoT device, e.g., through initialization of a "trigger" phrase, e.g., a natural language input to trigger or enable a natural language command recognition functionality of a natural language controlled device. Voice interactions are one type of natural language command. Thus, a user may talk to a computing device and expect the device to appropriately act on his or her spoken commands. Natural language commands are not limited to speech and may also be provided as typed commands, handwritten commands, etc.

In some implementations, the application 110 may register for "significant location change notifications." This allows the application 110 to wake up in the background when the computing device 104, e.g., phone, has moved a predefined distance that is deemed to be a "significant" distance. The significant distance can be controlled by the operating system of the computing device 104 such that the significant distance is detected when a new cell phone tower is picked up by the phone, which could be a location change of one or two miles. Using cell phone tower detection as a trigger can conserve battery power on the device 104, and high-fidelity GPS tracking can be reserved for instances when the user 102(1) is interacting with an XR tag 108 (e.g., via an XR camera lens, described in more detail below). Alternatively, the device 104 can also use other location tracking mechanisms such as GPS tracking to detect whether or not the client device 104 has traveled a predefined distance since a last location update to the PPS 112. In one implementation, the application 110 includes a remote procedure call so that the computing device 104 can quickly update the PPS 112 regarding its current location. The PPS 112 (e.g., the placement component 142), on receiving a change in user's location, such as the significant location change described above, via the user device 104 (or on receiving an indication that a device has been initialized through a natural language command or other engagement), may determine whether the user's circumstance defined by a new location, current time, or current context, is qualified to receive an XR tag 108. Whether to output the notification 300 or not may depend on previously defined rules set by a merchant, customer, the service provider, or a third-party device. In one instance, the location of the user's device 104 is compared with a geofence 148, defined by specific GPS coordinates and/or a radius, to determine if a trigger event is met (e.g., whether the coordinates of the client device 104 are within a threshold distance of a location associated with the XR tag 108). If the conditions for outputting the notification 300 are not met, the user's movements may continue to be monitored, e.g., as a background process, to determine, again, if the trigger criteria is initialized. If the conditions for outputting the notification 300 are met, the notification 300 may be transmitted and/or output via the application 110, as illustrated in FIG. 3, where the notification 300 may indicate that an XR tag 108 is within a threshold distance of the user 102(1).

In an embodiment, the XR component 116 executing on a user device, such as customer device 104, and/or the association component 144 is configured to capture the XR tags 108 placed at relevant locations and/or for relevant users in an ecosystem of the XR platform, e.g., using rules described in the rule base 124. For example, a user, such as a customer or P2P user 102(1), can capture or claim the XR tags 108 in a payment scene to facilitate payment transactions. Such payment transactions may manifest between a merchant 118 and the customer 102(1) at a merchant location, e.g., brick-and-mortar or merchant website to facilitate a transaction between the merchant 118 and the customer 102(s) (e.g., for goods or services) or between two users, for example to facilitate a P2P payment transaction. In some implementations, the capturing of the XR tags 108 can also manifest in a non-payment context, e.g., to check a balance on a card, check a status of an account, verify a cashflow statement, or check loyalty points associated with a customer account, and so on. The XR component 116 can also facilitate capturing of the XR tags 108, which can leverage one or a combination of the various technologies to make the experience of a user interacting with the virtual world and the real-world seamless, frictionless, and continuous. The XR tags 108, when captured, say by another device of the XR platform, trigger one or more "claim actions," such as facilitating payments as mentioned before, generating user or merchant specific actions, generating static or dynamic incentives, activating or deactivating incentives, downloading information, accessing information, enabling user-specific actions, and so on. As mentioned before with respect to generation of XR tags 108, each XR tag 108 can be associated with claim actions, and the claim actions can be defined at a time of creating and/or generating the XR tag 108 to effectively embed the action in the XR tag 108 such that interaction with the XR tag 108 leads to capturing of the XR tag 108 and to performance of the claim actions embedded therein. The rules (in the rules base 124) associated with the XR tag 108 can determine which claim actions get triggered and when.

In one implementation, the claim actions may vary based on the environment in which the XR tags 108 are implemented. For example, in the retail environment, the actions may include creating and applying coupons, automatically paying for the items in the cart, making appointments, authorizing actions such as providing approvals or shifts for pay calculations, obtaining pay after shifts, making appointments, applying for loan or cash advances, and so on. In a restaurant environment, the actions may include creating coupons, automatically paying for a meal or order, making appointments for a future time at the restaurant or a different restaurant, adding services to the existing services, and so on. In a P2P environment, the claim actions may include automatically crediting money into someone's account, automatically debiting money from someone's account, creating send/receive money requests, and so on. In a lending environment, the actions may include automatically creating send/receive loan requests, generating loan offers in real-time, allowing data capture to facilitate generation of loan offers, receiving loan incentives, and so on. In some scenarios, there may be several claim actions associated with a single XR tag 108 or several XR tags 108 associated with a single claim action.

In some implementations, the capturing and/or claiming of XR tags 108 may be associated with tasks, such as providing user input. In some embodiments, the interaction with the XR tags 108 may further include, by inference, a verification action, which can be a submission of a security code associated with a payment card or payment account when placing an online order. In other embodiments, the single verification action can be responding to a confirmation request (e.g., a push notification, an email message, a text message, etc.) or a permission request. In yet another embodiment, the verification action can be a submission of an identifier of biometric characteristic unique to the customer. Examples of biometric characteristics include a fingerprint, retina or iris, image, voice spectrum, heartbeat, etc. The disclosed technology can employ one or more of these verification actions to identify and block fraudulent transactions and provide customers engaging in legitimate transactions a faster and more efficient payment experience that does not involve signing in or registering for an account. The XR platform can also facilitate capturing of the XR tags 108, which can leverage one or a combination of the various technologies to make the experience of a user interacting with the virtual world and the real-world seamless, frictionless, and continuous.

In some examples, in the context of a client device 104 being used to "capture" an XR tag 108, coordinates associated with the XR tag 108 are sent by application 110 and/or the XR component 116 to the PPS 112, and the PPS 112 (e.g., the association component 144) identifies a claim action correlated with the coordinates, and associates the claim action to the application 110 executing on the client device 104. In some examples, the claim action is customized to the user 102(1) (e.g., based on a location, such as a mailing address of the user, preferences of the user, interaction history of the user, etc.) and/or the client device 104 (e.g., based on location associated with the device). The association of the claim action to the application 110 may cause an incentive to be applied to a subsequent payment transaction 152 of which the user 102(1) is a party. FIG. 1 indicates that an incentive associated with the claim action is redeemed in association with the payment transaction 152, which can mean that the incentive is applied (e.g., automatically) to the payment transaction 152. In some examples, a payment interface of the application 110 is moved to a foreground while an XR camera lens presenting the XR tag 108 is moved to the background. Alternatively, a payment interface of the application 110 may open up in a pop-up window covering a portion of the screen occupied by XR tag 108. The application 110 may already be connected to the account (e.g., financial/spending account) of the customer 102(1) at the time of installation or from a previous visit. Alternatively, the customer 102(1) can login once and may not be asked to re-login unless the customer logs out or deletes the application 110 from the mobile device 104.

By using a payment proxy or an application 110 connected to a payment card (e.g., debit or credit card) in a payment transaction 152 (or payment request), the merchant system 106(2) parses the payment proxy to obtain details of the payment card including the cardholder's name, payment card number, expiration date, card verification value (CVV)), billing address, etc., and provides such information to the PPS 112 (e.g., the payment component 138) along with its own financial account information. In another case, the payment component 138 parses the payment request to obtain the financial account information of both the merchant 118(2) and the customer 102(1). The payment component 138, in turn, processes the transaction 152 by routing the authorization request to an acquirer. The acquirer can send this data to a card payment network, which may forward the data to an issuer for authorization. If the transaction is approved or authorized by the issuer, a payment authorization message is sent from the issuer to the merchant system 106(2) via a path opposite of that described above. Once the transaction 152 is authorized, settlement and clearing occurs. During settlement and clearing, the issuer sends the funds associated with the authorized transaction 152 through the card payment network to the acquirer to be deposited in the merchant's account with the acquirer. In one implementation, the mobile device 104 transitions back to an XR user interface (e.g., XR camera lens) after the completion of the transaction 152.

Figure 4A:
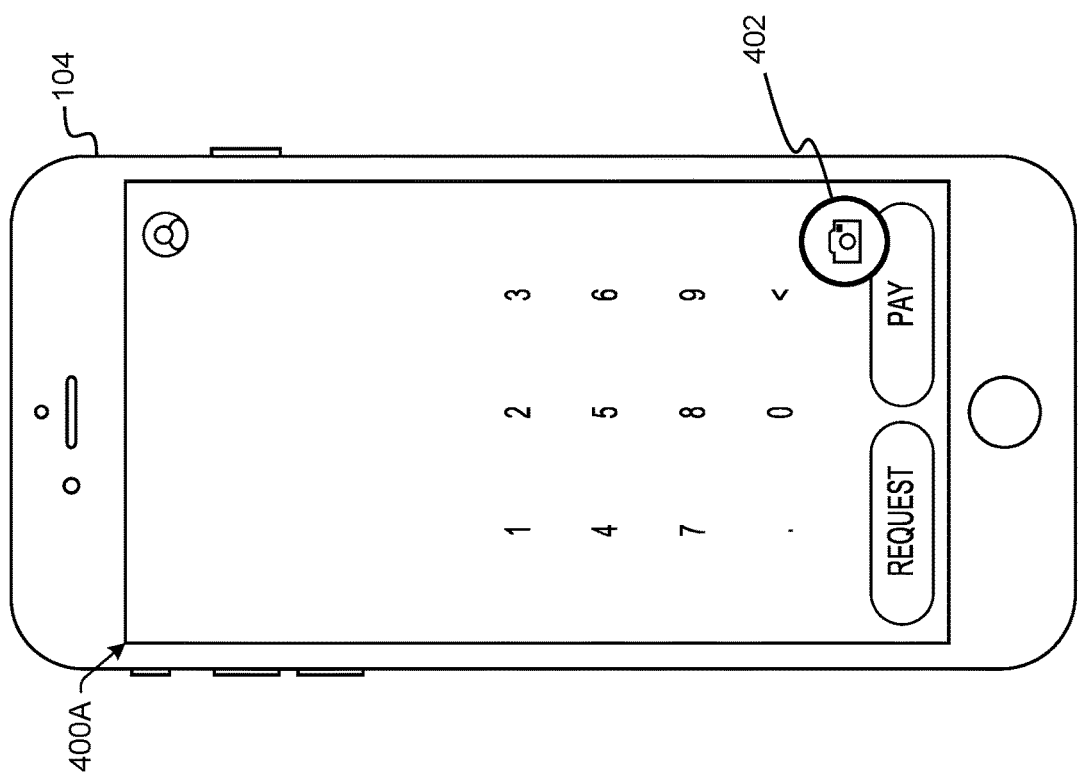
FIG. 4A is an example user interface associated with invoking an XR camera lens for capturing an XR tag, according to an implementation of the present subject matter.

FIG. 4A is an example user interface 400A associated with invoking an XR camera lens for capturing an XR tag 108, according to an implementation of the present subject matter. In some examples, a user can find and capture an XR tag 108 using an XR camera lens. In one implementation, the XR camera lens can be initialized within an application 110 executing on a computing device 104, e.g., a P2P application or a web-based P2P application. FIG. 4A depicts an example user interface 400A of such an application 110, which the user 102(1) may invoke after receiving the notification 300 illustrated in FIG. 3 (e.g., the user 102(1) may provide user input, such as a tap, on the notification 300 to invoke the user interface 400A or to invoke the user interface 400B shown in FIG. 4B). Alternatively, the user may invoke the user interface 400A by opening selecting an icon associated with the application 110 on a home screen or from an application menu, notwithstanding the availability of the notification 300. The example user interface 400A presents an interactive element 402 to initialize the XR camera lens. Upon interaction with (e.g., selection) of the interactive element 402 (or, as mentioned above, upon interaction with the notification 300 of FIG. 3), the XR camera lens can be initialized. FIG. 4B shows an example user interface 400B of the XR camera lens having been initialized in response to an interaction with the interactive element 402 of the user interface 400A (or in response to an interaction with the notification 300 of FIG. 3). It is to be appreciated, that the XR camera lens may be initialized in other ways, such as via a "drawer" element positioned at a bottom of the user interface 400A or any suitable type of interactive element positioned elsewhere on the user interface 400A or another user interface, via a gesture (e.g., a pinch gesture, swipe gesture, tap gesture, shake gesture, etc.), a voice command, or the like. In some examples, graphics are rendered during the transition from the user interface 400A to the user interface 400B, such as a gradual fade out of the content presented in the user interface 400A to reveal the XR camera lens view depicted in the user interface 400B.

The user interface 400B shown in FIG. 4B may highlight one or more areas where an XR tag(s) 108 is/are available. In some examples, the XR component 116 is loaded and begins executing to present the user interface 400B. In the example of FIG. 4B, the XR camera lens is implemented as an AR camera lens, in which case a live view of the real-world environment is visible on the screen (e.g., based on images captured by a front facing camera(s) of the device 104), and a graphic(s) 404 is/are rendered in the scene using AR technology. In the example of FIG. 4B, a trail of bills and coins is presented graphically in the scene to indicate a location of an XR tag 108 in the distance. This is merely an example type of graphic that is indicative of where an XR tag(s) 108 is/are available or otherwise located, and other types of graphics/objects are contemplated, such as a rainbow graphic, or the like. In some examples, the XR component 116 is configured to mask the graphic(s) 404 to the horizon, such as by masking a portion of the graphic(s) 404 to make it appear as though the trail of bills and coins is leading to a location in front of or beyond the horizon, as the case may be. In some examples, the XR camera lens highlights multiple areas where XR tags 108 are available. In some implementations, the display of XR tags 108 is associated with underlying rules and mechanisms, such as location tracking. In terms of display, in some examples, gestures, such as voice, haptic touch (e.g., pinch gesture), etc., can be used to access a "heat-map" e.g., to reveal availability of XR tags 108 in a specific area of user's choice. In some examples, the user 102(1) can access their profile, a map view, their inbox, and/or their activity feed from the XR camera lens shown in FIG. 4B. In some examples, the XR camera lens can include a radar of virtual objects located at a nearby physical location. In some examples, the user 102(1) can access a map view, take a photo, and/or create an XR tag 108 and add the created XR tag 108 to the world at or near their physical location from the XR camera lens.

FIG. 4C is an example user interface 400C showing the placement of an XR tag 108 rendered (e.g., at/in a scene) on a display of a mobile device 104, according to an embodiment of the XR technology. It is to be appreciated that references made herein to "rendering an XR tag 108" can be interpreted as rendering a graphical representation of the XR tag 108. In an illustrative example, after following the trail of bills and coins depicted graphically in the user interface 400B, the user 102(1) may arrive within a geofence 148 of a location associated with the XR tag 108 to which the trail of bills and coins led the user 102(1), and in response to entering the geofence 148, one or more actions may occur. In some examples, if a user interface of the application 110 is not in the foreground on the display of the device 104 at a time when the device 104 enters the geofence 148, the device 104 may output (e.g., display) a notification to notify the user 102(1) that they have found an XR tag 108, along with an interactive element to trigger a claim action(s) (e.g., claim an incentive(s)) associated with the XR tag 108. In some examples, if a user interface of the application 110 is in the foreground on the display of the device 104 at a time when the device 104 enters the geofence 148, an in-app message notification may be presented to notify the user 102(1) that they have found an XR tag 108. If the XR camera lens is active on the device 104, a celebratory graphic (e.g., raining bills and/or coins) may be rendered on the display via the user interface 400C. Upon the user 102(1) directing a camera of the mobile device 104 to the location of the XR tag 108 in a real-world scene, the user interface 400C may be displayed. The example user interface 400C presents the rendered XR tag 108 on the display of the device 104. At this time, the user 102(1) is able to trigger the claim action(s) associated with the XR tag 108, such as by associating an incentive with a financial account of the user 102(1).

In one implementation, the device 104 accesses the PPS 112 over the network 114 and executes the XR component 116. The XR component 116, and/or components thereof, may run locally on the device 104 and/or the placement component 142 may be executed remotely on the PPS 112 to cause display of the user interface 400C. The XR component 116 and/or the placement component 142 allows the user 102(1) of the device 104 to scan the real-world scene, for example by rotating and/or moving the device 104 about a space to allow 360 scanning of a real-world scene. In one example, as the user 102(1) scans the scene, the device 104 sends one or more requests (along with metadata, such as the context data 150, which may include a location, timestamp, context such as concert venue, weather conditions, etc.) at runtime to the PPS 112 for accessing the database 126 and fetching relevant graphical representations of the XR tags 108 for that context, such as time, location, user, etc. In response, the PPS 112 (e.g., the placement component 142) provides graphical object data of the XR tag 108 that may be used to render a 2D or 3D representation of the XR tag 108 (and possibly one or more additional objects or graphics, such as the "bills" graphic 408, the geofence 148, ground effects, animated sprites, etc.) on the display of the device 104. The rendered XR tag 108 may include any combination of metadata, images, etc., that allows the XR tag 108 to be realistically displayed on the display of the device 104. The display of the device 104 superimposes the XR tag 108 on top of the camera view to form a composite image that is the user interface 400C. The composite image shows an approximation of how the XR tag 108 would behave in the scene if the user 102(1) were to capture it. In this manner, the user 102(1) can "try" different XR tags 108 and pick the one that they most prefer.

In one implementations, the XR component 116 constructs the physical aspects of XR tag 108 by (i) extracting features of at least one object from a real-world image detected by a sensor of the device 104 (e.g., a camera(s)), (ii) reconstructing at least one XR tag 108 from at least one object; and (c) compositing XR content from at least one XR tag 108 in order to augment the XR content on the real-world image, thereby creating a customized XR scene. In one example, the reconstruction can be based on geometric rules, texture rules, animation paths, cues, and so on. The geometric rules can determine whether the XR tag 108 (or the graphical representation thereof) can have, for example, 2D, 2.5D or 3D geometric structure, intensity/contour features, projective/orthographic features, multiple views of the same scene, single view where depth or elevation information can be inferred, and others. The animation cues can determine whether various visual effects can be added to the XR tag 108 (such as lighting, shininess, blending, smoothing, and so on), which are embedded within the image by using the appropriate annotations. According to an embodiment of the present subject matter, before (or during) rendering an XR scene, various audio-visual effects and/or behaviors (or claim actions described later) can be added to the XR tags 108 (such as lighting, shininess, blending, smoothing, texts, music, videos and so on), which are embedded within the XR tag 108 by using the appropriate annotations (e.g., static) or animation paths (dynamic path such that the XR tag 108 changes form or shape and animation as the device 104 moves).

In one implementation, the XR component 116 generates the functional aspects of the XR tags 108 based on rules (e.g., rules in the rule base 124) stored in the XR component 116, where rules, either user-provided or system-generated, define the look-and-feel of the XR tag 108; display properties (e.g., when should the XR tag 108 be displayed; to whom should the XR tag 108 be displayed; what portions of the XR tags 108 should be displayed, etc.); where and how the XR tag 108 should be placed or reproduced, for example with respect to the real-life objects; any time restrictions or preferences; any location restrictions or preferences; dimensions of the XR tag 108; validity of the XR tag 108; geographical boundary defined via e.g., geofence 148; type of gesture that will allow another user to capture XR tag 108 (tap via requesting application, signature via requesting application, and so on); the incentive or other claim action associated with a specific XR tag 108 (e.g., increase cash balance; unlock a specific feature within the requesting application; or obtain a merchant specific reward—gift coupon, etc.); and so on. The rules (e.g., rule base 124) may also determine the behavior of the XR tags 108 after they are captured. In one implementation, the XR component 116 determines the rules and/or XR tags 108 based on machine learning models. For example, context data 150 and/or image data captured in real-time by a camera of the client device 104 may be provided as input to a machine learning model(s) that is trained to output XR tag data 132 that is correlated with the context data 150 and/or image data. In some examples, the XR component 116 is configured to use overlay instructions to overlay XR tags 108 based on or onto tangible objects in a real scene using the display of the client device 104. For example, the device 104 may be a head-mounted display 104(1) that allows a user 102(1) to simultaneously view tangible objects in a real scene and virtual objects. The XR component 116 is configured to process data to be presented to a user 102(1) as an XR tags 108 on the head-mounted display 104(1). The overlay instructions utilized by the XR component 116 can be locally stored on the device 104 or remotely stored on the PPS 112, where the instructions are configured to be processed to determine when, how and where to place the XR tags 108 based on context (e.g., context data 150).

In one implementation, the XR tag 108, when rendered, may be opaque or transparent or partially opaque or partially transparent depending on whether a user 102(1) wants to show all, some, or none of the background information directly behind the XR tag 108 in the scene, such as an object(s) behind the XR tag 108. The background object may be an image of a real-world background object captured by a camera of the device 104, and reproduced at the location of the user 102(1) when the XR tag 108 is being accessed by the user 102(1) and rendered on screen. The XR tag 108 may include information that the creator, e.g., merchant 118, wanted to display when a certain XR tag 108 is captured or available to be captured. Furthermore, such information can be customized to the user 102(1), e.g., customer or P2P user, currently accessing the XR tag 108, or other circumstances, such as time of the day, location of the user 102(1), and so on.

In an example, the user interface 400C includes information and details that enable the user 102(1) (e.g., a customer) to capture the XR tag 108 in an informed way. For example, FIG. 4C illustrates the user interface 400C presenting an interactive element 410 for the user 102(1) to trigger the claim action (e.g., claim the incentive) associated with the XR tag 108. In the example of FIG. 4C, the claim action is associated with an incentive, such as a reward, discount or a coupon in the form of $5 off a next purchase at one of multiple merchants 118, as indicated by the information element 412 positioned above the interactive element 410 in the user interface 400C. In some examples, the information element 412 may include information about other merchants 118 or other XR tags 108 in close proximity of the rendered XR tag 108. The other XR tags 108 may have a similar display information associated therewith. Entry of the device 104 within the geofence 148 of the XR tag 108 may cause the application 110 and/or the XR component 116 on the device 106 to send context data 150 (e.g., location data, such as coordinates associated with the XR tag 108 and/or coordinates of the device 104, orientation data indicating an orientation of the device 104, a timestamp, account data, etc.) to the PPS 112. In some examples, the context data 150 may be sent to, and received by, the PPS 112 in association with a request for information associated with the XR tag 108, and the PPS 112 may respond to the request with information that is correlated with the coordinates of the rendered XR tag 108 (or the graphical representation thereof). This information may be retrieved by accessing the data store 126, and the information may include the claim action, among other information. In some examples, the XR component 116 may output an instruction for the user 102(1) to orient their computing device 104 in a certain way, or move closer to a certain object, and so on.

In cases where the XR tag 108 relates to a specific merchant 118, the merchant 118 may be a merchant 118 that the user 102(1) has previously purchased items from, a merchant 118 that is visible within the field-of-view of the camera of the device 104 (e.g., behind the XR tag 108), and/or a merchant 118 that is nearby the user 102(1) (e.g., within a threshold distance, such as a mile, two miles, etc.). In some examples, the claim action is customized to the client device 104 and/or to the user 102(1) of the client device 104 (e.g., based on a preference(s) of the user 102(1), based on a location associated with the user 102(1) and/or the device 104, based on an interaction history associated with the user 102(1), etc.). Furthermore, the claim action may be associated to the application 110 executing on the device 104. In some examples, when this association is made, an incentive is configured to be applied (e.g., automatically) to a subsequent payment transaction of which the user 102(1) is a party, such as the example payment transaction 152 shown in FIG. 1. Associating the claim action to the application 110 may include associating an incentive to an account (e.g., a financial/spending account) associated with the user 102(1). In this manner, the payment transaction 152 can be made from the user's account to a merchant account associated with a merchant 118 (e.g., the merchant 118 may be an additional party to the subsequent payment transaction). In some examples, the associating of the claim action to the application 110 may include associating an incentive to a payment instrument (e.g., a physical payment instrument, virtual payment instrument, etc.). These and other examples of applying a claimed incentive to a subsequent payment application are described elsewhere herein.

Figure 4D:
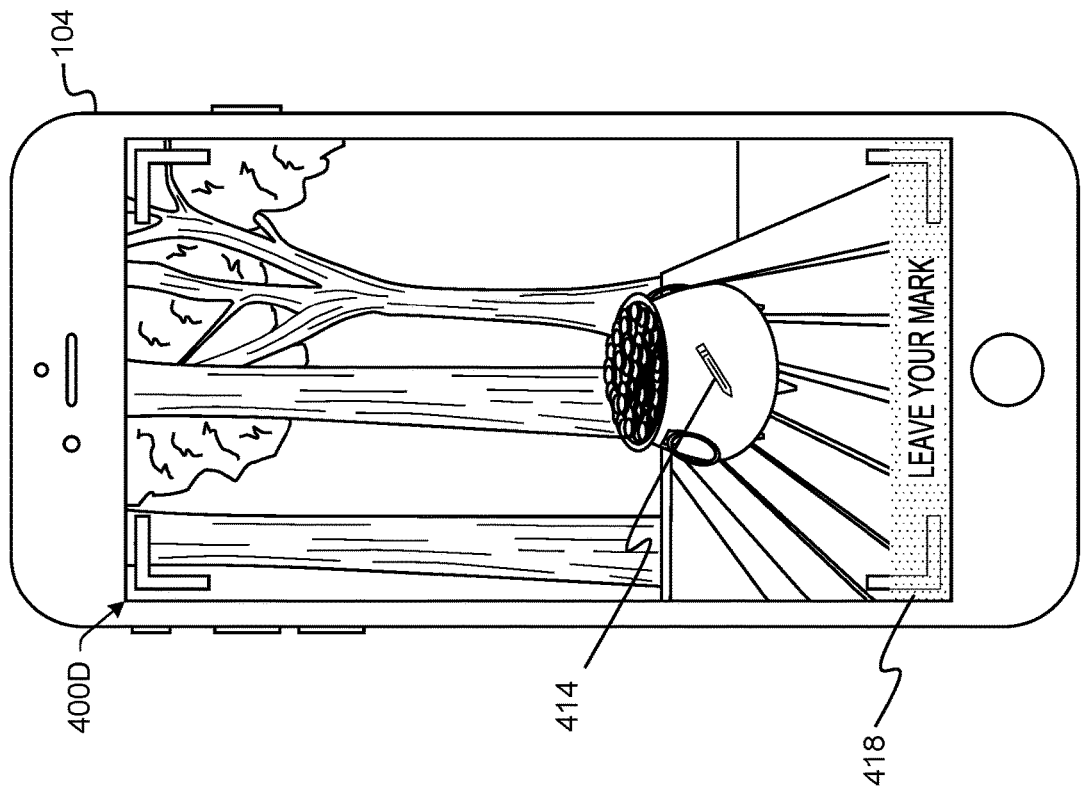
FIG. 4D is an example user interface presenting a visual indication of a log book in association with an XR tag, according to an implementation of the present subject matter.
Figure 4C:
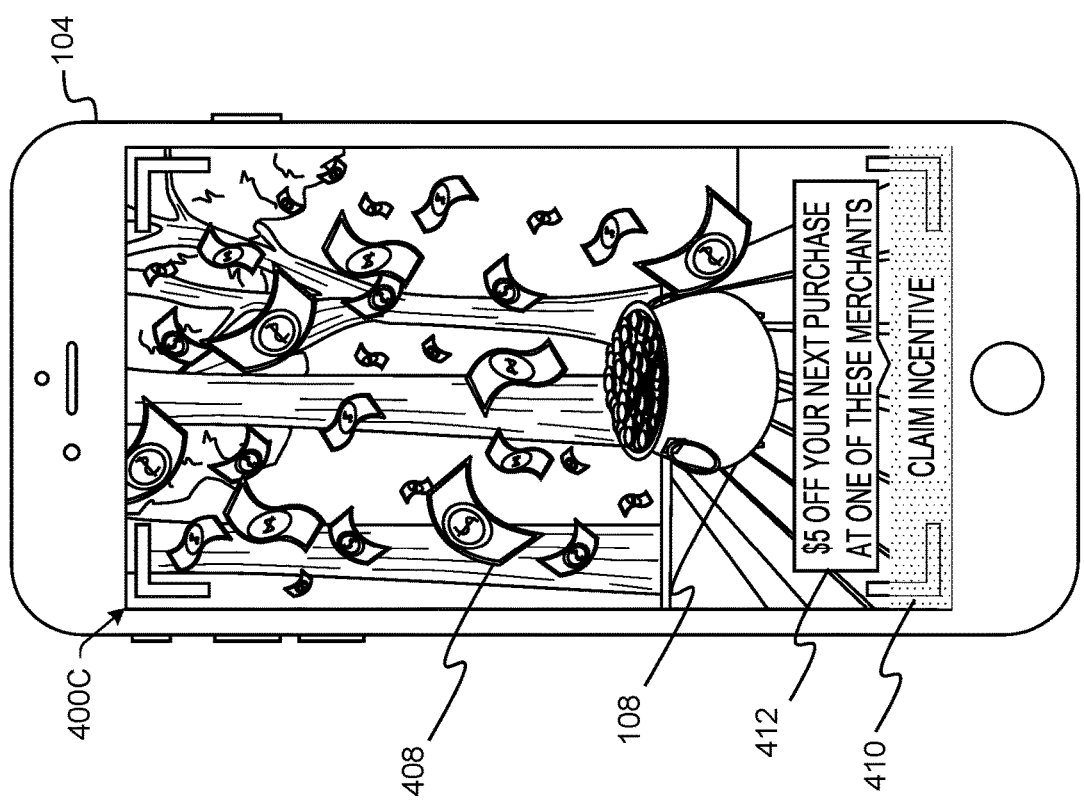
FIG. 4C is an example user interface associated with capturing an XR tag, according to an implementation of the present subject matter.
Figure 4F:
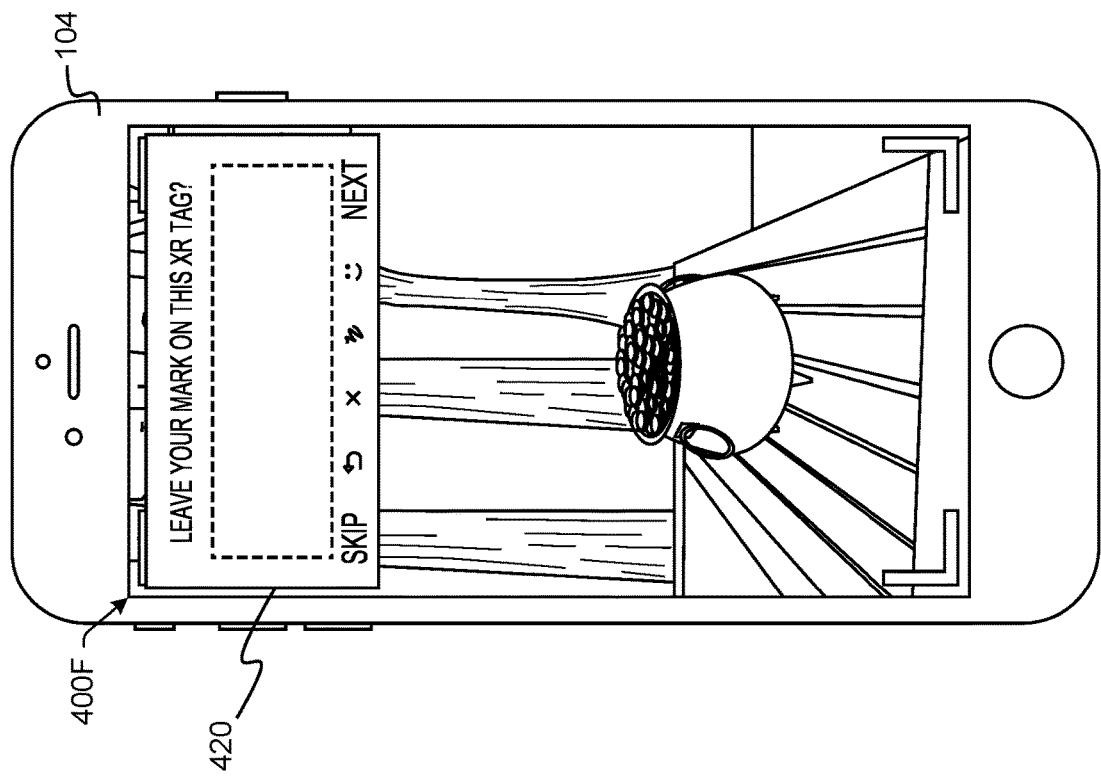
FIG. 4F is an example user interface for a user to leave their mark on an XR tag, according to an implementation of the present subject matter.
Figure 4E:
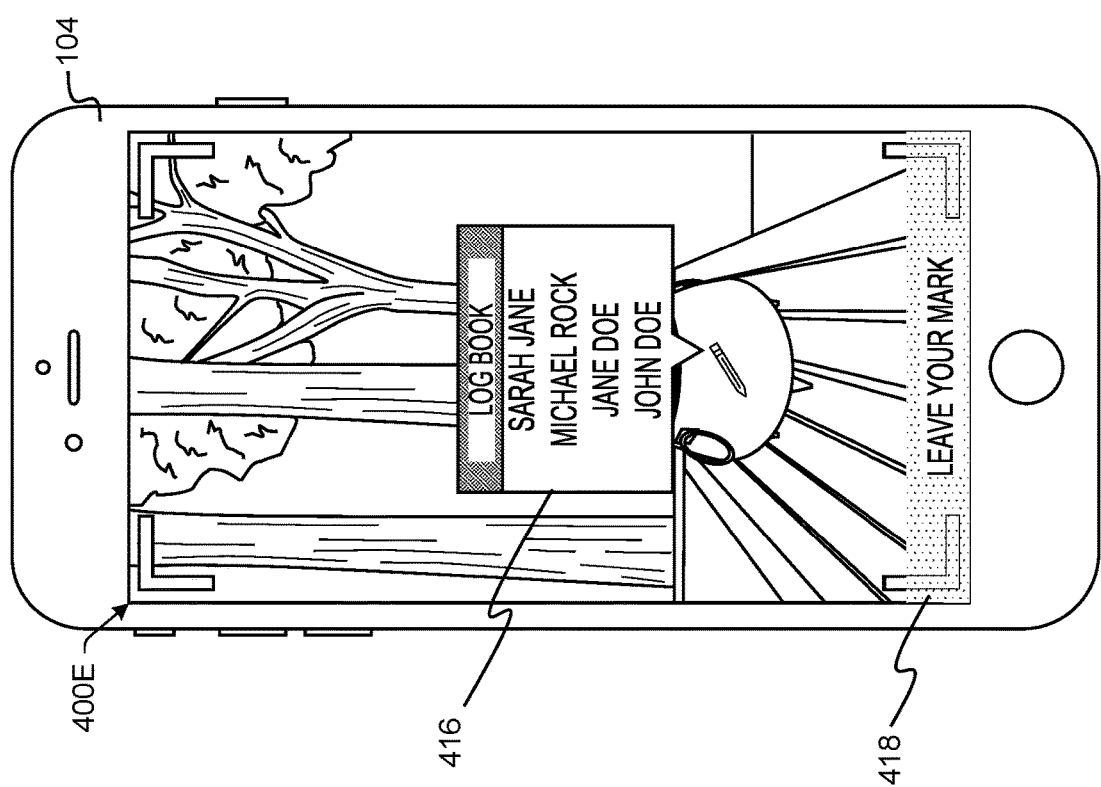
FIG. 4E is an example user interface presented in response to interacting with the visual indication of the log book, according to an implementation of the present subject matter.

In some examples, users 102(1) are able to leave their mark on the XR tag 108 (e.g., by signing their name). The ability to leave a mark on the XR tag 108 may be enabled upon the device 104 arriving at the location of the XR tag 108 and/or upon the user 102(1) triggering the claim action associated with the XR tag 108. FIG. 4D is an example user interface 400D that is presenting a visual indication 414 in association with an XR tag 108, according to an implementation of the present subject matter. This visual indication 414 may be visible through the XR camera lens. In the example of FIG. 4D, the visual indication 414 is a "pencil" icon displayed in front of the XR tag 108. The visual indication 414 may indicate that one or more other users have previously visited the location of the XR tag 108 and/or triggered claim actions associated with the XR tag 108. In some examples, the visual indication 414 is interactive, and interaction with (e.g., selection of) the visual indication 414 may reveal identifiers (e.g., names) of those other users (or previous visitors), as shown in the user interface 400E of FIG. 4E. In the example of FIG. 4E, a pop-up information element 416 is presented via the user interface 400E, the information element 416 including a digital log book with a list of identifiers (e.g., names) of other users who have previously visited the location of the XR tag 108 and/or triggered claim actions associated with the XR tag 108.

The example user interfaces 400D and 400E are further shown as presenting an interactive element 418 for the user 102(1) to leave their mark on the XR tag 108 by associating their identifier (e.g., their name, a payment proxy, or other identifier) with the XR tag 108. For example, in response to an interaction with the interactive element 418, the application 110 and/or the XR component 116 may cause display of the user interface 400F shown in FIG. 4F. The user interface 400F may present a field 420, such as a signature field, in which the user 102(1) can sign their name (or another identifier), thereby associating their identifier (e.g., their name) with the XR tag 108. After signing their name in the field 420, the user's 102(1) name may thereafter appear in the list of names shown in the information element 416 of the user interface 400E. In other words, after signing their name, the visual indication 414 associated with the XR tag 108 may indicate, to other users who view the XR tag 108, that the user 102(1) has visited the XR tag 108 and/or triggered the claim action associated with the XR tag 108. In some examples, the user interface 400F may present the field 420 in response to triggering a claim action associated with the XR tag 108. As such, the visual indication 414 associated with the XR tag 108 can indicate that the user 102(1) triggered the claim action. In some examples, the timing of validity of these user identifiers and/or the visual indication 414 is limited (e.g., an expiration date may be associated with each user identifier (e.g., name) in the log book such that they disappear after a period of time and/or in response to another event, such as the user removing their own identifier). In one example, a user's name may persist in the log book associated with the XR tag 108 for a predefined period of time (e.g., 24 hours), after which the user's name is no longer visible to other users. In some examples, other forms of personalization may be permitted, such as leaving messages for other users to discover, etc. In some examples, such user-generated content may be moderated (e.g., by human moderators, programmatic moderation tools, etc.). In some examples, user-placement of XR tags 108 may be moderated to ensure that user-generated XR tags 108 (e.g., XR tags 108 generated by the public) are not placed in locations that are off-limits, such as in dangerous locations where visitors could be easily harmed upon arriving at the location. In some examples, creators of XR tags 108 may revoke previously-placed XR tags 108, such as by accessing a user interface of the XR platform to remove an XR tag 108 that they created so that other users can no longer discover the XR tag 108 after revocation.

Figure 4G:
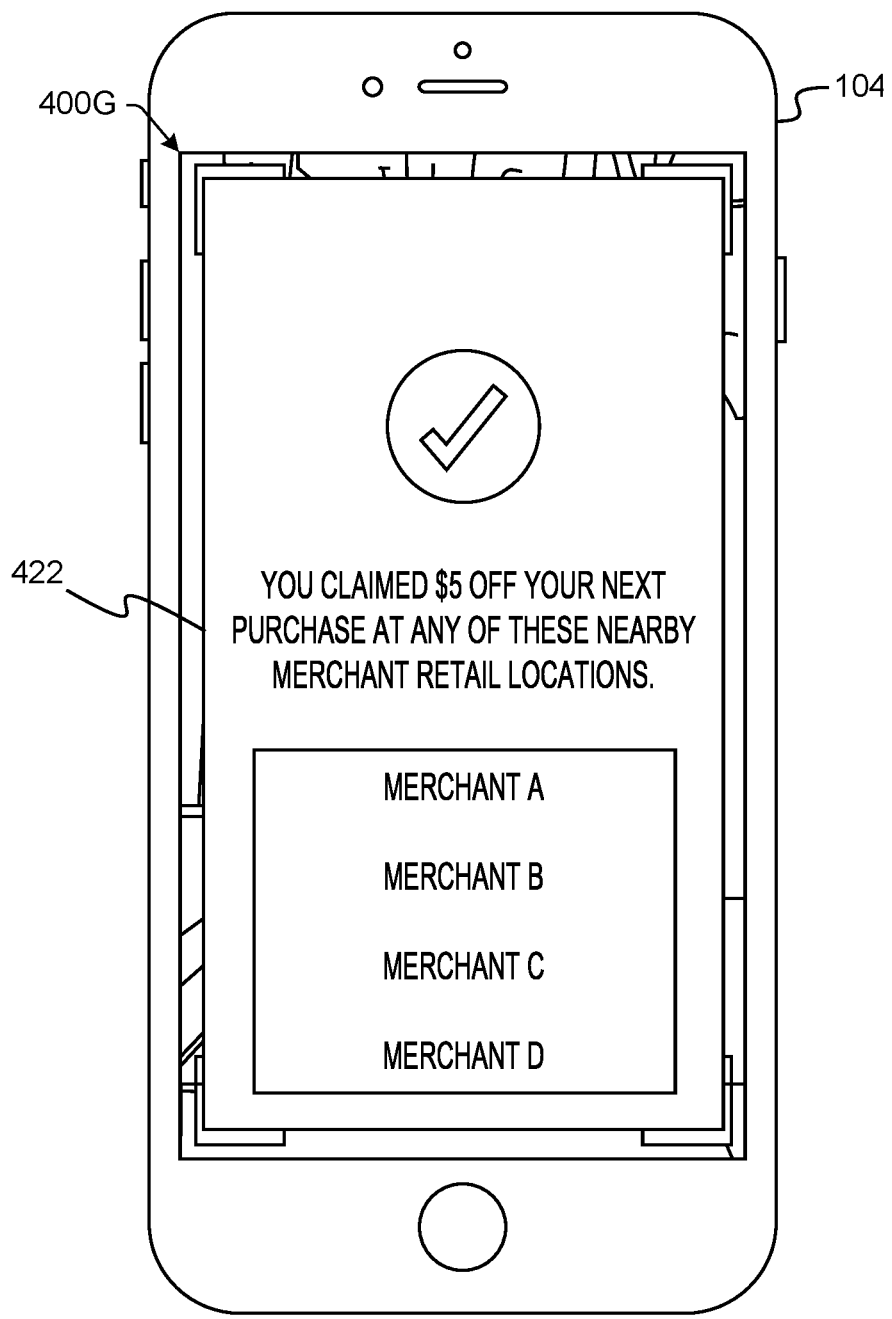
FIG. 4G is an example user interface confirming that an incentive associated with an XR tag has been successfully claimed, according to an implementation of the present subject matter.

FIG. 4G is an example user interface 400G (e.g., a success screen) confirming that an incentive associated with an XR tag 108 has been successfully claimed, according to an implementation of the present subject matter. The user interface 400G may be displayed after the user 102(1) has left their mark on the XR tag 108 (e.g., by signing their name in the field 420) and/or after the user 102(1) has triggered the claim action (e.g., claimed the incentive) associated with the XR tag 108 by interacting with the interactive element 410. In the example of FIG. 4G, the user interface 400G presents an information element 422 that provides details about the incentive that the user 102(1) claimed, such as the merchant locations where the incentive can be redeemed. In some examples, the incentive is customized to the user 102(1) based on a location associated with the user 102(1). For example, the user 102(1) may reside in Seattle, Washington and, as such, the merchants A-D shown in FIG. 4G may represent merchant locations in or near Seattle, Washington. This may be the case even if the user 102(1) captured the XR tag 108 elsewhere (e.g., while on vacation in Hawaii). In this manner, the incentive claimed by the user 102(1) can be personalized to the user 102(1) in the various ways described herein, including non-location based customization, such as based on the user's preferences, interaction history, etc. In some examples, an incentive can be associated with a single merchant, similar merchants, a service provider, or the like. As described above, in some examples, an XR tag 108 can be associated with claim action(s) other than incentives, as described above.

Figure 4H:
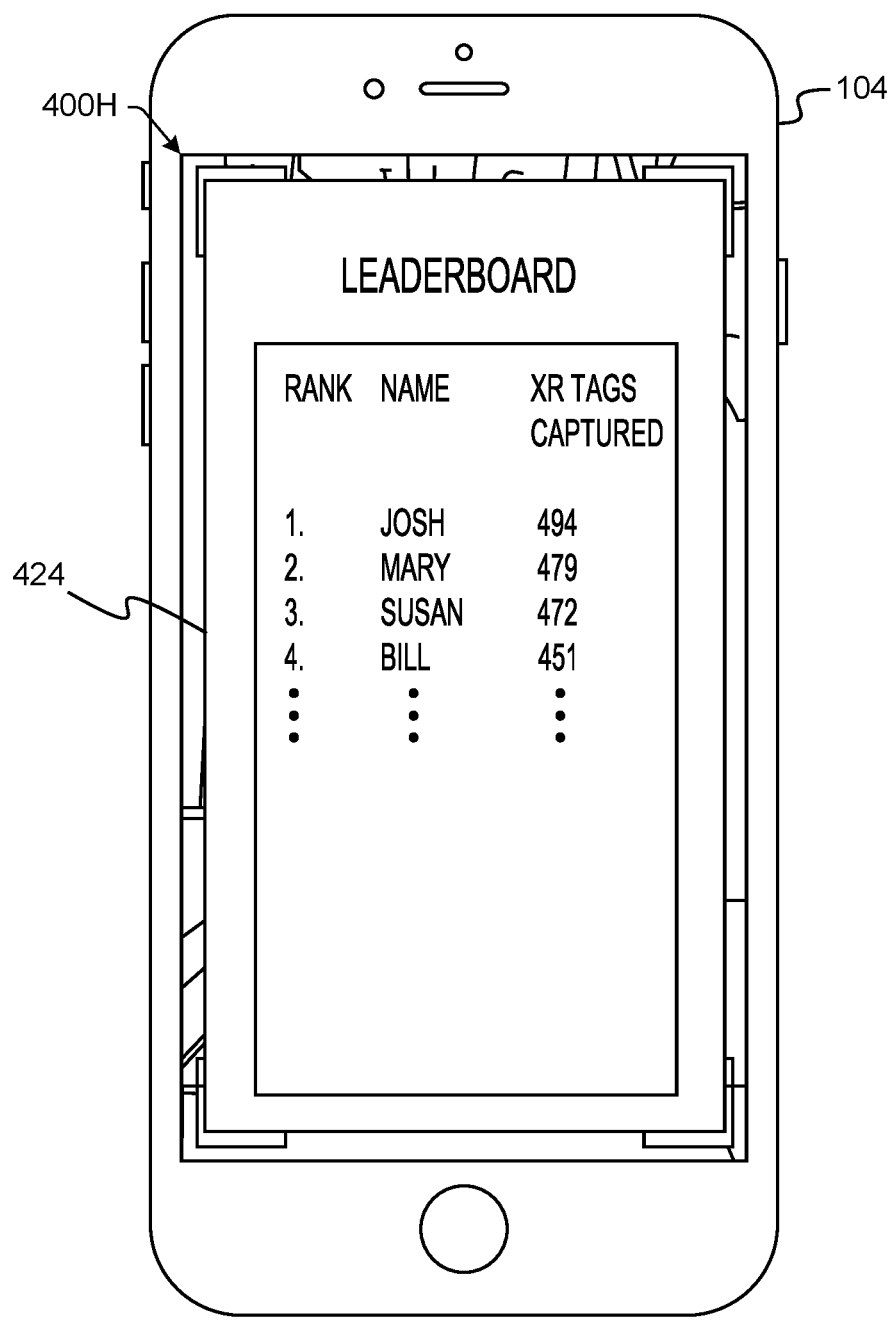
FIG. 4H is an example user interface showing a leaderboard of users who have accrued the most points or privileges on the XR platform, according to an implementation of the present subject matter.

FIG. 4H is an example user interface 400H (a leaderboard screen) showing a leaderboard 424 of users who have accrued the most points or privileges on the XR platform, according to an implementation of the present subject matter. As mentioned above, in some examples, technologies described herein can be gamified such that the collection or interaction of a threshold number of XR tags 108 or particular XR tags 108 (e.g., premium XR tags 108) can result in certain privileges, claim actions (e.g., with higher value or the like), points, etc. For example, users who capture a threshold number of XR tags 108 may unlock privileges, such as higher value claim actions (e.g., higher value incentives). In some examples, XR tags 108 may be associated with points, and users may tally a running score based on the number of XR tags 108 they have captured. In some examples, different XR tags 108 have differing values (e.g., some XR tags 108 are worth more points than other XR tags 108). In some examples, users can compete with other users for the most points or privileges. The user interface 400H shows an example of how users can compete with each other, such as by attempting to accrue enough points to have their name (or another user identifier) show up on the leaderboard 424.

Figure 5:
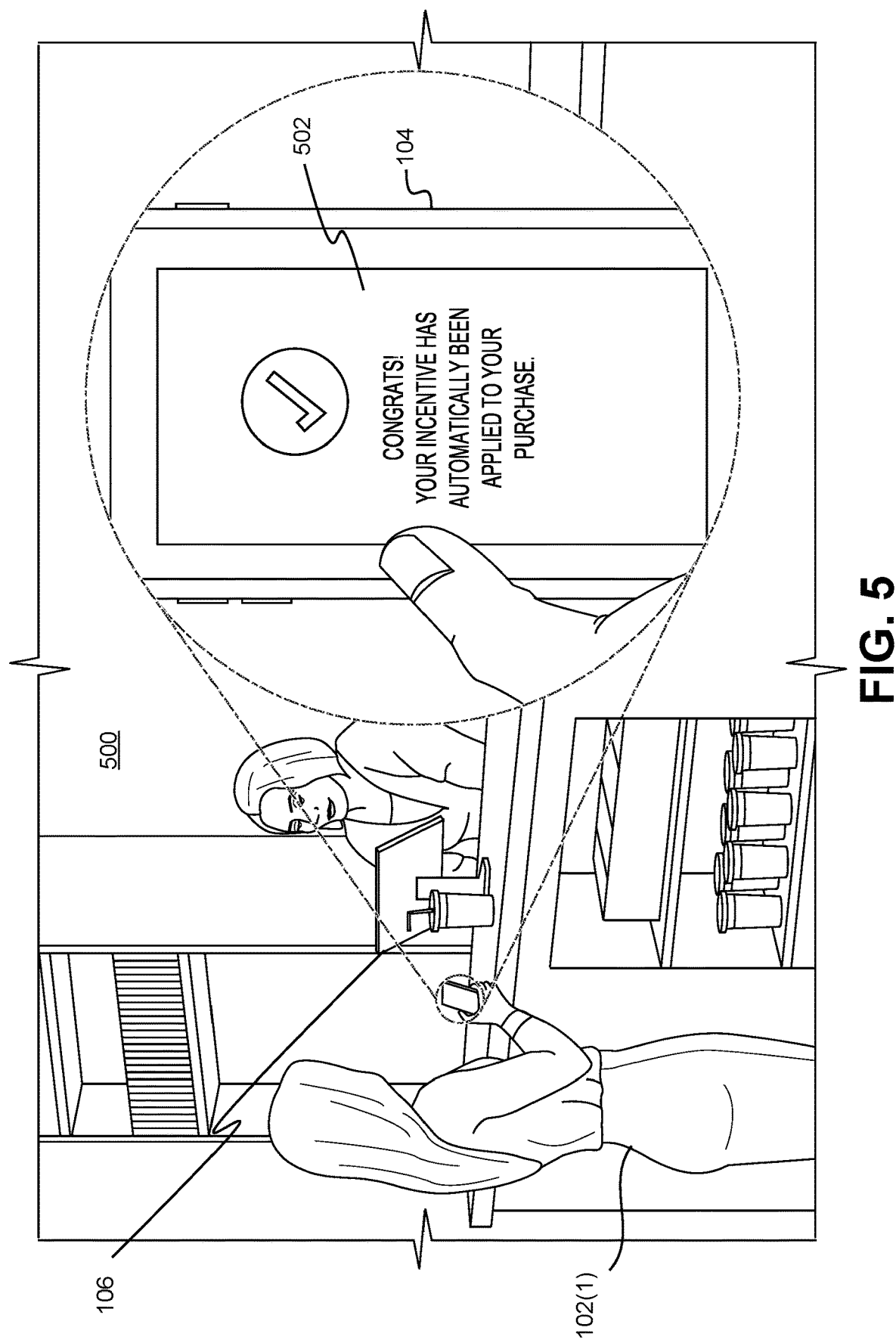
FIG. 5 is an example of an incentive being applied to a payment transaction between a user and a merchant, according to an implementation of the present subject matter.

FIG. 5 is an example of an incentive being redeemed during, or otherwise applied to, a payment transaction 152 between a user 102(1) and a merchant 118, according to an implementation of the present subject matter. The incentive may be the incentive that the user 102(1) claimed by interacting with (e.g., selecting) the interactive element 410 of FIG. 4C. The XR tag 108 may have been claimed in real-time during the transaction 152 (e.g., at the point-of-sale) or at an earlier time (e.g., when the user 102(1) was in a public park and discovered the XR tag 108 in the park). The payment transaction 152 in the example of FIG. 5 is with a merchant 118 associated with the claimed incentive, which takes place at a location 500 (e.g., a brick-and-mortar store) of the merchant 118. During the payment transaction 152, the claimed incentive is applied to the payment transaction 152. In the example of FIG. 5, the device 104 of the user 102(1) may display a user interface 502 that informs the user 102(1) about the application of the incentive to their transaction 152 with the merchant (e.g., a $5 discount on items purchased). The application of the incentive to the payment transaction 152 can be automatic in that the user 102(1) does not have to take extra steps (e.g., provide user input) to apply the incentive to the transaction 152 (or to otherwise redeem the incentive). In other examples, the user 102(1) may provide user input to apply the incentive to the transaction 152 (e.g., the application 110 may prompt the user 102(1) to apply the incentive to the transaction 152 during the transaction 152, and the user 102(1) may interact with an interactive element presented on a user interface to apply the incentive to the transaction 152 before the success screen 502 is shown to the user 102(1). In some examples, the user 102(1) may transact with the merchant 118 using a physical payment instrument (e.g., a credit card, debit card, a card linked to an account of the user 102(1), etc.), a virtual payment instrument, and/or an account associated with the user 102(1). In these examples, the incentive may have been associated with the payment instrument(s) and/or the account prior to the transaction 152 such that the incentive is automatically applied to the transaction 152. FIG. 5 illustrates an example of a transaction 152 between the user 102(1) and a merchant 118. Other types of payment transactions are contemplated as well, such as P2P payment transactions between users, a loan provided by a lender to the user 102(1), or the like. And, as described above, "redemption" or results of claim actions can be outside of the payment context.

In another example, which is not shown in FIG. 1, an application 110 (e.g., a web application) and/or a browser executing on the client device 104 may allow the user 102(1) (e.g., a customer) to browse items on a merchant's website or in the merchant's digital catalog, and/or the user 102(1) may walk into the merchant's brick-and-mortar store with the client device 104 executing the application 110 thereon. In these examples, when the customer 102(1) is ready to purchase an item, the customer 102(1) may interact with a rendered XR tag 108, e.g., by capturing it. The customer 102(1) can then select a "payment proxy" as a payment method (e.g., the payment proxy is made available based at least in part on the capture of the XR tag 108). In this way, the XR tag 108, when captured, serves as a mechanism to finalize a payment between the customer 102(1) and the merchant. For example, the merchant's website may include additional checkout options, such as a payment card (e.g., a debit or credit card such as VISA®, American Express®, etc.), and, in response to capturing the XR tag 108, a payment proxy checkout option may surface on the merchant's website. In a brick-and-mortar store scenario, the payment proxy checkout option may be presented on a checkout screen of a point-of-sale terminal and/or the application 110 executing on the user device 104 in response to capturing the XR tag 108. When the payment proxy is selected as the payment method, the customer 102(1) may be requested to enter a payment identifier, such as an email address, a phone number or payment proxy (e.g., $customername) as registered with a payment service associated with the PPS 112. Alternatively, the payment component 138 can automatically populate the payment field with the customer's payment proxy. The payment proxy and its relationship with a financial account of the customer 102(1) can be stored in the mobile device 104, e.g., in a secure enclave. The XR tag 108 may configure payment information to conduct the transaction via the payment proxy, apply any coupons, incentives, rewards, etc. to the transaction that are applicable to the customer 102(1), and the like.

The user interfaces 120, 200A-200E, 400A-400H, 502 are provided as examples of user interfaces that can be presented to facilitate techniques described herein. User interfaces can present additional or alternative data in additional or alternative configurations. That is, user interfaces 120, 200A-200E, 400A-400H, 502 should not be construed as limiting.

The processes described herein, e.g., FIGS. 6-9, are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
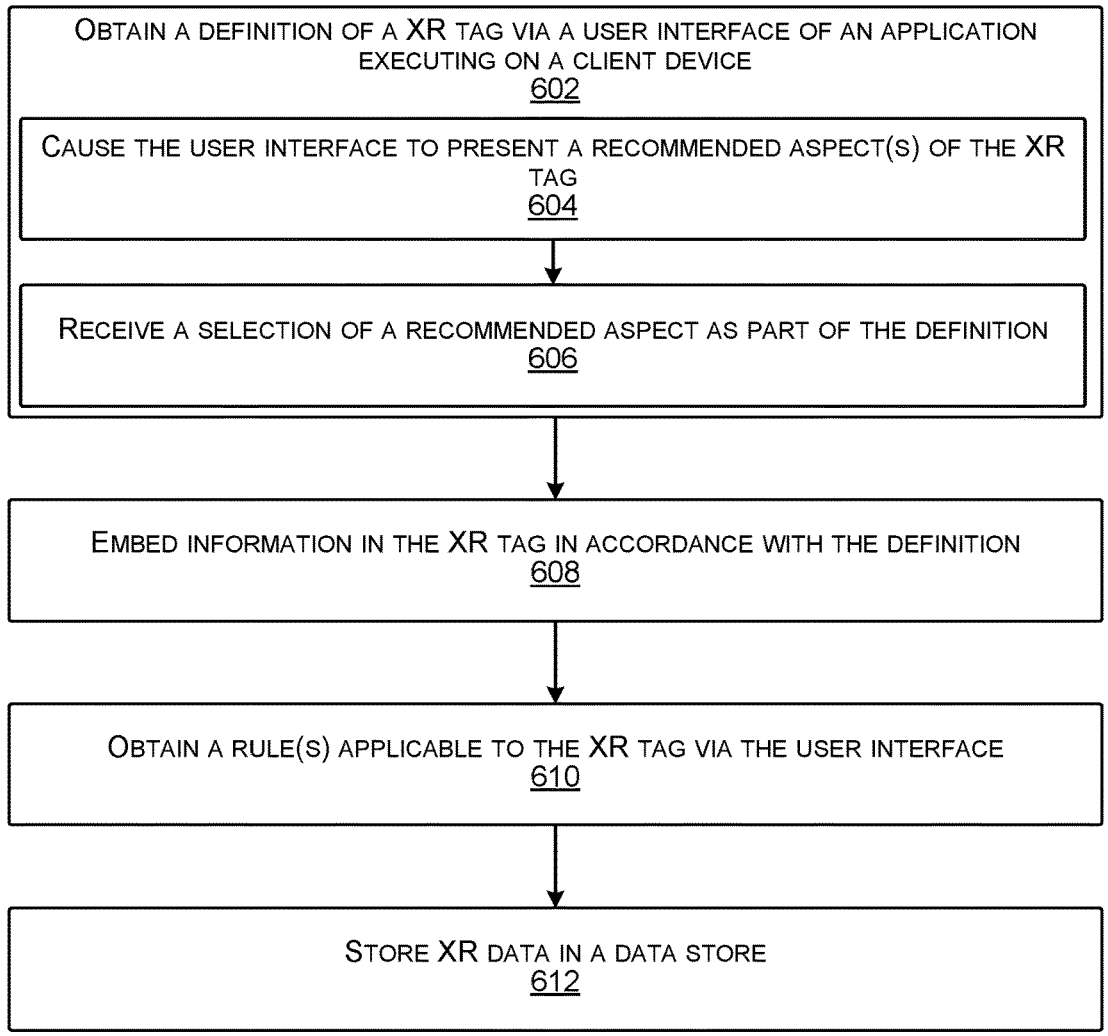
FIG. 6 is an example process for creating an XR tag based on a definition and a rule(s) obtained via a user interface, according to an implementation of the present subject matter.

FIG. 6 is an example process 600 for creating an XR tag based on a definition 134 and a rule(s) 136 obtained via a user interface, according to an implementation of the present subject matter. The process 600 can be implemented by a system (e.g., a computing device(s)) including one or more processors and memory storing computer-executable instructions to cause the one or more processors to perform the process 600. In some examples, the process 600 can be implemented by a server(s) 112 (and/or by a processor(s) thereof), a client device(s) 104, 106 (and/or by a processor(s) thereof), or a combination thereof. For discussion purposes, the process 600 is described with reference to the previous figures.

At 602, a definition of an XR tag is obtained via a user interface of a client device. For example, a definition of XR tag 134 of an XR tag 108 is obtained via a user interface(s) of an application 110 executing on a client device 106. In some examples, a computing device(s) (e.g., the server(s) 112, and/or a processor(s) thereof) may obtain the definition 134 at block 602 based on a user's interaction(s) with the user interface. Examples of such a user interface are shown in FIGS. 2A-2E (e.g., any of the user interfaces 200A-200E).

In some examples, the definition 134 obtained at block 602 allows for customizing the XR tag 108 to other client devices that are accessing the XR tag 108, users of the other client devices, and/or a creator of the XR tag 108. In some examples, the XR tag 108 is implemented as, and the definition 134 is associated with, a VR object, an AR object, or a MR object. In some examples, the definition 134 includes a preferred structural design of the XR tag 108, a preferred mode of interaction with the XR tag 108 (e.g., a task or action to be taken to capture or claim the XR tag 108), a feedback to the preferred mode of interaction, timing of validity and display of the XR tag 108 (e.g., the XR tag 108 can be temporarily available and can expire after an event, threshold period of time, etc.), a location where the XR tag 108 is to be rendered. In some examples, the definition 134 includes a geofence 148 surrounding a location, a claim action (e.g., an incentive) that is configured to be triggered by the users, and/or an appearance of the XR tag 108 and/or an appearance of one or more additional objects that are to be rendered with the XR tag 108. In some examples, the definition 134 includes timing of validity and display of visual indications 414, 416 of users who claim the XR tag 108. For example, the definition 134 may specify that users who claim the XR tag 108 can leave their mark on the XR tag 108, but the marks left on the XR tag 108 last for a period of time, and after a lapse of the period of time, the visual indications 414, 416 are no longer rendered in association with the XR tag 108. In some examples, the application 110 that displays the user interface at 602 is a payment application associated with a service provider of a payment service, an ordering application associated with a service provider of an item ordering service or an item delivery service, or any other suitable type of application.

In some examples, the user can define attributes of the XR tag 108 with various levels of granularity. Examples of attributes include: the look-and-feel of the XR tag 108; display properties; rules associated with the XR tag 108, such as when should the XR tag 108 be displayed, to whom should the XR tag 108 be displayed, what portions of the XR tag 108 should be displayed, etc.; where and how the XR tag 108 should be placed or reproduced, for example with respect to real-life objects; any time restrictions or preferences; any location restrictions or preferences; dimensions of the XR tag 108; validity of the XR tag 108; a geographical boundary defined via e.g., a geofence 148; a type of gesture that will allow another user to capture XR tag 108 (tap via requesting application, signature via requesting application, and so on); a claim action associated with a specific XR tag 108 (e.g., increase cash balance; unlock a specific feature within the requesting application; or obtain a merchant specific reward—gift coupon, etc.); and so on. The user can specify contextual details as to when, how, and where the XR tag 108 is generated and further details with respect to the capture of the XR tag 108 by the audience for whom it is intended and for those it is not intended. In cases where the user does not specify such details, the PPS 112 (e.g., the generation component 140) can apply default values. Such default values can also be obtained by training data from other users, e.g., similar users, and applying to a machine learning model, to generate the attributes for a specific XR tag 108, such that the PPS 112 automatically generates and associates XR tags 108 to a user. For example, in response to a similar user in Chicago generating an XR tag 108, the PPS 112 can generate and associate similar XR tags 108 to an unrelated user in San Francisco so that the user can avail the same benefits as the user in Chicago.

In some examples, at 604, the user interface of the application is caused to present one or more recommended aspects of the XR tag. For example, the user interface of the application 110 is caused to present one or more recommended locations where the XR tag 108 is renderable. As another example, the user interface of the application 110 may be caused to present one or more recommended appearances for the XR tag 108, one or more recommended capture methods of the XR tag, and/or one or more recommended claim actions for the XR tag 108. In some examples, at 606, a selection of an aspect from amongst the recommended aspect(s) is received via the user interface. For example, a selection of a location, an appearance, a capture method, and/or a claim action from amongst the recommended location(s), appearance(s), capture method(s), and/or claim action(s) is received via the user interface. In some examples, a computing device(s) (e.g., the server(s) 112, and/or a processor(s) thereof) may cause the user interface to present the recommended locations at block 604 and receive a selection of a recommended location via the user interface at block 606. An example of presenting such recommended locations is shown in FIGS. 2A and 2B via the user interface 200A and the user interface 200B, respectively.

At 608, information is embedded in the XR tag. For example, information is embedded in the XR tag 108 in accordance with the definition 134 of the XR tag 108. In some examples, a computing device(s) (e.g., the server(s) 112, and/or a processor(s) thereof) may embed the information in the XR tag 108 at block 608. In some examples, the information embedded in the XR tag 108 includes one or more claim actions that are configured to be triggered by users. In some examples, the claim actions (e.g., incentives) are associated with a merchant 118, a merchant category, and/or a service provider. In some examples, the claim action represents one or more of a variety of incentives (e.g., a discount, cash back, a multiple of a discount or cash back, a gift with purchase, an allocation/acquisition of an asset (e.g., stocks, bitcoin, etc.), an non-fungible token (NFT), etc.), or the like. In some examples, the information embedded in the XR tag 108 includes an additional or alternative claim action, which can be determined at the time of the embedding or at the time of capture, for example, based on context. In some examples, an XR tag 108 can be associated with multiple claim actions which can present differently for different users based on context associated therewith.

At 610, one or more rules applicable to the XR tag are obtained. For example, one or more rules 136 applicable to the XR tag 108 are obtained via the user interface of the application 110. In some examples, a computing device(s) (e.g., the server(s) 112, and/or a processor(s) thereof) may obtain the rule(s) 136 at block 610. In some examples, rule(s) obtained at block 610 allows for customizing the information embedded in the XR tag 108 to other client devices that are accessing the XR tag 108 and/or to users of the other client devices. In some examples, the rule(s) 136 obtained at block 610 includes a rule to customize the information embedded in the XR tag 108 based on identity of a client accessing the XR tag 108 at the rendered location, a rule to customize the information embedded in the XR tag 108 based on identity of another client device accessing the XR tag 108 at the rendered location, a rule to apply the customization to the XR tag 108, and/or any other suitable rule. In some examples, the rule(s) 136 obtained at block 610 includes a rule to customize the information embedded in the XR tag 108 based at least in part on preferences of users who access the XR tag 108, locations associated with other client devices that are accessing the XR tag 108 and/or the users of those other client devices, and/or an interaction history associated with the users. The interaction history may include transaction history, browsing history, music streaming/content consumption history, and/or social media history.

At 612, data representing the XR tag is stored. For example, data (e.g., XR data 132) representing the XR tag 108 is stored in a data store 126. In some examples, a computing device(s) (e.g., the server(s) 112, and/or a processor(s) thereof) may store the data at block 612. Storing the data (e.g., XR data 132) at block 612 makes the stored data accessible for one or more devices of the XR platform to access at runtime, such as to place and/or render the XR tag 108.

Figure 7:
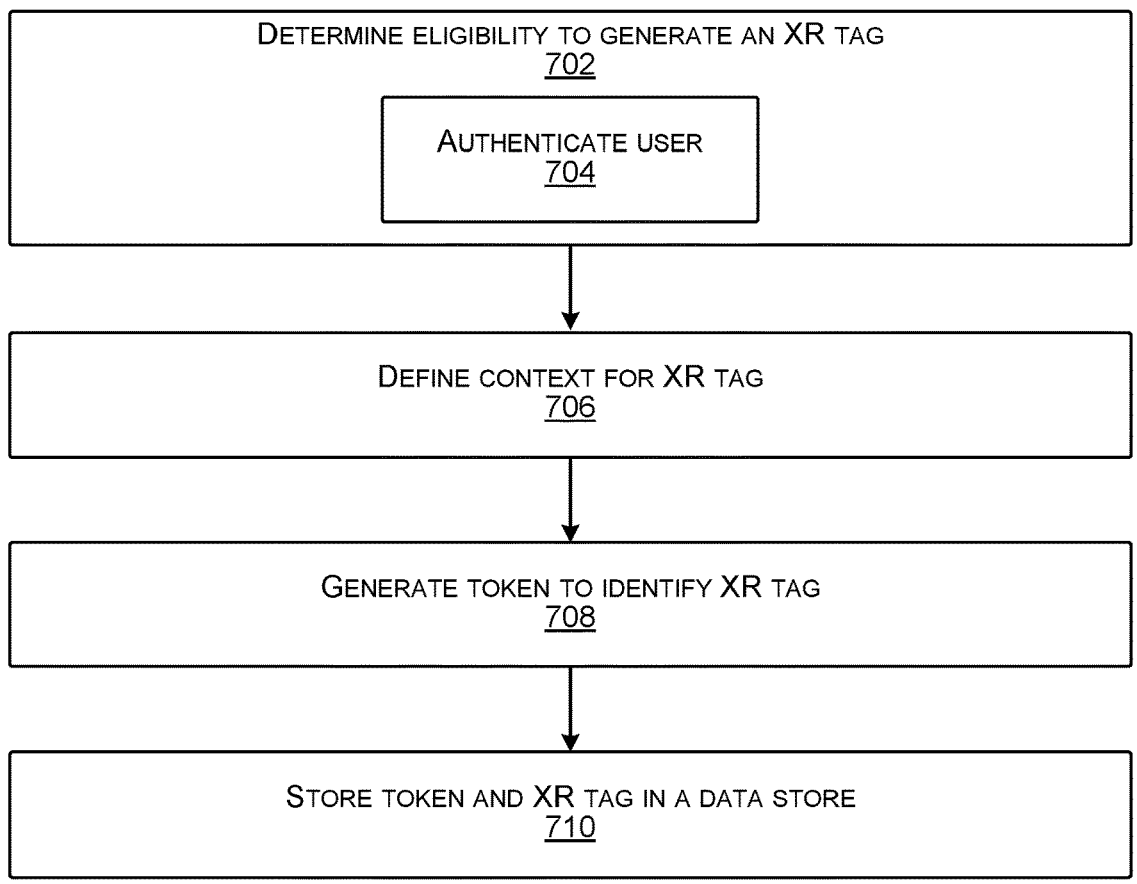
FIG. 7 is an example process for generating an XR tag, according to an implementation of the present subject matter.

FIG. 7 is another example process 700 of generating an XR tag 108, according to an implementation of the present subject matter. The process 700 can be implemented by a system (e.g., a computing device(s)) including one or more processors and memory storing computer-executable instructions to cause the one or more processors to perform the process 700. In some examples, the process 700 can be implemented by a server(s) 112 (and/or by a processor(s) thereof), a client device(s) 104, 106 (and/or by a processor(s) thereof), or a combination thereof. For discussion purposes, the process 700 is described with reference to the previous figures. Referring to FIG. 7, XR tags 108 can be automatically generated, e.g., when a merchant 118 sets up a service, such as loyalty program associated with the PPS 112 or when a customer signs up for a P2P service. Alternatively, the XR tags 108 can be generated manually, through a user interface(s) of an application 110 described herein.

At 702, eligibility to generate an XR tag 108 is determined. In some examples, a computing device(s) (e.g., the client device(s) 104, 106, and/or a processor(s) thereof) may determine the eligibility at block 702. For example, the XR component 116 can verify the permissions granted to a user 102 to generate the XR tags 108. The XR component 116 can track permissions granted by a user 102 to various applications to make generation requests via the XR application 110. Those applications that have been permissioned to generate the XR tags 108 can execute in the background. For example, if the XR application 110, and therefore associated user 102, has a valid permission, then the XR component 116 handles the generation request by sending a request to the PPS 112 to generate XR tag 108. If, for example, the XR application 110 does not have a valid permission, the application XR component 116 can decline to process the generation request and/or send a notification to the customer 102(1) to get appropriate permissions.

The XR component 116, in some embodiments, can receive and store preference settings for the user for handling generation requests. Such settings can be saved on the server (e.g., in the data store 126) or locally on the user device (e.g., the device 104). For example, the XR component 116 can check with a permissions manager to determine whether an XR tag 108 generation request from a requesting application 110 (e.g., the requesting application 110 can be a browser application that can be used to access a website or a web application or a mobile e-commerce application installed on the mobile device 104) meets a set of rules set up by the user (e.g., a payment amount threshold) and process the generation request when the generation request meets the conditions associated with the rules. The XR management component 122 on the PPS 112, in some embodiments, can track and store a history of generation requests from each XR application 110 executing on the user devices, as owner and permissions are checked to determine if they can offer rewards. In some examples, at 704, a user is authenticated. For example, a user 102 of a client device 104, 106 may be authenticated in association with an XR tag 108 generation request. This authenticating at block 704 may confirm that the user is authorized or otherwise eligible to generate XR tags 108 (e.g., authorized by a merchant 118 to create XR tags 108 on behalf of the merchant 118).

At 706, a context for the XR tag is defined. For example, based at least in part on determining, at 702, that a user 102 is eligible to generate an XR tag 108, context is defined for the XR tag 108. In some examples, a computing device(s) (e.g., the client device(s) 104, 106, and/or a processor(s) thereof) may define the context for the XR tag 108 at block 706. For example, users can define a geofence 148, an incentive (such as a fixed dollar amount, reward, etc.) or other claim action, XR data (e.g., VR data, AR data, MR data, etc.), environment data, etc. If the users do not provide this information, the system can automatically generate this data based on purchase history, transaction history, what other users are doing, conflicting rewards, conflict resolution etc. In some examples, when a user (e.g., merchant 118) is ready to generate XR tags 108, the user provisions the PPS 112 with location permissions, for example in response to the requesting application 110 asking a user to "allow location access." Upon granting access to user's device location, or location of the device 104, 106 on which the requesting application 110 is executing, a user's location is sent to the PPS 112, e.g., in the Hypertext Transfer Protocol (HTTP) header of requests to the PPS 112. The location data can also be used as a risk signal to detect whether a payment transaction is unauthorized, e.g., if a card present transaction is taking place at a location that is not proximate to where the device 104 (e.g., phone) was last seen. In some implementations, the requesting application can also register for "significant location change notifications," as described above. This allows the requesting application 110 to wake up in the background when the computing device 104, e.g., phone, has moved a predetermined distance deemed to be a "significant" distance. The significant distance can be controlled by the operating system of the computing device 104 such that the significant distance is detected when a new cell phone tower is picked up by the phone. Alternatively, the significant device can also use other location tracking mechanisms, such as GPS tracking, to detect whether or not significant distance is moved. In one implementation, the requesting application 110 includes a remote procedure call so that the computing device 104 can quickly update the PPS 112 regarding its current location, or its current location when the application 110 makes such a request. In one example, the geofence 148 can be generated based on, for example, location indicators such as city name, street name, etc., location coordinates, latitude, longitude, radius of the fence 148, In one example, a claim action can be a monetary incentive, a feature flag, or a merchant reward. In one example, the XR data can include nature of asset, scale, elevation pitch, yaw, branding specification, visual look and feel, and the XR data may dictate what assets are displayed. The environment data can be the elevation, e.g., relative to the horizon line, of placement, asset heading in degrees from 0 to 360 degrees where N=0 and south is 180 degrees; asset pitch in degrees where 0 is horizontal to the horizon, and 180 is upside down; and the roll of the asset in degrees.

At 708, a token is generated. For example, a token that identifies the XR tag 108 is generated. In some examples, a computing device(s) (e.g., the server(s) 112, and/or a processor(s) thereof) may generate the token at block 708. The token generated at block 708 can include unique information pertaining to the geofence 148, claim actions including monetary and/or non-monetary incentives (cash balance=1, feature flag=2, or a merchant reward=3), conditions on which XR tag 108 claim actions are triggered (including timing constraints).

At 710, the token is stored. For example, the token and the associated XR tag 108 are saved in the data store 126. In some examples, a computing device(s) (e.g., the server(s) 112, and/or a processor(s) thereof) may store the token and the XR tag 108 at block 710. Storing the data (e.g., token, XR tag 108, etc.) at block 710 makes the stored data accessible for one or more devices of the XR platform to access at runtime, such as to place and/or render the XR tag 108. The XR tag 108 can be customized with provided context, in some examples.

Figure 8:
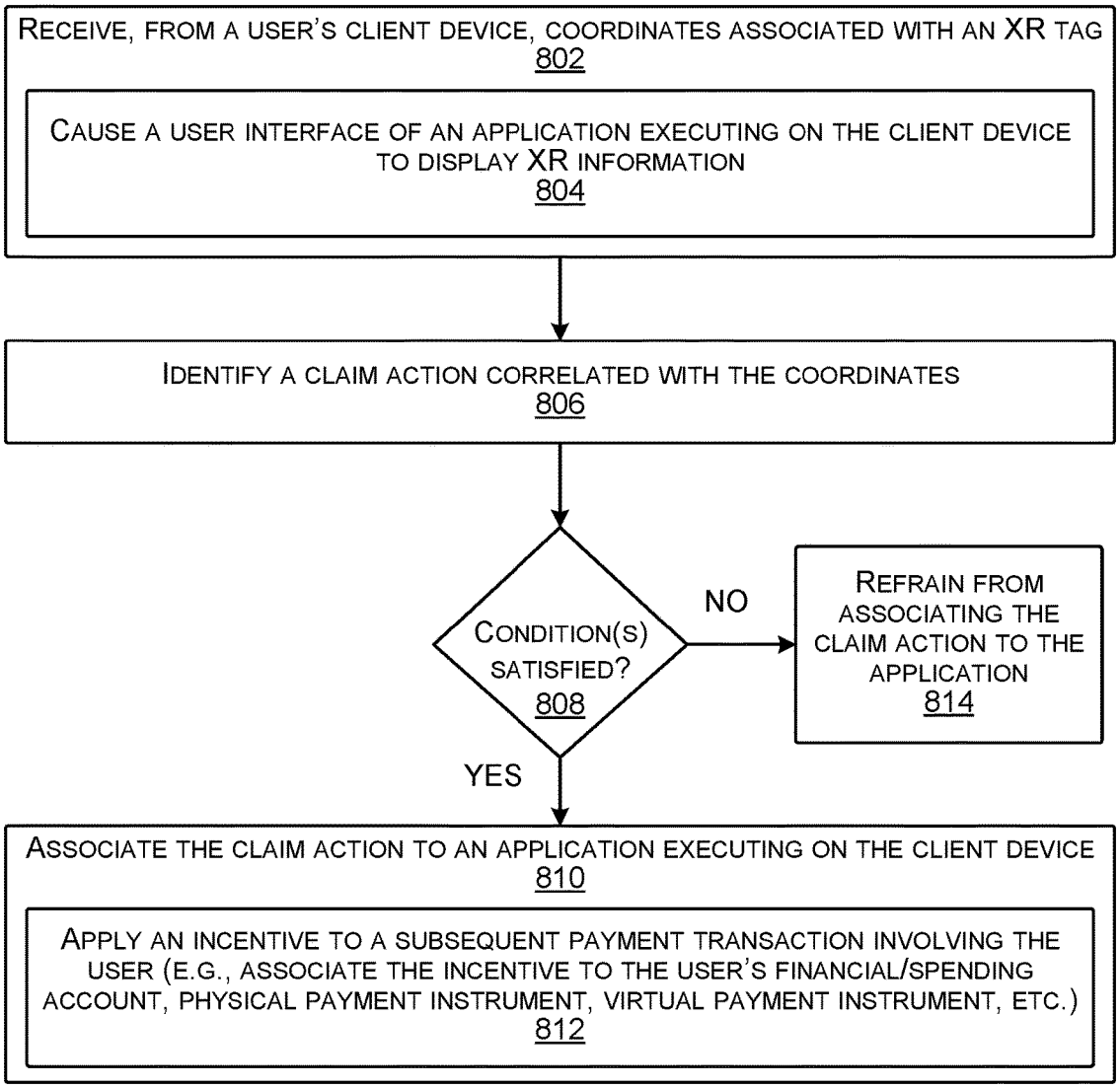
FIG. 8 is an example process for capturing an XR tag, according to an implementation of the present subject matter.

FIG. 8 is an example process 800 for capturing an XR tag 108, according to an implementation of the present subject matter. The process 800 can be implemented by a system (e.g., a computing device(s)) including one or more processors and memory storing computer-executable instructions to cause the one or more processors to perform the process 800. In some examples, the process 800 can be implemented by a server(s) 112 (and/or by a processor(s) thereof), a client device(s) 104, 106 (and/or by a processor(s) thereof), or a combination thereof. For discussion purposes, the process 800 is described with reference to the previous figures.

At 802, coordinates associated with an XR tag are received. For example, coordinates associated with an XR tag 108 are received from a client device 104 of a user 102(1). In some examples, a computing device(s) (e.g., the server(s) 112, and/or a processor(s) thereof) may receive the coordinates at block 802, such as by receiving context data 150 including the coordinates. In some examples, the XR tag 108 is rendered via the client device 104 at a time when the coordinates are received at block 802. In some examples, the coordinates correspond to a location identifiable on a map, such as a map of a geographical area on Earth, a map of an area of a virtual world, or the like. In some examples, the coordinates correspond to a map feature, such as a landmark on the map, a point location, a cross-section, or any other suitable map feature. In some examples, a request for information associated with the XR tag 108 rendered at a scene is received at block 802, by the PPS 112 and from an application 110 executing on the client device 104 of the user 102(1). In this example, the coordinates are received at block 802 in association with the request for information. In some examples, the application 110 executing on the client device 104 generates a request to render the XR tag 108 with embedded information for the client device 104, and the coordinates are received at block 802 in association with the request to render the XR tag 108 with the embedded information. In some examples, the XR tag 108 is implemented as a VR object, an AR object, or a MR object.

In some examples, at 804, a user interface is caused to present XR information. For example, a user interface of the application 110 executing on the client device 104 is caused to present XR information. In some examples, a computing device(s) (e.g., the server(s) 112, and/or a processor(s) thereof) may cause the user interface to present the XR information at block 804. The presented XR information may include, but is not limited to, the XR tag 108, an interactive element 410 for the user 102(1) to trigger the claim action associated with the XR tag 108, an interactive element 418 for the user 102(1) to associate a visual indication 414, 416 with the XR tag 108 (e.g., the visual indication 414, 416 to indicate, to other users who view the XR tag 108, that the user 102(1) has triggered the claim action), and/or one or more visual indications 414, 416 of one or more other users who have previously triggered claim actions correlated with the coordinates. In some examples, a determination as to whether to render the XR tag 108 is made (e.g., by the PPS 112 executing the placement component 142) based on the definition 134 and the one or more rules 136 associated with the XR tag 108. Based on a determination to render the XR tag 108, the rendered XR tag 108 may be displayed on the user interface of the client device 104 at block 804.

At 806, a claim action is identified. For example, a claim action correlated with the coordinates is identified. In some examples, a computing device(s) (e.g., the server(s) 112, and/or a processor(s) thereof) may identify the claim action at block 806. In some examples, information correlated with the coordinates is accessed from a data store 126 (e.g., database) of the PPS 112, and the information includes the claim action. In some examples, the claim action is customized to the user 102(1) and/or the client device 104. In some examples, the claim action is customized to the user 102(1) and/or the client device 104 by selecting the claim action from multiple claim actions based at least in part on a preference of the user 102(1), a location associated with the user 102(1) and/or the client device 104, and/or an interaction history associated with the user 102(1). In some examples, the interaction history includes a transaction history, browsing history, music streaming/content consumption history, social media history, or the like. In some examples, the claim action identified at block 806 is associated with a merchant 118.

At 808, a determination is made as to whether a condition(s) is/are satisfied or otherwise met. In some examples, a computing device(s) (e.g., the server(s) 112, and/or a processor(s) thereof) may determine whether the condition(s) is/are satisfied or otherwise met at block 808. Various types of data may be evaluated at block 808 to determine whether various different conditions are satisfied or otherwise met. In one example, the PPS 112 receives, from the application 110 executing on the client device 104, a history of previous locations of the client device 104 prior to the receiving of the coordinates at block 802, and the PPS 112 determines, based at least in part on the history of previous locations, that the client device 104 traveled from an origin to a destination that is within a threshold distance of the coordinates. This can ensure that the user 102(1) physically visited the location of the XR tag 108 and did not suddenly arrive at the XR tag's location to prevent fraudulent use of the XR platform. Thus, the condition may be met at block 808 if the PPS 112 determines that the client device 104 traveled from an origin to its current position, as opposed to appearing to have teleported to its current position. In another example, the PPS 112 receives, from the client device 104, and in association with the coordinates received from the client device 104 at block 802, orientation data (e.g., a heading, such as a compass heading) indicative of an orientation of the client device 104, and the PPS 112 determines, based at least in part on the orientation data, that the orientation of the client device 104 is within a predefined value range (e.g., the heading, such as the compass heading, is pointing toward the XR tag 108). This can ensure that the user 102(1) look directly at the XR tag's location while holding the client device 104 in front of them. Thus, the condition may be met at block 808 if the PPS 112 determines that the client device 104 is oriented in a manner that indicates the user is facing the XR tag 108 to prevent fraudulent use of the XR platform. In yet another example, the PPS 112 determines a number of previous claim actions triggered by the user 102(1) over a period of time, and the PPS 112 determines, based at least in part on the number of previous claim actions, whether a rate at which the user 102(1) has triggered claim actions satisfies a threshold rate. In other words, users may be rate-limited to triggering a maximum number of claim actions over a given period of time, such as a certain number of claim actions per day. Thus, the condition may be met at block 808 if the PPS determines that the rate at which the user 102(1) has triggered claim actions fails to satisfy the threshold rate, meaning that they still have claim actions remaining in their allotted number of claim actions. In some examples, the determination as to whether the condition(s) is/are met at block 808 is based at least in part on an interaction history associated with the user 102(1), which may be available from the data store 126. Thus, the condition may be met at block 808 if the PPS 112 determines that the user 102(1) has conducted certain transactions, a certain number of transactions, streamed or otherwise consumed certain content, a certain amount of content, etc. If the condition(s) is/are met at block 808, the process 800 follows the YES route from block 808 to block 810.

At 810, the claim action is associated to an application. For example, based at least in part on the condition(s) being met, the claim action is associated to an application 110 executing on the client device 104. In some examples, a computing device(s) (e.g., the server(s) 112, and/or a processor(s) thereof) may associate the claim action to the application at block 810. In some examples, associating the claim action to the application at block 810 causes an incentive to be applied (e.g., automatically applied) to a subsequent payment transaction of which the user 102(1) is a party. In some examples, the claim action is associated to the application 110 in response to an interaction with an interactive element 410 (e.g., a "claim incentive" button presented via a user interface 400C). In some examples, at 812, the associating of the claim action to the application 110 includes associating an incentive to an account. For example, the associating of the claim action to the application 110 includes associated an incentive to a financial/spending account associated with the user 102(1). In this example, the subsequent payment transaction is to be made from a stored balance associated with the account (e.g., the financial/spending account). In some examples, the transaction is made from the account associated with the user 102(1) to an account associated with a merchant 118, such as when the merchant 118 is an additional party of the subsequent payment transaction. In some examples, the associating of the claim action to the application 110 includes associating an incentive with a physical payment instrument associated with the user 102(1), wherein the incentive is configured to be automatically applied to the subsequent payment transaction conducted using the physical payment instrument. In some examples, the associating of the claim action to the application 110 includes associating an incentive with a virtual payment instrument associated with the user 102(1), wherein the incentive is configured to be automatically applied to the subsequent payment transaction conducted using the virtual payment instrument. In some examples, the incentive is configured to be automatically applied to the subsequent payment transaction conducted using the application 110 by withdrawing funds from a stored balance associated with the user's 102(1) account. In some examples, other claim actions can be associated and/or applied to transactions, as described above. If the condition(s) is/are not met at block 808, the process 800 follows the NO route from block 808 to block 814 where the computing device(s) (e.g., the server(s) 112, and/or a processor(s) thereof) refrains from associating the claim action to the application 110.

Described herein are example applications of the XR platform, which can be implemented in different environments or a single environment that offers different scenarios. Different environments and/or scenarios can result in different user experiences. In some examples, the client device 104, executing the XR component 116, may be configured to identify people around a user 102(1) operating the device 104, to determine whether the identified people have an entry in a transfer database for a pending transaction with the user 102(1), and to facilitate a digital data transfer (e.g., a P2P transfer) with identified people that have a pending transaction with the user 102(1). In an illustrative use case, a person 102(1) employing the client device 104 is approached by a second person 102(2). The client device 104 captures an image of the second person 102(2) and performs facial recognition on the captured image to determine whether there is a pending entry in a transfer database (e.g., the data store 126) for the second person 102(2). In some examples, the client device 104 receives an activation command from a first person 102(1) (e.g., the client device 104 user) to configure the client device 104 for performing digital data transfers. The user provides the activation command to the client device 104 by using a keypad, a button, a switch, a graphical user interface, a voice command, a gesture, a biometric signal, or any other suitable mechanism. The activation command is also used to authenticate the user 102(1). For example, the processor(s) of the PPS 112 authenticates the user based on credentials (e.g. a log-in and/or password) and/or a biometric signal provided by the user 102(1). Upon authenticating the user 102(1), the client device 104 allows the user 102(1) to read and write entries in a transfer database (e.g., the data store 126) and to perform digital data transfers. The client device 104 also identifies the user 102(1) and/or identifies a person identifier for the user 102(1) upon authenticating the user 102(1). Once activated, the client device 104 allows the user to perform normal daily activities while continuously trying to identify people the user 102(1) interacts with or sees. The client device 104 captures an image of a second person 102(2). The second person 102(2) may be a friend, relative, or any other person the user 102(1) sees or would like to make a digital data transfer with. In one embodiment, the client device 104 triggers the camera to capture the image of the other person 102(2). In another embodiment, the camera automatically captures the image of the other person 102(2). The camera captures one or more images of the other person that includes at the other person's face. The client device 104 may notify the first person 102(1) via the display of the client device 104 that an entry in the transfer database has been identified for the second person 102(2). For example, the client device 104 may present the notification as a XR tag 108 (e.g., at block 804 of the process 800). The XR tag 108 may include an identifier of the second person 102(2), a face image of the second person 102(2), and/or a resource identifier using information from the entry for the second person 102(1). The XR tag 108 may comprise any other information or combination of information. The client device 104 may present the XR tag 108 in real-time as an overlay onto one or more tangible objects in a real scene using AR technology, in one example. Examples of tangible objects include, but are not limited to, buildings, trees, landmarks, people, objects, or any other physical objects. In this illustrative use case, a remainder of the process 800 may be performed to associate a claim action to an application 110 executing on the client device 104 (e.g., to apply the incentive to a subsequent P2P transaction between the users 102(1) and 102(2)).

In another illustrative use case, a customer 102(1) having a customer device 104 approaches a geofence 148 that may include items at a specific merchant 118 or a merchant store, such as merchant 118(2) associated with merchant device 106(2), or a location that is otherwise unrelated to the merchant 118 but where the merchant 118(2) has placed one or more XR tags 108. Once the device 104 is within the geofence 148 of the device 106(2) or the XR tag(s) 108, the customer 102(1) may be able to see the XR tag(s) 108 on the display of the device 104 (e.g., at block 804 of the process 800). The user interface of the device 104 may also present the XR tags 108 in real-time as an overlay onto one or more tangible objects in a real scene using AR technology, in some examples. Such XR tag(s) 108 may not be visible on the display outside the geofence 148. The computing device 104, through the XR application 110 and/or XR component 116, may capture the XR tag 108 (e.g., by capturing an image of the XR tags 108 and performing image recognition on the captured image) to determine whether there is a pending entry in the transfer database for the captured image. The computing device 104 may notify the customer 102(1) via the display of the device 104 that an entry in the transfer database has been identified for the captured image. For example, the computing device 104 may enact on the action associated with the captured image, as dictated by the pending entry. Additionally or alternatively, the captured image may include a merchant identifier, and/or a resource identifier using information from the entry. In this illustrative use case, a remainder of the process 800 may be performed to associate a claim action to an application 110 executing on the client device 104 (e.g., to apply an incentive to a subsequent transaction between the customer 102(1) and the merchant 118(2)).

Consider another retail scenario in which a customer 102(1) selects items in a store associated with a merchant 118 or a service provider, adds the selected items in a shopping cart, and asks for the purchased items to be delivered to the customer's address of choice. Typically, to conduct these transactions, users enter any number of parameters (e.g., transaction participants, desired items, payment amounts, financial account information, etc.). However, providing such input can be cumbersome or otherwise burdensome for a user, particularly when attempting to enter these parameters on a device with limited input/output capabilities such as a mobile phone with a relatively small form factor. The implementations herein also provide for ways to dynamically create and then register or map the XR tags 108, customized or otherwise, to the real-world environment. The user creating or enabling the XR tags 108 can customize the XR tags 108 in terms of location where the XR tags 108 should be, such as the store. The registration or mapping refers to the accurate alignment of real and virtual objects. Without accurate registration or mapping, the illusion that the virtual objects exist in the real environment is severely compromised. The customer 102(1) can interact with the XR tag 108 while in the store to remove some of the friction involved in brick-and-mortar purchases. For example, the XR tag 108 can be placed (e.g., at block 804 of the process 800) as the customer 102(1) is making their way out of the store. If the customer 102(1) leaves without interacting with the XR tag 108, the XR platform can alert the store manager or automatically deduct money from customer's card on file. In one implementation, the XR platform, on detecting a specific checkout flow, can generate an XR tag 108 (e.g., at block 804 of the process 800) that, when accessed, can automate the process of entering the information and immediately create a flow that allows the merchant 118 to deliver the items to a shipping address of the customer 102(1). Through at least these examples, it can be understood that the XR platform integrates a P2P or retail experience with the payment experience into one platform and environment. These scenarios are just examples of the ways in which the disclosed technology can be implemented. It is to be understood that the XR technology can also be implemented in other fields of technology, such as financial services, restaurant management, payroll, lending, and so on.

Consider a media scenario, a user 102(1) may have purchased tickets to a concert (e.g., a live performance by a musical group, a band, an artist, a comedian, etc.). An XR tag 108 may be placed at a location associated with the concert venue (e.g., within a stadium at a location that is accessible to concert-goers but is inaccessible to people who have not purchased tickets to the concert). While attending the concert, the user 102(1) may capture the XR tag 108, as described herein, to receive merchandise of the performance artist(s), tickets to an upcoming concert, a backstage pass, etc.

Consider a P2P scenario in which a P2P user 102(1) is in proximity to another P2P user 102(2), where the P2P users are known to each other, e.g., have interacted via a P2P platform (e.g., the server(s) 112) at least once before. The proximity may be established when one user walks into the geofence 148 of the other, for example. In another example, the proximity may be established through location tracking capabilities on the two devices 104, 106. Typically, to conduct P2P transactions, users enter information, such as a user identifier, desired transfer amount, and so on, to pay another user after a certain event is complete, or for a specific reason. For example, a first user 102(1) may pay a second user 102(2) $100 for a concert, or for a meal that the second user 102(2) purchased. Once the event has been detected, the XR platform can generate and place the XR tag 108 (e.g., at block 804 of the process 800) within the first user's reach to allow the first user 102(1) to capture the XR tag 108 and automatically obtain the electronic funds to pay the second user 102(2) in a P2P transaction by carrying out the remainder of the process 800.

In another P2P scenario, a first user 102(1) may create and place an XR tag 108 in a country where they reside (e.g., China), and the XR tag 108 may be capturable by a second user 102(2) who resides in a different country (e.g., the United States). Upon the second user 102(2) traveling to the country where the XR tag 108 has been placed, the second user 102(2) can capture the XR tag 108, as described herein, and a subsequent P2P payment transaction between the first user 102(1) and the second user 102(2) may be facilitated by the capture of the XR tag 108.

In yet another example scenario, XR tags 108 may be distributed about a university campus. Students of the university may be incentivized to place and/or capture XR tags 108 on campus as part of an onboarding campaign for a mobile application 110 and an associated service. Accordingly, as students traverse the campus, they can capture XR tags 108 to initiate an onboarding process for downloading the application 110 to their mobile device 104 and registering with the associated service. In some examples, the creators of the XR tags 108 may receive a referral bonus whenever their XR tags 108 are captured by other users.

In some examples, the payment component 138 is configured to identify another person and to facilitate a digital transfer (e.g., a P2P money transfer or assignment of gift card, reward or stocks) with the identified person. For example, when a user 102(1) performs an action (e.g., walks into a merchant's 118 geofence 148) and interacts with an XR tag 108, the payment component 138 (e.g., using payment instructions) is configured to determine whether the user's action meets a predefined condition (e.g., at block 808 of the process 800) that allows the user to "claim" the XR tag 108. If the user 102(1) is eligible to capture the XR tag 108 and performs the actions corresponding to successful capture, a token may be registered to indicate that the capture of the XR tag 108 is successful and attributed to the user 102(1). The payment component 138 may be further configured to receive an "initiate transfer" command from the user 102(1) to initiate a transfer with identified person. The user 102(1) may provide the initiate transfer command to indicate that the user 102(1) would like to transfer the resource identified by the XR tag 108 (e.g., money, gift card, reward, merchandise, account status check, etc.). The user 102(1) may provide the initiate transfer command by giving a voice command, performing a gesture, interacting with a physical component (e.g., a button, knob, or slider) of their client device 104.

In some examples, the payment component 138 is further configured to receive an authentication signal from the identified person to authenticate the identified person. The payment component 138 may receive the authentication signal as a wireless signal, a voice signal, a gesture performed by the identified person, an image on a user device 104, or in any other suitable form. The identified person provides the authentication signal to a digital data transfer engine to authenticate themselves and to indicate that they approve of the user's request to initiate a digital transfer. The payment component 138 is further configured to generate a transfer token with information for executing the digital transfer and to send the transfer token to an institution associated with the user to initiate the digital transfer.

Figure 9:
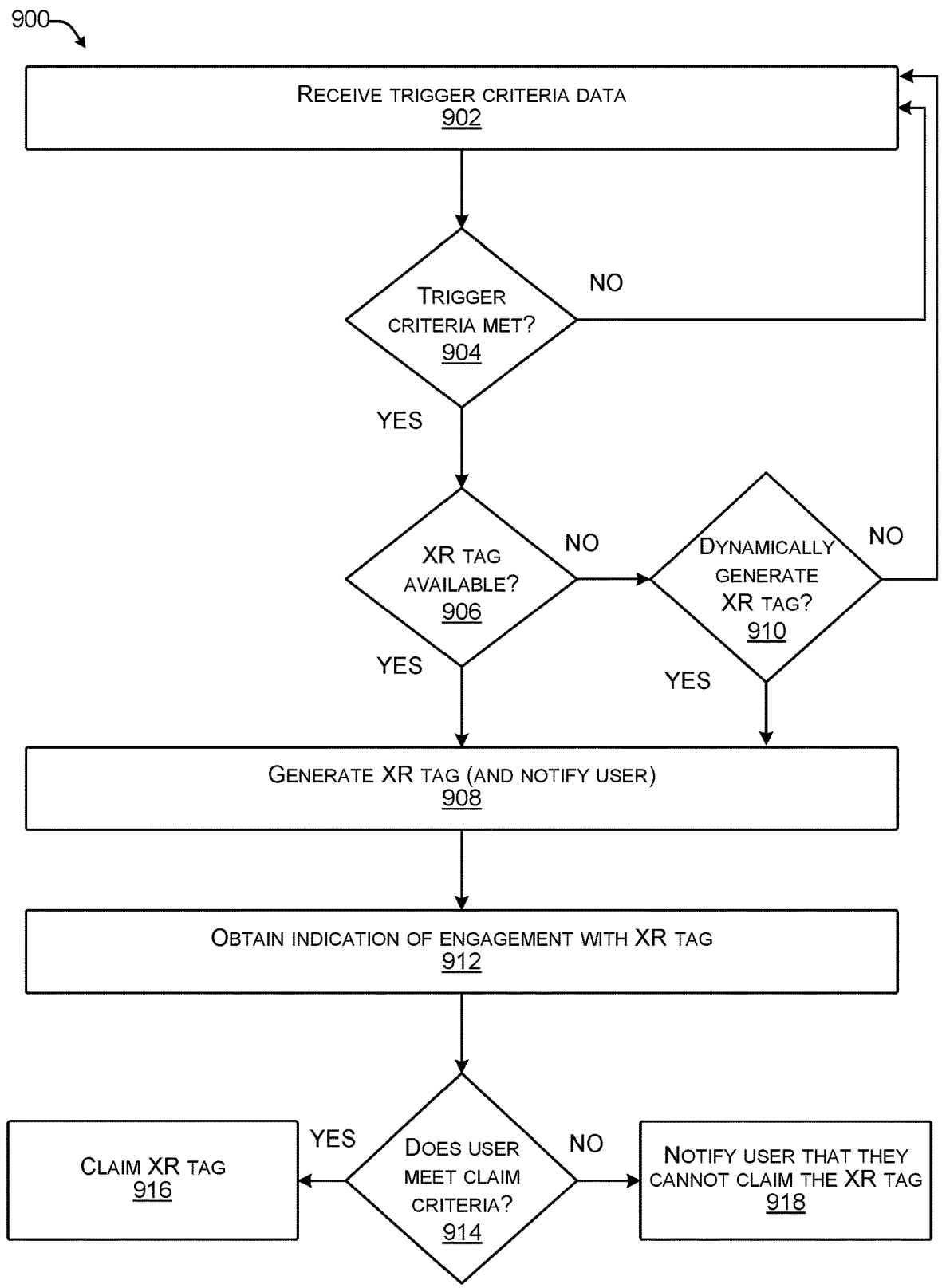
FIG. 9 is another example process for capturing an XR tag, according to an implementation of the present subject matter.

FIG. 9 is another example process 900 for capturing an XR tag 108, according to an implementation of the present subject matter. The process 900 can be implemented by a system (e.g., a computing device(s)) including one or more processors and memory storing computer-executable instructions to cause the one or more processors to perform the process 900. In some examples, the process 900 can be implemented by a server(s) 112 (and/or by a processor(s) thereof), a client device(s) 104, 106 (and/or by a processor(s) thereof), or a combination thereof. For discussion purposes, the process 900 is described with reference to the previous figures. Referring to FIG. 9, the process 900 may be triggered by previously defined rules that determine the criteria that establishes "claim action." In other implementations, the process 900 may be triggered by context or circumstantial data as the events occur. Further, these steps of the process 900 may be executed for each user, or a plurality of users contemporaneously or at different times.

At 902, an initialization of a trigger criteria is received. In some examples, a computing device(s) (e.g., the server(s) 112, and/or a processor(s) thereof) may receive the initialization of the trigger at block 902. For example, the PPS 112 may receive a notification indicating a change in a user's location at block 902. The PPS 112 may receive, at block 902, information regarding a user's location or changes with the user location via an application 110 executing on the user's device 104, such as a phone and fitness tracker. For data privacy reasons, the user 102(1) can authorize user's movements to be tracked via the application 110 in the device 104. In some examples, the PPS 112 may receive, at block 902 first coordinates of the client device 104 of the user 102(1) in response to the client device 104 traveling a predefined distance since the PPS 112 last received previous coordinates of the client device 104. While location is used as an example to track a user's movement, other trigger criteria obtained via devices, such as payment readers and IoT devices, like voice recognition devices, can be used to detect whether the PPS 112 should be alerted. Such devices can be recording the user's location, and more generally user's movement, through engagement with such devices. The trigger criteria can range from engagement with the device to a specific engagement or specific engagement for a predetermined period of time. In some examples, trigger criteria can relate to transaction data, such as a user having completed a particular number of transactions, transactions over a threshold, transactions at a particular frequency, transactions totaling a designated amount, transactions for particular items, and so on.

At 904, a determination is made as to whether a trigger criteria is met. In some examples, a computing device(s) (e.g., the server(s) 112, and/or a processor(s) thereof) may determine whether the trigger criteria is met at block 904. In one example, the trigger criteria is met when the user 102(1) activates an inactive IoT device, e.g., through initialization of a "trigger" phrase, e.g., a natural language input to trigger or enable a natural language command recognition functionality of a natural language controlled device. Voice interactions are one type of natural language command. Thus, a user may talk to a computing device and expect the device to appropriately act on his or her spoken commands. Natural language commands are not limited to speech and may also be provided as typed commands, handwritten commands, etc. For example, the PPS 112, on receiving a change in user's location via the user device 104 (or initialization of a device through a natural language command or other engagement), determines whether the user's circumstance defined by new location, current time, or current context, is qualified to receive an XR tag 108. The trigger event dictates whether a user 102(1) qualifies to receive an XR tag 108 on a device 104 associated with them. The confines of the trigger event may be determined by previously defined rules set by a merchant 118, customer, the service provider, or a third-party device. In one instance, the location of the user's device 104 (through the application 110 executing on the device 104) is compared with a geofence 148, defined by specific GPS coordinates and/or a radius, to determine if a trigger event is met (e.g., the computing device(s) may determine, at block 904, whether first coordinates of the client device 104 are within a threshold distance of second coordinates of the XR tag 108). If the trigger criteria is met ("Yes" branch of block 904), the process 900 transitions to block 906. If the trigger criteria is not met ("No" branch of block 904), the process 900 transitions back to block 902 where the user's movements are monitored, e.g., as a background process, to determine if the trigger criteria is initialized again. In some cases, the system performing the process 900 may also enter an "inactive" state waiting to be initialized through some external input, such as a "trigger phrase."

At 906, it is further determined whether an XR tag is available. For example, it is determined whether there is an XR tag 108 for the user 102(1) to capture. In some examples, a computing device(s) (e.g., the server(s) 112, and/or a processor(s) thereof) may determine whether there is an XR tag 108 for the user 102(1) to capture at block 906. For example, if the trigger criteria is met, it is further determined whether there is an XR tag 108 for the user 102(1) to capture (and subsequently claim). Based on the mapping of the user location with the trigger event, an XR tag 108 may be generated either in real-time or obtained from a data store 126 of previously generated and stored XR tags 108. If there is an XR tag 108 to be applied corresponding to the trigger event ("Yes" branch of block 906), the XR tag 108 is generated or retrieved and presented to the user 102(1), e.g., on a display of the user device 104, as shown in block 908 (e.g., the PPS 112 may cause a user interface of the application 110 executing on the device 104 to present the XR tag 108). In some implementations, the trigger event can define the device(s) 104 on which the XR tags 108 are to be displayed, and, as such, all such devices receive the XR tags 108 even though only one device 104 may have met the trigger criteria and subsequent trigger event. Further in block 908, a notification may be sent to a user device 104 associated with the user 102(1) alerting the user 102(1) to the availability of such an XR tag 108. For example, the PPS 112 may cause a notification, such as the notification 300, to be output via the application 110, the notification indicating that the XR tag 108 is within a threshold distance of the user 102(1). In some examples, the notification 300 further includes instructions (e.g., written, spoken, haptic, etc.) to direct the user 102(1) to the XR tag 108 and/or one or more actions, tasks, or the like to be completed before the XR tag 108 is presented. The notification 300 may optionally include an interactive element and instructions to invite engagement with the XR tag 108. The notification 300 can also be presented in a variety of ways, such as visually via a "drawer" item within the mobile application 110, an electronic message such as a text message or electronic mail, as an interstitial within another mobile or web application, as a pop-up notification, or on a display discoverable with a gesture (e.g., pinch gesture) or specific keypad, audio, visual, or haptic inputs. The notification 300 can also indicate other XR tags 108, even those not applicable to the user 102(1), on their display, e.g., as a "heat-map" of the XR tags 108 in a certain area or otherwise relevant to the user 102(1). For example, the XR tags 108 related to users similar to the user 102(1) may be shown on the heat-map to encourage the user 102(1) to interact with merchants 118 surfacing those other XR tags 108.

If no XR tag 108 is found or no relevant XR tag 108 is applicable ("No" branch of block 906), the process 900 may transition back to block 902. Alternatively, or additionally, an XR tag 108 may be generated on-the-fly, e.g., specific to the trigger event and other context derived from this specific trigger event and criteria, as shown in block 910. That is, a determination may be made as to whether to dynamically generate an XR tag 108 at block 910. For example, a merchant 118 may be requested by the service provider, along with user information, of whether they would want to extend any rewards to the user 102(1) who appears to be a frequent shopper as a way to retain their business. The merchant 118 may in real-time generate or authorize generation of an XR tag 108 specifically for this user and for it to be delivered to the user for a specific time period. In such a case, the "context-specific XR tag" customized to the user or the trigger event is generated at block 908 following the "Yes" branch of block 910. Otherwise, if no XR tag 108 is available or generated, and if the system determines to refrain from dynamically generating an XR tag 108, the process transitions back to block 902 by following the "No" branch of block 910 for continued monitoring at block 902.

At 912, an indication of engagement with the XR tag 108 is obtained. In some examples, a computing device(s) (e.g., the server(s) 112, and/or a processor(s) thereof) may obtain the indication of engagement with the XR tag 108 at block 912. In an example, the indication of engagement obtained at block 912 points to the user 102(1) attempting to "capture" the XR tag 108. Based on characteristics of the XR tag 108, the capture criteria and thus the engagement may vary and range from touch to other audio, visual, haptic input. Further, such capture criteria may vary from one user to another, and from one XR tag 108 to another. In some implementations, such capture criteria are defined when the XR tag 108 is generated or placed in the area of discovery. In some implementations, a graphical user interface of the device 104 operable by the user 102(1) guides the user 102(1) to engage with the XR tag 108, through one or a series of actionable steps. For example, in one implementation, the user 102(1) can discover and engage with the XR tag 108 through an XR camera lens or XR channel feature of the mobile application 110 that surfaces and highlights the areas where XR tags 108 are discoverable, capturable, and claimable. The XR platform can also facilitate capturing of the XR tags 108, which can leverage one or a combination of the various technologies to make the experience of a user interacting with the virtual world and the real-world seamless, frictionless, and continuous. During the engagement, information related to user 102(1), user device 104 and other environment characteristics may be obtained. The information may be authorization information, such as whether the user 102(1) is who they claim to be, whether the device 104 is authorized to interact with the XR tag 108, and whether the location is actually where the device 104 claims to be. Accordingly, the user 102(1) is authorized to capture the XR tag 108 and move on to the next step. Even though it is not shown, it will be understood that if the user 102(1) fails to be authorized to capture the XR tag, the process 900 can transition back to block 902. Alternatively, the user can attempt to re-capture the XR tag 108.

At 914, it is determined whether the user 102(1) meets the claim criteria associated with the XR tag 108. In some examples, a computing device(s) (e.g., the server(s) 112, and/or a processor(s) thereof) may determine whether the user 102(1) meets the claim criteria at block 914. For example, information obtained during the engagement or after the capture may be used to validate whether the user 102(1) is authorized to claim the XR tag 108, or whether there is a fraudulent attempt to capture and claim. For example, whether the user 102(1) is spoofing their location, or if the user 102(1) is still able to claim the XR tag 108. For example, it is possible that the user 102(1) was able to claim the XR tag 108 at an earlier time, however the user 102(1) delayed and now the "claiming" window has lapsed. In one implementation, the claim criteria may be determined by previously defined rules set by a merchant 118, customer, the service provider, or a third-party device. Further, the claim criteria may be dependent on time, location, orientation of the user device 104 used for claiming, user identity, merchant preferences, payment instrument identifier, and other such context.

If the user 102(1) meets the claim criteria ("Yes" branch of block 914), the XR tag 108 can be claimed and an action or object embedded or associated with the XR tag 108 can be obtained in block 916. For example, if the user 102(1) is within a geofence 148 specified by the merchant 118, or if the user 102(1) captures the XR tag 108 and claims the XR tag 108 within a predefined time window, the XR tag 108 is assumed to be claimed. If the user 102(1) does not meet the claim criteria ("No" branch of block 914), the user 102(1) is sent a notification at block 918, e.g., indicating that the user 102(1) cannot claim the XR tag 108 at this time. In some instances, the notification sent to the user 102(1) at block 918 includes specific actions that the user 102(1) can perform if claiming does not go through, such as request review, chat with merchant 118, and so on.

At block 916, an embedded claiming action is initiated. For example, the claiming action is associated with one or more embedded actions, such as facilitate payments as mentioned before, generate user or merchant specific actions, generate static or dynamic incentives, activate or deactivate incentives, download information, access information, enable user-specific actions, and so on. The actions can be initiated using a direct hyperlink or a 'deep-link," information including payment proxy of the customer, location of the mobile application 110, a URL of the mobile application 110, the payment proxy of the merchant 118 associated with a requesting application, amount owed to the merchant 118, and the like. Deep links provide a direct path to specific information in a Web application requested by the user 102(1), instead of requiring the user 102(1) to navigate to the home page and drill down to reach the same information. One example of a deep link is a hyperlink in one Web application that points to a specific page in a different Web application http://mobilepaymentapplication.com/$Joejoe), instead of pointing to the default home page of the different Web application (http://mobilepaymentapplication.com). Another example of a deep link is a hyperlink in one Web application that points to a specific page in a different Web application and also includes context data which the different Web application can use as a basis for retrieving information from its associated database and present that information to the user. Accordingly, the payment component 138 may create interfaces to confirm or process the payment request via the mobile payment application 110 at block 916.

Figure 10:
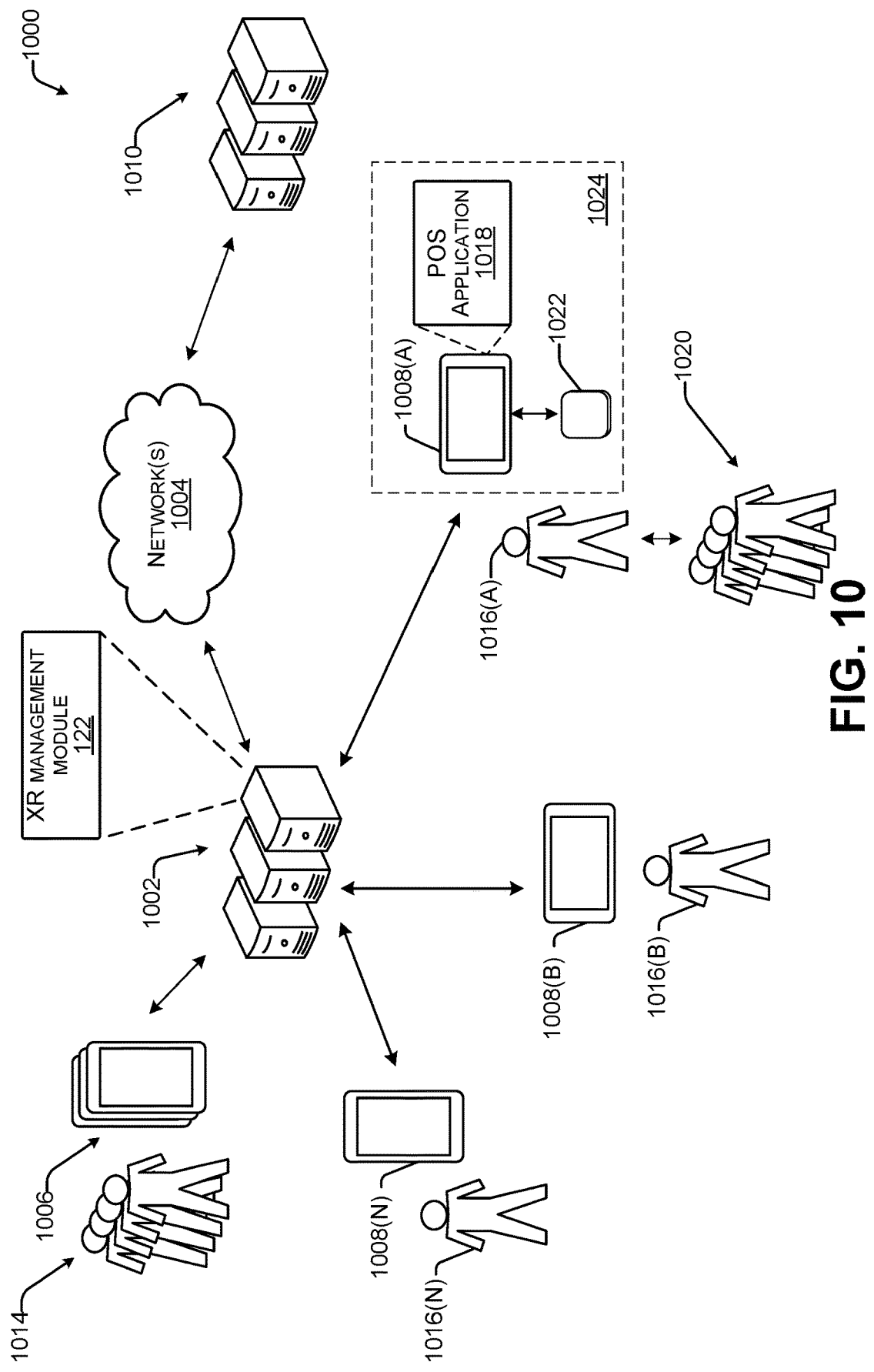
FIG. 10 is an example environment for performing techniques described herein.

FIG. 10 is an example environment 1000 for performing techniques described herein. The environment 1000 includes server(s) 1002 that can communicate over a network 1004 with user devices 1006 (which, in some examples can be merchant devices 1008 (individually, 1008(A)-1008(N))) and/or server(s) 1010 associated with third-party service provider(s). The server(s) 1002 can be associated with a service provider that can provide one or more services for the benefit of users 1014, as described below. Actions attributed to the service provider can be performed by the server(s) 1002.

For example, the server(s) 1002 may be the same as or similar to the server(s) 112 introduced in FIG. 1, and the server(s) 1002 may implement the XR management component 122, which may implement some of the techniques described herein. Furthermore, the network(s) 1004 may be the same as or similar to the network(s) 114 introduced in FIG. 1.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The individual user devices 1006 may be the same as or similar to the computing devices 104 introduced in FIG. 1, and the individual merchant devices 1008 may be the same as or similar to the merchant devices 106 introduced in FIG. 1. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In accordance with the examples described herein, the server(s) 1002 may obtain, via a user interface of an application executing on a client device 1008, a definition 134 of an XR tag 108, and may embed information in the XR tag 108 in accordance with the definition 134 of the XR tag 108. The server(s) 1002 may further obtain, via the user interface, one or more rules 136 applicable to the XR tag 108. The server(s) 1002 may further store data (e.g., XR data 132) representing the XR tag 108 in a data store 126. In some examples, the definition 134 and/or the one or more rules 136 allow for customizing the XR tag 108 and/or the information embedded in the XR tag 108 to other client devices 1006 that are accessing the XR tag 108, users 1014 of the other client devices 1006, and/or a creator of the XR tag 108.

In accordance with the examples described herein, the server(s) 1002 may receive, from a client device 1006 of a user 1014, coordinates associated with an XR tag 108. In some examples, the XR tag 108 is rendered on the client device 1006 in association with receiving the coordinates. The server(s) 1002 may further identify a claim action correlated with the coordinates, and associate the claim action to an application executing on the client device 1006. In some examples, the claim action is customized to at least one of the user 1014 or the client device 1006.

As described above, in at least one example, the users 1014 can include merchants 1016 (individually, 1016(A)-1016(N)). The individual users 1014 may be the same as or similar to the users 102 introduced in FIG. 1, and the individual merchants 1016 may be the same as or similar to the merchant 118 introduced in FIG. 1. In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, combinations of the foregoing, and so forth. Actions attributed to a merchant may include actions performed by owners, employees, or other agents of the merchant and thus no distinction is made herein unless specifically discussed. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1008 can have an instance of a POS application 1018 stored thereon. The POS application 1018 can configure the merchant device 1008 as a POS terminal, which enables the merchant 1016(A) to interact with one or more customers 1020. As described above, the users 1014 can include customers, such as the customers 1020 shown as interacting with the merchant 1016(A). For the purpose of this discussion, a "customer" can be any entity that acquires items from merchants, such as by purchasing, renting, leasing, borrowing, licensing, or the like. Thus, a merchant and a customer may interact with each other to conduct a transaction in which the customer acquires an item from a merchant, and in return, the customer provides payment to the merchant. While only two customers 1020 are illustrated in FIG. 10, any number of customers 1020 can interact with the merchants 1016. Further, while FIG. 10 illustrates the customers 1020 interacting with the merchant 1016(A), the customers 1020 can interact with any of the merchants 1016.

In at least one example, interactions between the customers 1020 and the merchants 1016 that involve the exchange of funds (from the customers 1020) for items (from the merchants 1016) can be referred to as "transactions." In some implementations, a transaction can also include a non-payment transaction, such as to show the balance on a payment object, to determine the inflow and outflow of cash, and so on. In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, etc.), etc. The POS application 1018 can send transaction data to the server(s) 1002 such that the server(s) 1002 can track transactions of the customers 1020, merchants 1016, and/or any of the users 1014 over time. Furthermore, the POS application 1018 can present a UI to enable the merchant 1016(A) to interact with the POS application 1018 and/or the service provider via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. Additional details are described below with reference to FIG. 14. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server(s) 1002, which can provide, among other services, a payment processing service. The server(s) 1002 associated with the service provider can communicate with server(s) 1010, as described below. In this manner, the POS terminal and reader device 1022 may collectively process transaction(s) between the merchants 1016 and customers 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to the customers 1020. In additional or alternative examples, the POS terminal can have a display integrated therein for presenting information to the customers 1020. POS systems, such as the POS system 1024, may be mobile, such that POS terminals and reader devices may process transactions in disparate locations across the world. POS systems can be used for processing card-present transactions and card-not-present (CNP) transactions, as described below.

A card-present transaction is a transaction where both a customer 1020 and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a customer 1020 slides a card, or other payment instrument, having a magnetic strip through a reader device 1022 that captures payment data contained in the magnetic strip. A dip is a card-present transaction where a customer 1020 inserts a payment instrument having an embedded microchip (i.e., chip) into a reader device 1022 first. The dipped payment instrument remains in the payment reader until the reader device 1022 prompts the customer 1020 to remove the card, or other payment instrument. While the payment instrument is in the reader device 1022, the microchip can create a one-time code which is sent from the POS system 1024 to the server(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1024, the server(s) 1002, and/or the server(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1010. As described above, in at least one example, the server(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1010 associated therewith), and a payment authorization message is communicated from the issuer to the POS device via a path opposite of that described above, or via an alternate path.

As described above, the server(s) 1010, which can be associated with payment service provider(s), may determine whether the transaction is authorized based on the transaction data, as well as information relating to parties to the transaction (e.g., the customer 1020 and/or the merchant 1016(A)). While the description refers to a customer and merchant as parties to the payment transaction, it will be understood that the parties can be a sender-recipient, a landlord-renter, a bank-bank customer, a first friend and a second friend, and so on. The server(s) 1010 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1010 to authorize or decline transactions.

Based on the authentication notification that is received by the POS system 1024 from server(s) 1002, the merchant 1016(A) may indicate to the customer 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1014 can access all of the services of the service provider. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider can offer payment processing services for processing payments on behalf of the merchants 1016, as described above. For example, the service provider can provision payment processing software, payment processing hardware and/or payment processing services to merchants 1016, as described above, to enable the merchants 1016 to receive payments from the customers 1020 when conducting POS transactions with the customers 1020. For instance, the service provider can enable the merchants 1016 to receive cash payments, payment card payments, and/or electronic payments from customers 1020 for POS transactions and the service provider can process transactions on behalf of the merchants 1016.

As the service provider processes transactions on behalf of the merchants 1016, the service provider can maintain accounts or balances for the merchants 1016 in one or more ledgers. For example, the service provider can analyze transaction data received for a transaction to determine an amount of funds owed to a merchant 1016(A) for the transaction. In at least one example, such an amount can be a total purchase price less fees charged by the service provider for providing the payment processing services. Based on determining the amount of funds owed to the merchant 1016(A), the service provider can deposit funds into an account of the merchant 1016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1016(A) to a bank account of the merchant 1016(A) that is held at a bank or other financial institution (e.g., associated with the server(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider to the bank account of the merchant 1016(A).

In at least one example, the service provider may provide inventory management services. That is, the service provider may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider can offer recommendations related to pricing of the items, placement of items on the catalog, and multi-party fulfillment of the inventory.

In at least one example, the service provider can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider can recommend and/or generate content items to supplement omni-channel presences of the merchants 1016. That is, if a merchant of the merchants 1016 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1014 to set schedules for scheduling appointments and/or users 1014 to schedule appointments.

In some examples, the service provider can provide restaurant management services to enable users 1014 to make and/or manage reservations, to monitor front-of-house and/or back-of-house operations, and so on. In such examples, the merchant device(s) 1008 and/or server(s) 1002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfillment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1014 may be new to the service provider such that the user 1014 that has not registered (e.g., subscribed to receive access to one or more services offered by the service provider) with the service provider. The service provider can offer onboarding services for registering a potential user 1014 with the service provider. In some examples, onboarding can involve presenting various questions, prompts, and the like to a potential user 1014 to obtain information that can be used to generate a profile for the potential user 1014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1014 providing all necessary information, the potential user 1014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1010). That is, the service provider can offer IDV services to verify the identity of users 1014 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1014 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1002) and/or the server(s) 1010 via the network(s) 1004. In some examples, the merchant device(s) 1008 are not capable of connecting with the service provider (e.g., the server(s) 1002) and/or the server(s) 1010, due to a network connectivity issue, for example. In additional or alternative examples, the server(s) 1002 are not capable of communicating with the server(s) 1010 due to network connectivity issue, for example. In such examples, devices may operate in "offline" mode where at least some payment data is stored (e.g., on the merchant device(s) 1008) and/or the server(s) 1002 until connectivity is restored and the payment data can be transmitted to the server(s) 1002 and/or the server(s) 1010 for processing.

In at least one example, the service provider can be associated with a hub, such as an order hub, an inventory hub, a fulfillment hub and so on, which can enable integration with one or more additional service providers (e.g., associated with the additional server(s) 1010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1006 that are in communication with one or more server computing devices 1002 of the service provider. That is, techniques described herein are directed to a specific implementation—or, a practical application—of utilizing a distributed system of user devices 1006 that are in communication with one or more server computing devices 1002 of the service provider to perform a variety of services, as described above. The unconventional configuration of the distributed system described herein enables the server(s) 1002 that are remotely-located from end-users (e.g., users 1014) to intelligently offer services based on aggregated data associated with the end-users, such as the users 1014 (e.g., data associated with multiple, different merchants and/or multiple, different customers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006.

Furthermore, such features are changed dynamically based on the profiles of the users involved interacting with the GUIs. As such, techniques described herein are directed to improvements to computing systems.

Figure 11:
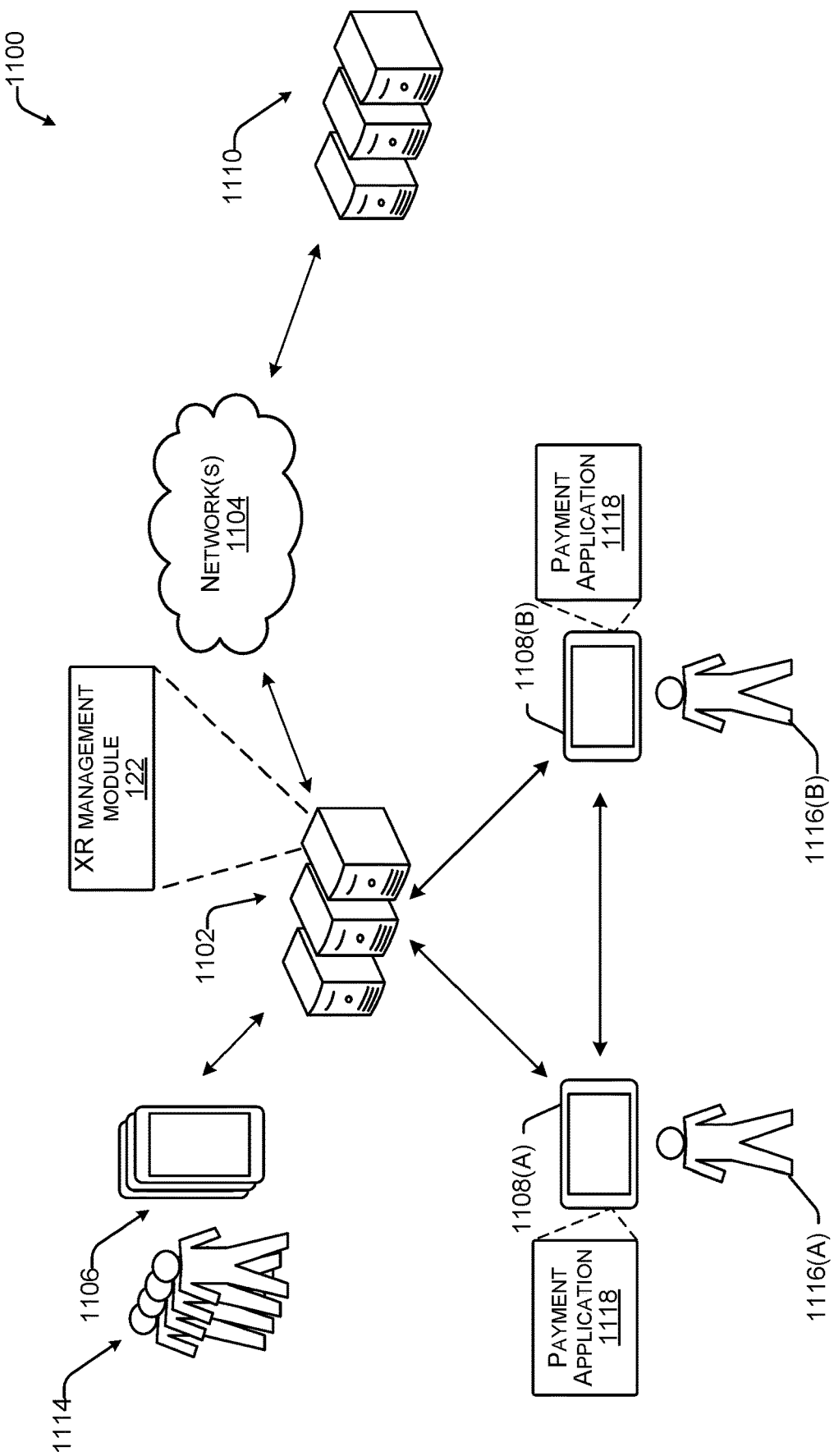
FIG. 11 is an example environment for performing techniques described herein.

FIG. 11 is an example environment 1100 for performing techniques described herein. The environment 1100 includes server(s) 1102 that can communicate over a network 1104 with user devices 1106 (which, in some examples can be user devices 1108 (individually, 1108(A), 1108(B)) and/or server(s) 1110 associated with third-party service provider(s). The server(s) 1102 can be associated with a service provider that can provide one or more services for the benefit of users 1114, as described below. Actions attributed to the service provider can be performed by the server(s) 1102. In some examples, the service provider referenced in FIG. 10 can be the same or different than the service provider referenced in FIG. 11.

For example, the server(s) 1102 may be the same as or similar to the server(s) 112 introduced in FIG. 1, and the server(s) 1102 may implement the XR management component 122, which may implement some of the techniques described herein. Furthermore, the network(s) 1104 may be the same as or similar to the network(s) 114 introduced in FIG. 1.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The individual user devices 1106 (and in some examples, the individual user devices 1108) may be the same as or similar to the computing devices 104 introduced in FIG. 1. In some examples, individual ones of the user devices can be operable by users 1114. The users 1114 can be referred to as customers, customers, merchants, merchants, borrowers, employees, employers, payors, payees, couriers and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

In at least one example, the service provider can provide a peer-to-peer payment service that enables peer-to-peer payments between two or more users 1114. Two users, user 1116(A) and user 1116(B) are illustrated in FIG. 11 as "peers" in a peer-to-peer payment. In at least one example, the service provider can communicate with instances of a payment application 1118 (or other access point) installed on devices 1106 configured for operation by users 1114. In an example, an instance of the payment application 1118 executing on a first device 1108(A) operated by a payor (e.g., user 1116(A)) can send a request to the service provider to transfer an asset (e.g., fiat currency, non-fiat currency, cryptocurrency, securities, gift cards, and/or related assets) from the payor to a payee (e.g., user 1116(B)) via a peer-to-peer payment. In some examples, assets associated with an account of the payor are transferred to an account of the payee. In some examples, assets can be held at least temporarily in an account of the service provider prior to transferring the assets to the account of the payee. The individual users 1114 (and in some examples, the individual users 1116) may be the same as or similar to the users 102 introduced in FIG. 1, and the payment application 1118 may be the same as or similar to the payment application 110 introduced in FIG. 1.

In accordance with the examples described herein, the server(s) 1102 may obtain, via a user interface of an application executing on a client device 1106, 1108, a definition 134 of an XR tag 108, and may embed information in the XR tag 108 in accordance with the definition 134 of the XR tag 108. The server(s) 1102 may further obtain, via the user interface, one or more rules 136 applicable to the XR tag 108. The server(s) 1102 may further store data (e.g., XR data 132) representing the XR tag 108 in a data store 126. In some examples, the definition 134 and/or the one or more rules 136 allow for customizing the XR tag 108 and/or the information embedded in the XR tag 108 to other client devices 1106, 1108 that are accessing the XR tag 108, users 1114, 1116 of the other client devices 1106, 1106, and/or a creator of the XR tag 108.

In accordance with the examples described herein, the server(s) 1102 may receive, from a client device 1106, 1108 of a user 1114, 1116, coordinates associated with an XR tag 108. In some examples, the XR tag 108 is rendered on the client device 1106, 1108 in association with receiving the coordinates. The server(s) 1102 may further identify a claim action correlated with the coordinates, and associate the claim action to an application 1118 executing on the client device 1106, 1108. In some examples, the claim action is customized to at least one of the user 1114, 1116 or the client device 1106, 1108.

Figure 12:
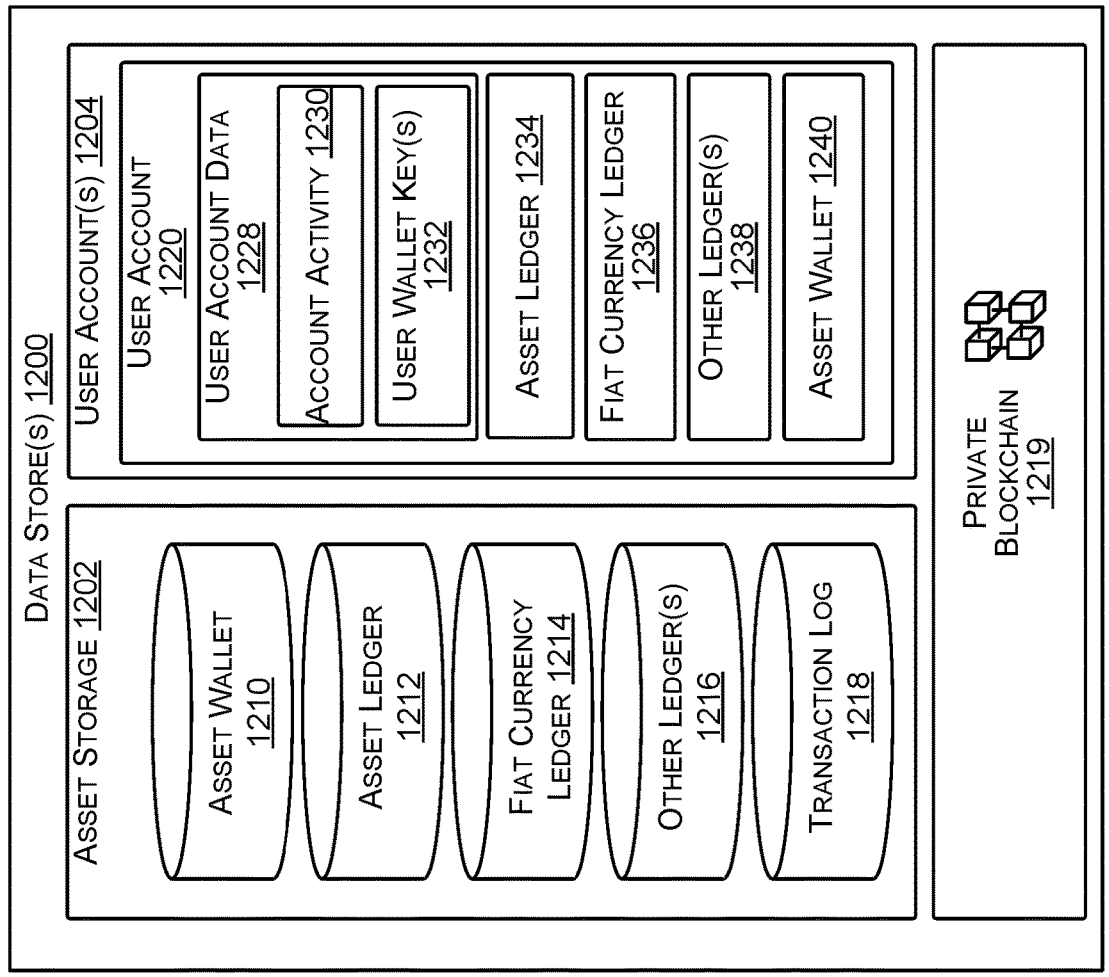
FIG. 12 is an example data store used for performing techniques described herein.
Figure 12:
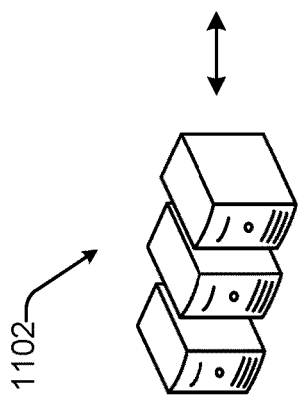

In some examples, the service provider can utilize a ledger system to track transfers of assets between users 1114, 1116. FIG. 12, below, provides additional details associated with such a ledger system. The ledger system can enable users 1114, 1116 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1118 executing on user device(s) of payee(s). As an example, the service provider can transfer assets from an account of user 1116(A) to an account of the user 1116(B) and can send a notification to the user device 1108(B) of the user 1116(B) for presentation via a user interface. The notification can indicate that a transfer is in process, a transfer is complete, or the like. In some examples, the service provider can send additional or alternative information to the instances of the payment application 1118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1118 executing on the user devices 1106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 11 or a third-party service provider associated with the server(s) 1110. In examples where the content provider is a third-party service provider, the server(s) 1110 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 11. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1106 (e.g., mobile device or conventional personal computer (PC)) based on instructions transmitted to and from the server(s) 1102 (which, in such an example can be called a "messaging server"). In some instances, the messaging application can include a payment application with messaging capability that enables users of the payment application to communicate with one another. In such instances, the payment application can be executed on a user device 1106 based on instructions transmitted to and from the server(s) 1102 (e.g., the payment service discussed in this description or another payment service that supports payment transactions). In some examples, the messaging application can be provided by a third-party service provider associated with the server(s) 1110. In examples where the messaging application is a third-party service provider, the server(s) 1110 can be accessible via one or more APIs or other integrations.

As described above, the service provider can facilitate peer-to-peer transactions, which can enable users 1114, 1116 to transfer fiat currency, non-fiat currency, cryptocurrency, securities, or other assets, or portions thereof, to other users 1114, 1116. In at least one example, individual users can be associated with user accounts. Additional details associated with user accounts and the transfer of assets between users 1114, 1116 are described below with reference to FIG. 12.

Furthermore, the service provider of FIG. 11 can enable users 1114, 1116 to perform banking transactions via instances of the payment application 1118. For example, users can configure direct deposits or other deposits for adding assets to their various ledgers/balances. Further, users 1114, 1116 can configure bill pay, recurring payments, and/or the like using assets associated with their accounts. In addition to sending and/or receiving assets via peer-to-peer transactions, users 1114, 1116 buy and/or sell assets via asset networks such as cryptocurrency networks, securities networks, and/or the like.

FIG. 12 is an example data store 1200 used for performing techniques described herein. The data store(s) 1200 can be associated with the server(s) 1102. The data store(s) 1200 may be the same as or similar to the data store(s) 126 introduced in FIG. 1.

In at least one example, the data store(s) 1200 can store assets in an asset storage 1202, as well as data in user account(s) 1204, merchant account(s) 1206, and/or customer account(s) 1208. In at least one example, the asset storage 1202 can be used to store assets managed by the service provider of FIG. 11. In at least one example, the asset storage 1202 can be used to record whether individual of the assets are registered to users. For example, the asset storage 1202 can include an asset wallet 1210 for storing records of assets owned by the service provider of FIG. 11, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communication with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1114, 1116. Specifically, the asset storage 1202 may include asset ledger 1210, fiat currency ledger 1214, and other ledger(s) 1216, which can be used to record transfers of assets between users 1114, 1116 of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or customer account(s) 1208. In at least one example, the user account(s) 1204 may store records of user accounts associated with the users 1114. In at least one example, the user account(s) 1204 can include a user account 1220, which can be associated with a user (of the users 1114). Other user accounts of the user account(s) 1204 can be similarly structured to the user account 1220, according to some examples. In other examples, other user accounts may include more or less data and/or account information than that provided by the user account 1220. In at least one example, the user account 1220 can include user account data 1228, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1230 and user wallet key(s) 1232. The account activity 1230 may include a transaction log for recording transactions associated with the user account 1220. In some examples, the user wallet key(s) 1232 can include a public-private key-pair and a respective address associated with the asset network or other asset networks. In some examples, the user wallet key(s) 1232 may include one or more key pairs, which can be unique to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1236, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 1220. In at least one example, the asset ledger 1234 can further record transactions of cryptocurrency assets associated with the user account 1220. For example, the user account 1220 can receive cryptocurrency from the asset network using the user wallet key(s) 1232. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1232 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG. 11 using a value of fiat currency reflected in fiat currency ledger, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can require the user to transfer an amount of the cryptocurrency in a message signed by user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 11 can acquire cryptocurrency from a third-party source (e.g., associated with the third-party server(s)). In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 11 has its own cryptocurrency assets, cryptocurrency transferred in a transaction (e.g., data with address provided for receipt of transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1210, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger 1234 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a cryptocurrency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a customer is paying in cryptocurrency and the customer has their own cryptocurrency wallet account associated with the service provider of FIG. 11, the customer can send a message signed by its private key including its wallet address (i.e., of the customer) and identifying the cryptocurrency and value to be transferred to the merchant's asset wallet 1240. The service provider of FIG. 11 can complete the transaction by reducing the cryptocurrency balance in the customer's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can require a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 11 is an aspect of the technology disclosed that enables technical advantages of increased processing speed and improved security.

Figure 13:
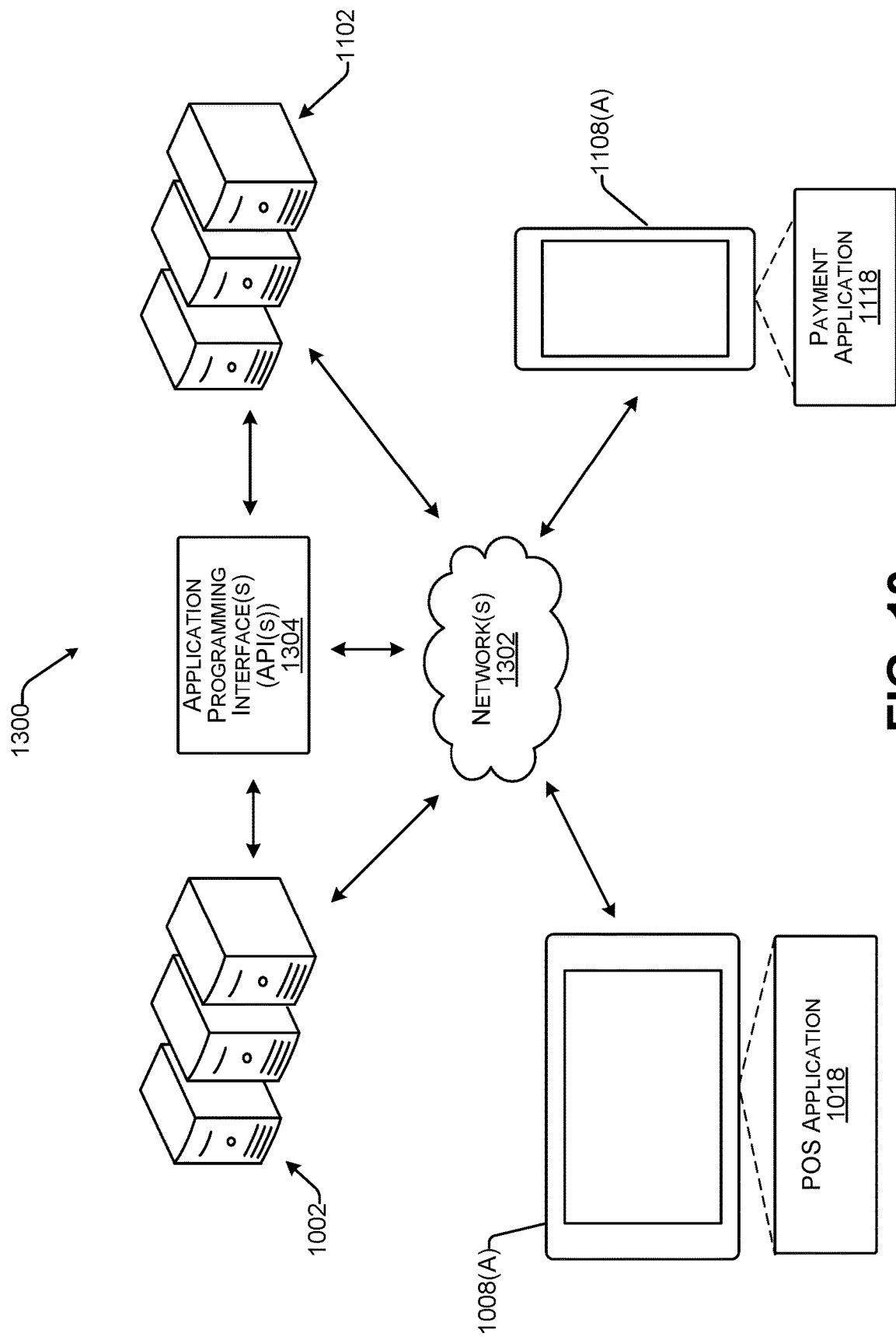
FIG. 13 is an example environment for performing techniques described herein.

FIG. 13 is an example environment 1300 for performing techniques described herein. In the environment 1300, the environment 1000 and the environment 1100 can be integrated to enable payments at the point-of-sale using assets associated with user accounts in the peer-to-peer environment of FIG. 11. As illustrated, each of the components can communicate with one another via one or more networks 1302. In some examples, one or more APIs 1304 or other functional components can be used to facilitate such communication.

In at least one example, the example environment 1300 can enable contactless payments, via integration of peer-to-peer payment, or other payment making, platform(s) and payment processing platform(s), are described herein. For the purpose of FIG. 13, the environment 1000 can refer to a payment processing platform and the environment 1100 can refer to a peer-to-peer payment, or payment making, platform. In an example, such an integration can enable a customer to participate in a transaction via their own computing device instead of interacting with a merchant device of a merchant, such as the merchant device 1108(A). In such an example, the POS application 1018, associated with a payment processing platform and executable by the merchant device 1008(A) of the merchant, can present a QR code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1108 (A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other— and with a payment application 1118 associated with the peer-to-peer payment platform and/or the POS application 1018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1108(A), can be specially configured as a customer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein. QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1108(A), can be specially configured as a customer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1108(A), to scan, or otherwise capture, the QR code. If the customer is already associated With the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a customer to enable the customer to participate in a transaction via their own computing device. For instance, in a "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A). In some examples, the customer can watch items being added to their cart (e.g., via a user interface presented via the payment application). As an item is added to a virtual cart by the merchant-via the POS application 1018 on the merchant device 1008(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the customer, such as the user device 1108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1118 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 14:
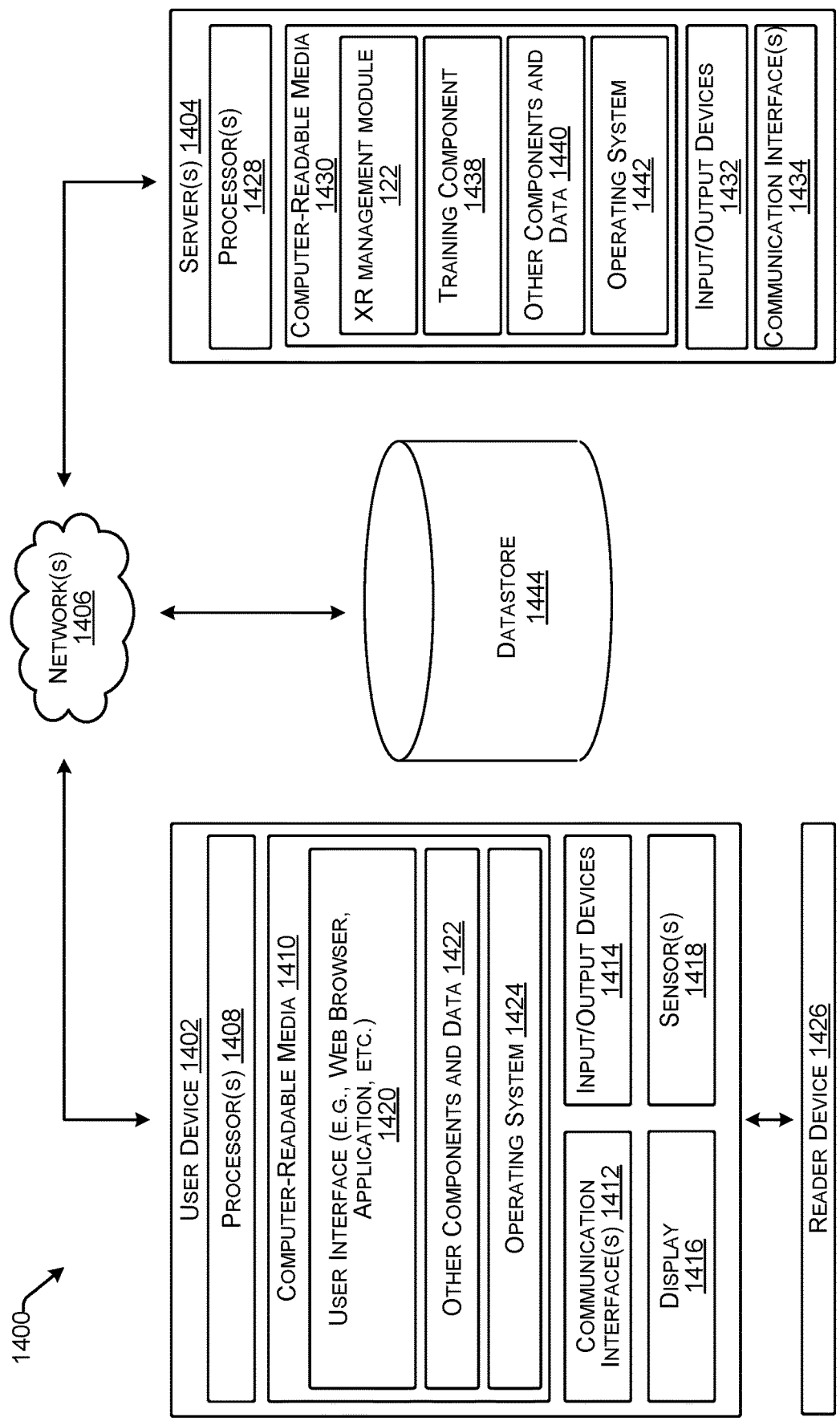
FIG. 14 is an example block diagram illustrating a system for performing techniques described herein.

FIG. 14 is an example block diagram 1400 illustrating a system for performing techniques described herein. The block diagram 1400 illustrates a system 1400 for performing techniques described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 11.

For example, the server(s) 1404 may be the same as or similar to the server(s) 112 introduced in FIG. 1, and the server(s) 1404 may implement the XR management component 122, which may implement some of the techniques described herein. Furthermore, the network(s) 1406 may be the same as or similar to the network(s) 114 introduced in FIG. 1, and the user device 1402 may be the same as or similar to the computing device 104 introduced in FIG. 1.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, an in-app browser 122, or the like. In other examples, the user interface 1420 can be presented via an application, such as a mobile application or desktop application, which can be provided by a service provider associated with the server(s) 1404, or which can be an otherwise dedicated application. In some examples, the user interface 1420 can be any of the user interfaces 200, 202, and/or 300 described herein. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

In accordance with the examples described herein, the server(s) 1404 may obtain, via a user interface 1420 of an application executing on a client device 1402, a definition 134 of an XR tag 108, and may embed information in the XR tag 108 in accordance with the definition 134 of the XR tag 108. The server(s) 1404 may further obtain, via the user interface 1420, one or more rules 136 applicable to the XR tag 108. The server(s) 1404 may further store data (e.g., XR data 132) representing the XR tag 108 in a data store 1444. In some examples, the definition 134 and/or the one or more rules 136 allow for customizing the XR tag 108 and/or the information embedded in the XR tag 108 to other client devices that are accessing the XR tag 108, users of the other client devices, and/or a creator of the XR tag 108.

In accordance with the examples described herein, the server(s) 1404 may receive, from a client device 1402 of a user, coordinates associated with an XR tag 108. In some examples, the XR tag 108 is rendered on the client device 1402 in association with receiving the coordinates. The server(s) 1404 may further identify an incentive correlated with the coordinates, and associate the incentive to an application executing on the client device 1402, wherein the incentive is configured to be applied to a subsequent payment transaction of which the user is a party. In some examples, the incentive is customized to at least one of the user or the client device 1402.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, proxy card reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. The term "proxy card" as used herein refers to a card that may or may not bear a card number/account number that appears to be that of a real credit or debit card account (i.e., it is in the correct format), but where that card/account number is actually only a proxy for the customer's real card/account number. That is, the reader device 1426 may include hardware implementations to enable the reader device 1426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1426 may also include a biometric sensor to receive and process biometric characteristics and process them as payment instruments, given that such biometric characteristics are registered with the payment service system and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more components and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one component for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1412, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider and/or payment processing service. Functional components stored in the computer-readable media 1430 can optionally include a XR management component 122, as described herein, a training component 1438, and one or more other components and data 1440.

The training component 1438 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store associated with the user device(s) 1402 and/or the server(s) 1404 for use at a time after the data models have been trained (e.g., at runtime).

The one or more other components and data 1440 can include the sub-components of the XR management component 122, the functionality of which is described, at least partially, above. Further, the one or more other components and data 1440 can include a merchant component configured to receive transaction data from POS systems, such as the POS system 1024 described above with reference to FIG. 10. Such a merchant component can transmit requests (e.g., authorization, capture, settlement, etc.) to payment service server computing device(s) to facilitate POS transactions between merchants and customers. Such a merchant component can communicate the successes or failures of the POS transactions to the POS systems. Further, the one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1402 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a data store 1444 that can be configured to store data that is accessible, manageable, and updatable. The data store 1444 may be the same as or similar to the data store(s) 126 introduced in FIG. 1. In some examples, the data store 1444 can be integrated with the user device 1402 and/or the server(s) 1404. In other examples, as shown in FIG. 14, the data store 1444 can be located remotely from the server(s) 1404 and can be accessible to the server(s) 1404. The data store 1444 can comprise multiple databases and/or servers connected locally and/or remotely via the network(s) 1406.

In at least one example, the data store 1444 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) can include or be associated with the merchant profiles and/or customer profiles described above.

Furthermore, in at least one example, the data store 1444 can store inventory database(s) and/or catalog database(s). As described above, an inventory can store data associated with a quantity of each item that a merchant has available to the merchant. Furthermore, a catalog can store data associated with items that a merchant has available for acquisition. The data store 1444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A system comprising:
one or more processors; and
computer-executable instructions that, when executed by the one or more processors, cause the one or more processors to perform operations comprising:
obtaining, via a user interface of an application executing on a client device, a definition of an extended reality (XR) tag;
embedding information in the XR tag in accordance with the definition of the XR tag;
obtaining, via the user interface, one or more rules applicable to the XR tag, wherein the one or more rules allow for customizing the information embedded in the XR tag to at least one of other client devices that are accessing the XR tag or users of the other client devices; and
storing data representing the XR tag in a data store.

2. The system of claim 1, wherein the definition includes at least one or more of:
a claim action that is configured to be triggered by the users;
a location where the XR tag is to be rendered, or
an appearance of at least one of:
the XR tag; or
one or more additional objects that are to be rendered with the XR tag.

3. The system of claim 1, wherein the information includes a claim action that is configured to be triggered by the users.

4. The system of claim 3, wherein the claim action is associated with an incentive associated with at least one merchant.

5. The system of claim 4, the operations further comprising, prior to the obtaining of the definition:
   authenticating a user of the client device,
      wherein the authenticating confirms that the user is authorized by the merchant to create XR tags on behalf of the merchant.

6. The system of claim 3, wherein the definition further includes timing of validity and display of visual indications of users who trigger the claim action.

7. The system of claim 1, wherein the definition includes at least one or more of:
   a preferred structural design of the XR tag;
   a preferred mode of interaction with the XR tag;
   a feedback to the preferred mode of interaction;
   timing of validity and display of the XR tag; or
   a location where the XR tag is to be rendered.

8. The system of claim 1, wherein the one or more rules include a rule to customize the information embedded in the XR tag based at least in part on at least one of:
   preferences of the users;
   locations associated with the at least one of the other client devices or the users; or
   interaction histories associated with the users.

9. The system of claim 1, wherein the application is at least one of:
   a payment application associated with a service provider of a payment service; or
   an ordering application associated with a service provider of an item ordering service or an item delivery service.

10. The system of claim 1, the operations further comprising:
    causing the user interface of the application to present one or more recommended locations where the XR tag is renderable,
       wherein the obtaining of the definition comprises receiving, via the user interface, a selection of a location from amongst the one or more recommended locations.

11. The system of claim 1, wherein the definition further includes a geofence surrounding a location.

12. A computer-implemented method comprising:
    obtaining, via a user interface of an application executing on a client device, a definition of an augmented reality (AR) object, wherein the definition includes at least one or more of:
       a preferred structural design of the AR object;
       a preferred mode of interaction with the AR object;
       a feedback to the preferred mode of interaction;
       timing of validity and display of the AR object; or
       a location where the AR object is to be rendered;
    embedding, by a server associated with the client device, information in the AR object in accordance with the definition of the AR object;
    obtaining, via the user interface, one or more rules applicable to the AR object, wherein the one or more rules include at least one of:
       a rule to customize the information embedded in the AR object based on identity of a client accessing the AR object at the rendered location;
       a rule to customize the information embedded in the AR object based on identity of another client device accessing the AR object at the rendered location; or
       a rule to apply the customization to the AR object;
    generating, from another application executing on the other client device, a request to render the AR object with the embedded information for the client or the other client device;
    determining, by the server, whether to render the AR object based on the definition and the one or more rules; and
    based on a determination to render the AR object, displaying the rendered AR object on another user interface of the other client device.

13. The computer-implemented method of claim 12, wherein the information embedded in the AR object includes claim actions that are configured to be triggered by users.

14. The computer-implemented method of claim 13, wherein the claim actions are associated with incentives associated with a merchant, a merchant category, or a service provider.

15. The computer-implemented method of claim 12, further comprising:
    causing, by the server, the user interface of the application to present one or more recommended locations where the AR object can be rendered to increase a likelihood of users accessing the AR object,
       wherein the obtaining of the definition comprises receiving, via the user interface, a selection of the location from amongst the one or more recommended locations.

16. A computer-implemented method comprising:
    obtaining, via a user interface of an application executing on a client device, a definition of an extended reality (XR) tag, wherein the definition allows for customizing the XR tag to at least one of other client devices that are accessing the XR tag, users of the other client devices, or a creator of the XR tag;
    embedding, by a server associated with the client device, information in the XR tag in accordance with the definition of the XR tag;
    obtaining, via the user interface, one or more rules applicable to the XR tag; and
    storing, by the server, data representing the XR tag in a data store.

17. The computer-implemented method of claim 16, wherein the information includes a claim action that is configured to be triggered by users.

18. The computer-implemented method of claim 16, wherein the one or more rules include a rule to customize the information embedded in the XR tag based at least in part on identity of at least one of another client device that is accessing the XR tag or a user of the other client device.

19. The computer-implemented method of claim 16, further comprising:
    causing, by the server, the user interface of the application to present one or more recommended locations where the XR tag is renderable,
       wherein the obtaining of the definition comprises receiving, via the user interface, a selection of a location from amongst the one or more recommended locations.

20. The computer-implemented method of claim 16, wherein the definition includes at least one or more of:
    a preferred structural design of the XR tag;
    a preferred mode of interaction with the XR tag;
    a feedback to the preferred mode of interaction;
    timing of validity and display of the XR tag; or
    a location where the XR tag is to be rendered.

\* \* \* \* \*